(12) United States Patent
Wiklem et al.

(10) Patent No.: US 11,731,054 B1
(45) Date of Patent: Aug. 22, 2023

(54) MULTILAYER FRAMEWORK ARCHITECTURE AND USER INTERFACE FOR VIDEO GAMING APPLICATIONS

(71) Applicant: CP Studios LLC, Salt Lake City, UT (US)

(72) Inventors: Brian Joseph Wiklem, Costa Mesa, CA (US); Carrie Ann Cowan, Costa Mesa, CA (US)

(73) Assignee: CP Studios LLC, Salt Lake City, UT (US)

( * ) Notice: Subject to any disclaimer, the term of this patent is extended or adjusted under 35 U.S.C. 154(b) by 188 days.

(21) Appl. No.: 17/076,408

(22) Filed: Oct. 21, 2020

Related U.S. Application Data

(63) Continuation of application No. 16/740,289, filed on Jan. 10, 2020, now abandoned, which is a
(Continued)

(51) Int. Cl.
*A63F 13/00* (2014.01)
*A63F 13/79* (2014.01)
(Continued)

(52) U.S. Cl.
CPC .............. *A63F 13/79* (2014.09); *A63F 13/35* (2014.09); *A63F 13/537* (2014.09); *A63F 13/87* (2014.09); *H04L 67/131* (2022.05)

(58) Field of Classification Search
CPC ...... G07F 17/3225; A63F 13/86; A63F 13/00; A63F 13/48; A63F 13/795; A63F 13/847; A63F 13/34
See application file for complete search history.

(56) References Cited

U.S. PATENT DOCUMENTS

| 5,358,259 A | 10/1994 | Best |
| 6,386,980 B1 | 5/2002 | Nishino et al. |
(Continued)

OTHER PUBLICATIONS http://forum.supercell.net, retrieved on Apr. 13, 2016, 1 pg.
(Continued)

*Primary Examiner* — David L Lewis
*Assistant Examiner* — Eric M Thomas
(74) *Attorney, Agent, or Firm* — Patent Law Works LLP; Greg Sueoka

(57) ABSTRACT

The present disclosure is directed to a flexible architecture for video gaming applications. In some embodiments, the flexible architecture is platform agnostic and provides a continuous visual experience for players across different platforms while engaging them at different levels of play. The architecture provides user interfaces that facilitate access to video gaming applications in various ways that may include: via social networks or sites; via wall posts or via an online social networking service that enables its users to send and read text-based posts; via mobile devices (iOS, Android, or Windows-based smart phones); or via dedicated game consoles. In some embodiments, the flexible architecture provides multiple levels of play options, which may include a peer-to-peer competitive challenge level for "core" players, a "casual" play level for play with friends with whom a player shares an affinity, for example, in a social network; or a "spectator" mode that permits non-players in a network to assist friends. In some embodiments, feed-based triggers may allow for greater rewards to players and ease of discovering games.

20 Claims, 54 Drawing Sheets

Related U.S. Application Data continuation of application No. 15/428,914, filed on Feb. 9, 2017, now Pat. No. 10,632,388, which is a continuation of application No. 13/889,274, filed on May 7, 2013, now Pat. No. 10,543,422, and a continuation of application No. 13/889,266, filed on May 7, 2013, now Pat. No. 9,604,132, and a continuation of application No. 13/889,276, filed on May 7, 2013, now Pat. No. 9,889,373, and a continuation of application No. 13/889,284, filed on May 7, 2013, now Pat. No. 9,597,586.

(60) Provisional application No. 61/643,352, filed on May 7, 2012.

(51) Int. Cl.
*A63F 13/537* (2014.01)
*A63F 13/87* (2014.01)
*A63F 13/35* (2014.01)
*H04L 67/131* (2022.01)

(56) References Cited

U.S. PATENT DOCUMENTS

| | | |
|---|---|---|
| 6,478,679 B1 | 11/2002 | Himoto et al. |
| 6,699,125 B2 | 3/2004 | Kirmse et al. |
| 7,445,549 B1 | 11/2008 | Best |
| 7,628,688 B2 | 12/2009 | Hinami |
| 7,955,175 B1 | 6/2011 | Holloway et al. |
| 8,200,020 B1 | 6/2012 | Geiss et al. |
| 8,287,341 B1 | 10/2012 | Reynolds et al. |
| 8,366,546 B1 | 2/2013 | Naik et al. |
| 2002/0111216 A1 | 8/2002 | Himoto et al. |
| 2003/0008710 A1 | 1/2003 | Yamaoka et al. |
| 2003/0038805 A1 | 2/2003 | Wong et al. |
| 2003/0220143 A1 | 11/2003 | Shteyn et al. |
| 2004/0266529 A1 | 12/2004 | Chatani |
| 2005/0049022 A1 | 3/2005 | Mullen |
| 2007/0087797 A1 | 4/2007 | Van Luchene |
| 2008/0004117 A1 | 1/2008 | Stamper et al. |
| 2009/0307226 A1 | 12/2009 | Koster et al. |
| 2010/0062840 A1 | 3/2010 | Herrmann |
| 2010/0160038 A1 | 6/2010 | Youm et al. |
| 2010/0197380 A1 | 8/2010 | Shackleton |
| 2010/0216553 A1 | 8/2010 | Chudley et al. |
| 2010/0228614 A1 | 9/2010 | Zhang et al. |
| 2011/0018868 A1 | 1/2011 | Inoue et al. |
| 2011/0034246 A1 | 2/2011 | Amitzur |
| 2011/0201414 A1 | 8/2011 | Barclay et al. |
| 2011/0320401 A1* | 12/2011 | Mahajan .............. A63F 13/00 707/614 |
| 2012/0072855 A1 | 3/2012 | Baldwin et al. |
| 2012/0077586 A1 | 3/2012 | Pishevar |
| 2012/0184363 A1 | 7/2012 | Barclay et al. |
| 2012/0220377 A1 | 8/2012 | Cantor |
| 2012/0254764 A1 | 10/2012 | Ayloo et al. |
| 2013/0006709 A1 | 1/2013 | Kosta |
| 2013/0035164 A1 | 2/2013 | Osvald et al. |
| 2013/0097517 A1 | 4/2013 | Reiss et al. |
| 2013/0103447 A1 | 4/2013 | Melander et al. |
| 2013/0141325 A1 | 6/2013 | Bailey |
| 2013/0184064 A1 | 7/2013 | Manning et al. |
| 2013/0196732 A1* | 8/2013 | Oochi ................ A63F 13/69 463/17 |
| 2013/0326563 A1* | 12/2013 | Mulcahy ............. G06F 3/017 725/61 |
| 2014/0004951 A1 | 1/2014 | Kern et al. |
| 2014/0038721 A1 | 2/2014 | Archer et al. |

OTHER PUBLICATIONS

Madden NFL Cooperative Multiplayer Impressions: Ready on Three, Teamwork!, retrieved from http://kotatu.com/5567763/madden-nfl-11-cooperative-multiplayer-impressions-ready-on-three-teamwork on Oct. 10, 2016, 5 pgs.

TAPSCAPE, Clash of Clans Strategy Guide, retrieved from www.tapscape.com/clash-of-clans-strategy-guide/ on Apr. 13, 2016, 9 pgs.

* cited by examiner

3200

3300

3400

MULTILAYER FRAMEWORK ARCHITECTURE AND USER INTERFACE FOR VIDEO GAMING APPLICATIONS

CROSS REFERENCE TO RELATED APPLICATIONS

This application is a continuation of U.S. patent application Ser. No. 16/740,289, titled "Multilayer Framework Architecture and User Interface for Video Gaming Applications," filed Jan. 10, 2020, which is a continuation of U.S. patent application Ser. No. 15/428,914, titled "Multilayer Framework Architecture and User Interface for Video Gaming Applications," filed Feb. 9, 2017, which is a continuation of U.S. patent application Ser. No. 13/889,276, titled "Multilayer Framework and Architecture with Variable Video Gaming Capabilities," filed May 7, 2013, and which is a continuation of U.S. patent application Ser. No. 13/889,266, titled "Video Gaming Platform and User Interface," filed May 7, 2013, and which is a continuation of U.S. patent application Ser. No. 13/889,274, titled "Providing Synchronized and Integrated Video Gaming," filed May 7, 2013, and which is a continuation of U.S. patent application Ser. No. 13/889,284, titled "Providing Video Gaming Action Via Communications In A Social Network," filed May 7, 2013, each of which incorporate each other by reference and each of which claim the benefit under 35 U.S.C. § 119(e) of U.S. Provisional Application No. 61/643,352, entitled "Multilayer Framework Architecture and User Interfaces for Video Gaming Applications", filed on May 7, 2012, the entire contents of all of which are incorporated herein by reference in their entireties.

BACKGROUND

The present disclosure relates to video gaming platforms and applications, including those accessed via online or digital services or communities, for example, social networks, or directly via hosted websites, dedicated either wholly or partially for the purpose of implementing video gaming applications. In particular, the present disclosure relates to multilayer system framework and architecture with variable video gaming capabilities.

In recent years, video games have become extremely popular. Video games are used not only for entertainment, but also for instructional purposes. Players typically interact with a gaming application through computer or console peripherals such as keyboard, mouse, joysticks, a wide variety of game pads, and funny controllers such as the NES Zapper®. More recently, nontraditional controller technologies such as dance pads, the Wii-Mote® or the Kinect®, offering new types of gaming experiences are beginning to emerge. These technologies are capable of enhancing games to incorporate movement, creating a new experience and attracting new audiences.

With the popularity of social networks reaching epic proportions, social games have also become very popular.

With the ongoing trends and exponential growth in video gaming, it would certainly be beneficial to find better architectures for gaming applications that continue to enhance the user experience.

SUMMARY

The present disclosure overcomes the deficiencies and limitations of the prior art by providing a technology with a flexible architecture for video gaming applications. In some embodiments, the flexible architecture provides a continuous visual experience for players across different platforms (platform agnostic) and engages them at different levels. Each of the players may have a unique and different visual experience, depending upon the gaming platform a player uses. The architecture facilitates access to video gaming applications in various ways, including 1) via social networks or sites, for example, accessed via personal computers or laptops; 2) via wall posts or via an online social networking service that enables its users to send and read text-based posts; 3) via mobile devices (iOS®, Android™, or Windows-based smart phones); and 4) via game consoles (for example, PS3®, Xbox 360®, or Wii®).

In some embodiments, the present disclosure overcomes the deficiencies and limitations of the prior art by providing a technology with a synchronized and integrated architecture for video gaming applications. In some embodiments, the synchronized and integrated architecture provides a continuous visual experience for players across different platforms (platform agnostic) and engages them at different levels as they access a particular game from the different platforms. In some instances, each of the players may have a unique and different visual experience, depending upon the gaming platform a player uses. The architecture facilitates access to video gaming applications via personal computers, via mobile devices, via game consoles, via tablets or the like. In some instances, a single player can play a particular game including a main component and a sub-component from the different platforms, where play in the sub-component is seamlessly integrated into the main component.

Video gaming applications may be purchased via platform application stores. These applications are supported by Android (Android is a Linux-based operating system for mobile devices such as smartphones and tablet computers—it is developed by the Open Handset Alliance), iOS (a mobile operating system developed by Apple Inc.) platforms, and phones operating windows. The user interface of an iOS platform is based on the concept of direct manipulation, using multi-touch gestures. Interface control elements consist of sliders, switches, and buttons. The response to user input is immediate and provides a fluid interface.

Video gaming applications (e.g., in association with social networks) may be hosted or accessed via social networks, other third-party services or on third-party servers, stand-alone platforms, tablets, smartphones or the like. Multiple players (hundreds, thousands, if not millions) may access gaming applications via any or all of these ways. In addition, the flexible architecture provides a scalable infrastructure with cross-platform pollination technology (achievements and rewards are transferred between platforms used by particular players) and secure collection of data. Video gaming applications may be based on universal themes that appeal to a broad range of demographics and provides a continuous flow of data analytics. They offer opportunities for configuring advertisements and promotions to accomplish strategic goals.

In some embodiments, the flexible (and/or synchronized and integrated) architecture provides multiple levels of play, permitting players to engage in different ways from different platforms or a single player to engage from multiple platforms. The different levels of play options include 1) a peer-to-peer competitive challenge level for core players, 2) a casual play option for play with friends with whom a player shares an affinity, for example, in a social network; and a 3) spectator mode that permits non-players in a network to assist friends. Feed-based triggers allow for greater rewards to players and ease of discovering games.

In yet other embodiments, which may include any or all of the aspects described above, the flexible architecture permits mobile play, extending the gaming arena or world to different platforms, so achievements in a particular game may be earned and shared more easily across platforms. In addition, a player may earn location-based rewards.

Moreover, the flexible architecture provides a system of rewards at check-in, to coax players by providing greater incentives. The flexible architecture permits concurrent "solo" play by a player or gamer, collaborative and competitive play by multiple players. The flexible architecture has user interfaces that are configured to provide different experiences for different players, including for example, a three-dimensional user experience. In some embodiments, the video gaming applications include story-driven quests and game play, giving players more than just tasks and chores. As one example, an aviation gaming application may utilize a collection of two hundred and fifty or more aircrafts and include transactions relating to the aircrafts and their environment, creation of the environment in which the aircrafts operate, etc. In this particular application, players may create and manage their experience (for example, build and manage an aviation empire), enjoy the thrill of history (aviation's past), and travel the globe and fly through an open network of friendly and rival airports.

In yet other embodiments, the system provides a plurality of features for player control of the virtual arena including control of "play" times, "gifts" and "rewards," "collect" and "decorate" features, monitor types of "play" (for example, acceleration progress), generate user content, etc.

In some embodiments, the video gaming applications may be free, when accessed via social-network platforms, in which instances revenue is generated via market place for products used during the game, direct advertising, etc. The flexible architecture permits for easy access through a particular player's social network, allowing other players to discover a particular game and permit conversion as necessary.

In yet other embodiments, linking or connecting platforms creates a more interesting gaming world.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
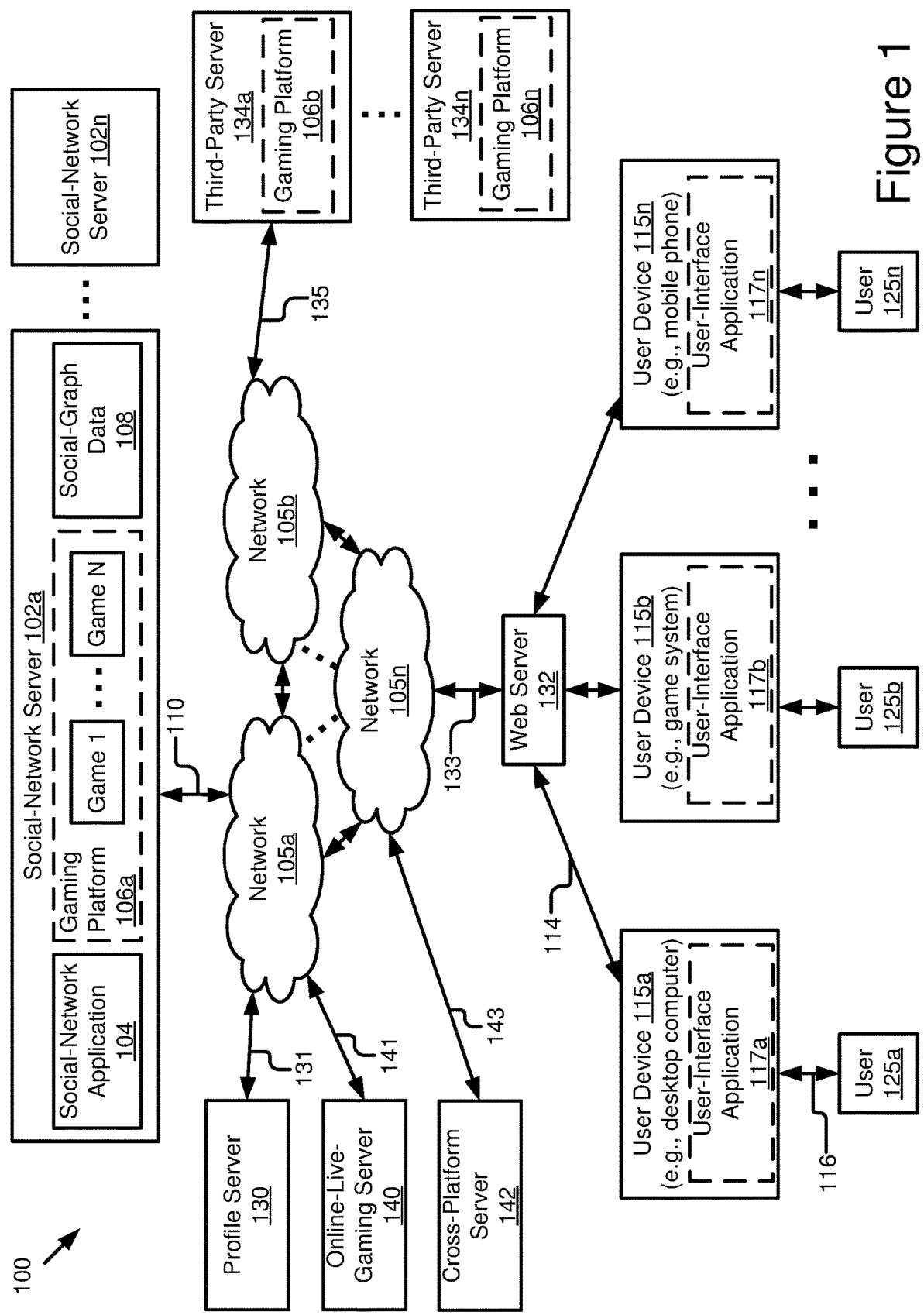
FIG. 1 is a high-level block diagram illustrating some embodiments of a system architecture for providing video gaming platforms, accessed either via a social network (hosted on a social network server or a server associated with it), an online or digital live gaming server, or a third-party video gaming website (hosted by a third party on its server).

The present technology is directed to a video gaming platform and multilayer or multi-tier architecture or framework for video games or video gaming applications with variable video gaming capabilities accorded to players or gamers. The video games are for play by users (players or gamers), accessed either via social networks, or directly, on games hosted by third party servers, or otherwise in a cloud or coordinated web sites etc. The specification describes examples of the video gaming platform and user interfaces that facilitate a unique user experience and methods involved in the platform and user interface and for operating them to facilitate play by remotely located players or gamers. These video gaming applications referenced or described here may either be hosted by an online community, for example, one or more social networks, or alternatively, by third party servers that are wholly or partially dedicated to gaming applications.

In some embodiments, the flexible and multilayer architecture provides a continuous game and visual experience for players across different platforms (platform agnostic) and engages them at different levels of play and capability. Each of the players may have a unique and different gaming experience, depending upon the level of play and capability accorded to each player. This flexible architecture facilitates access to video gaming applications in various ways, including 1) via social networks or sites, for example, accessed via personal computers (desktops or laptops); 2) via wall posts or via an online social networking service that enables its users to send and read text-based posts; 3) via mobile devices (iOS, Android, or Windows-based smart phones); and 4) via game consoles (for example, PS3, Xbox 360, or Wii).

Video gaming applications may be purchased via platform application stores. These applications are supported by Android (Android is a Linux-based operating system for mobile devices such as smartphones and tablet computers— it is developed by the Open Handset Alliance), iOS (a mobile operating system developed by Apple Inc.) platforms, and phone operating windows. The user interface of iOS is based on the concept of direct manipulation, using multi-touch gestures. Interface control elements consist of sliders, switches, and buttons. The response to user input is immediate and provides a fluid interface.

Video gaming applications may be hosted or accessed via social networks, other third party services or on third party servers, stand-alone platforms, tablets, smartphones, or the like. Multiple players (hundreds, thousands, if not millions) may access gaming one or more applications via any or all of these ways. In addition, the flexible architecture provides a scalable infrastructure with cross-platform pollination technology (achievements and rewards are transferred between platforms for particular players depending on their status) and secure data collection. Video gaming applications may be based on universal themes that appeal to a broad range of demographics and provides a continuous flow of data analytics. They offer opportunities for configuring advertisements and promotions to accomplish strategic goals.

In some embodiments, the flexible architecture provides multiple levels of play, permitting players to engage in different ways and at different levels. The different levels of play options include 1) a peer-to-peer competitive challenge level for "core" players, 2) a "casual" play option for play with friends with whom a particular player shares an affinity, for example, in a social network; and 3) a "spectator" mode that permits non-players in a network to assist friends. Feed-based triggers allow for greater rewards to players and ease of discovering games.

In yet other embodiments, which may include any or all of the aspects described above, the architecture permits play via mobile devices, extending the gaming arena or world to different environments, so achievements in a particular game may be earned and shared more easily across environments, depending upon player status. In addition, a player may earn location-based rewards.

Moreover, the system provides rewards at check-in, to coax players by providing greater incentives. The architecture permits for concurrent "solo" play by a player or gamer and collaborative and competitive play between multiple players. User interfaces are configured to provide different experiences for different players, including a three-dimensional user experience in some environments. In some embodiments, the video gaming applications include story-driven quests and game play, giving players more than just tasks and chores. As one example, a "core" player in an aviation gaming application, may utilize a collection of 250 aircrafts and include transactions relating to the aircrafts and its environment, to create an environment in which the aircrafts operate, etc. In this particular application, "core" players may create and manage their experience (for example, by creating an aviation empire), enjoy the thrill of history (aviation's past), and travel the globe and fly through an open network of friendly and rival airports. Other players, for example, "followers" may be accorded more restricted play and capability.

The system provides variable features for player control (depending upon player status) of the virtual arena (e.g., associated with a social network) including control of "play" times, "gifts" and "rewards," "collect" and "decorate," monitor "play" (for example, acceleration progress), generate user content, etc.

The video gaming applications may be free, when accessed via social-network platforms, in which instances revenue is generated via market place for products used during the game, direct advertising, etc. The flexible architecture permits for easy access through a particular player's social network, allowing other players to discover a particular game and permit conversion as necessary. Linking or connecting platforms creates a more interesting and viable gaming world.

In some implementations, the architecture accords variable status to players who can opt for different levels of play. A "core" game play status enables players to be "leaders" and play the entire game. A leader has control of all aspects of a particular gaming application. A "casual" or "follower" game play status enables players to play from a different perspective, providing access to only a portion of the entire game. A "spectator" or "bystander" game play enables players to play from a reactive perspective. Players are accorded this status when they initiate play via a social network wall posting, a response to a social networking service facilitating exchange of text or via any other key word response, which has direct impact on game play. Players with this status can request permission to visit game play arenas of other players. This request may be in response to advertising or promotion displays.

Players (with any status described above) may access game play via mobile devices, at any location, and receive location-based rewards. They may access a virtual game arena, their own or that of other players, via several platforms and take up play where they left off. They may link up friends for collaborative play. Players may also participate in standalone game play, via tablets, mobile devices, console-based game play, target-based game play or the like. In addition, the system permits cross-pollination game play, sending game objects from one game world or arena to another.

In the following description, for purposes of explanation, numerous specific details are indicated in order to provide a thorough understanding of the technology described. This technology may be practiced without these specific details. In the instances illustrated, structures and devices are shown in block diagram form in order to avoid obscuring the technology. For example, the present technology is described with some implementations illustrated below with reference to user interfaces and particular hardware. However, the present technology applies to any type of computing device that can receive data and commands, and any devices providing services. Moreover, the present technology may be described below primarily in the context of providing video game architecture; however, the present technology applies to any type of situation and may be used for other applications beyond video games. In particular, this technology may be used in other contexts besides video games. The present technology may be described below primarily in the context of video gaming applications configured to enhance and improve the quality of these gaming applications in order to facilitate synchronous play by hundreds, thousands, if not millions of players. The players may enjoy different user experiences based on their individual preferences and may enjoy seamless play across different gaming platforms or devices (desktop computer, mobile device or the like). However, those skilled in the art should understand that the present technology applies to any type of application and can be used for other applications beyond gaming applications. The present technology may be described below primarily in the context of video gaming applications configured to enhance and improve the quality of these gaming applications in order to facilitate synchronous play by hundreds, thousands, if not millions of players.

The players may enjoy different user experiences based on their individual preferences and may enjoy seamless play across different gaming platforms or devices (desktop computer, mobile device or the like). However, those skilled in the art should understand that the present technology applies to any type of application and can be used for other applications beyond gaming applications.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment or instance" in various places in the specification are not necessarily all referring to the same embodiment or instance.

Some portions of the detailed descriptions that follow are presented in terms of algorithms and symbolic representations of operations on data bits within a computer memory of either one or more computing devices. These algorithmic descriptions and representations are the means used to most effectively convey the substance of the technology. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms, for example, "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may include a general-purpose computer selectively activated or reconfigured by a computer program stored in the computer. For example, a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware implementation, an entirely software implementation, or an implementation including both hardware and software components. In some instances, this technology is implemented in software, which includes but is not limited to firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code may be retrieved from bulk storage during execution.

Input/output or I/O devices (including but not limited to keyboards, displays, pointing devices, etc.) may be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

Example Architecture Overview

FIG. 1 is a high-level block diagram illustrating some embodiments of systems for providing gaming applications, either via social networks, an online live gaming server, or on third party servers. The system 100 illustrated in FIG. 1 provides gaming platforms 106a or 106b so that participants (players or gamers) may access one or more gaming applications, initiate a play on one device or gaming platform and continue play at another device or gaming platform, making transitions between devices or platforms essentially seamless and enabling a continuous playing experience.

The system 100 includes one or more social network servers 102a through 102n that may be accessed via user devices 115a, 115b through 115n, which are used by users 125a, 125b, through 125n, to connect to any one of the social network servers 102a through 102n. The user devices 115a through 115n may be a desktop computer, a game system or a mobile phone. These entities (user devices 115a-115n and social network servers 102a-102n) are communicatively coupled via one or more networks 105a, 105b, and 105n. Although only three user devices or platforms 115a, 115b through 115n are illustrated, any numbers of user devices or platforms 115n may be used by any number of users (players, gamers, or the like) 125n. Moreover, those skilled in the art should recognize that while the present disclosure is described below primarily in the context of providing gaming applications, the present disclosure may be applicable to other types of applications, for entertainment or otherwise. As some examples, gaming applications may include operations for creating plays, participating in plays, etc.

The user devices 115a through 115n in FIG. 1 are illustrated by way of example. Although FIG. 1 illustrates only three devices, the present disclosure applies to any system architecture having one or more user devices 115a through 115n (with user-interface applications 117a through 117n), therefore, any number of user devices 115n (hundreds, thousands, even millions or more) may be used.

Furthermore, while only three networks 105a, 105b, and 105n are illustrated as coupled to the user devices 115a, 115b through 115n, the social network servers 102a-102n, the profile server 130, the web server 132, the online live gaming server 140, the cross-platform server 142, and one or more third party servers 134a through 134n, in practice, any number of networks 105n may be connected, either directly or indirectly, to these entities. In addition, although only two third party servers 134a through 134n are shown, the system architecture 100 may include one or more third party servers 134n, each with a gaming platform 106b through 106n, operating one or more gaming applications that are similar or different.

In some embodiments, the social network server 102a is coupled to the network 105a, via a signal line 110. The social network server 102a includes a social network application 104, which comprises the software routines and instructions to operate the social network server 102a and its functions and operations. Although only one social network server 102a is described here, persons of ordinary skill in the art should recognize that multiple servers may be present, as illustrated by social network servers 102n, each with functionality similar to social network server 102a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system architecture 100, including explicitly-defined relationships and relationships implied by social connections with other online users, where the relationships form a social graph 108.

The term "social graph" as used here encompasses its plain and ordinary meaning including, but not limited to, a set of online relationships between users (players and non-players), such as provided by one or more social networking systems, operating on social network servers 102a through 102n, including explicitly-defined relationships and relationships implied by social connections with other online users, where the relationships form a social graph. In some examples, the social graph 108 may reflect a mapping of these users and how they are related.

It should be understood that social network server 102a and the social network software/application 104 are representative of a single social network. Each of the plurality of social networks 102a through 102n is coupled to any one of the networks 105a, 105b, and 105n, each having its own server, application, and social graph. For example, a first social network system operated or hosted on a social network server may be directed to business networking, a second directed to or centered on academics, a third directed to local business, a fourth directed to dating or gaming, and yet others directed to other general interests or perhaps a specific focus. Yet, each may provide access to a gaming platform 106a for operating or providing access to video gaming applications.

A profile server 130 is illustrated as a stand-alone server in FIG. 1. In other embodiments of the system architecture 100, all or part of the profile server 130 may be part of the social network server 102a. The profile server 130 is directly connected to the network 105a, via a line 131. The profile server 130 stores profiles for all the users that belong to a social network. A third party server 134a is connected to the network 105b, via a signal line 135. A web server 132 is connected, via a line 133, to the network 105n. The web server 132 delivers access to content, via the internet, for example, by hosted websites or the like. Users may use the web browsers on their electronic devices or gaming platforms to browse for gaming applications and access websites hosting gaming applications. An online-live-gaming server 140 is connected to the network 105a by line 141 and a cross-platform server 142 is connected to a network 105n by line 143. The cross-platform server 142 may serve as a gateway to different servers and accommodating access by different user platforms.

An online live gaming server 140 is an online multiplayer gaming and digital media delivery service connected to the network 105a through 105n via signal line 141 for providing users (i.e., players) with online gaming capabilities. This allows users to interact (e.g., play games) with multiple players (hundreds, thousands, if not millions) via the online live gaming server 140 (e.g., Xbox Live, PlayStation Network, etc.).

A cross-platform server 142 is an online server connected to the network 105a through 105n via signal line 143 that receives information from one or more clients (e.g., mobile device, social network, gaming server, etc.) and translates the data such that it becomes usable by the gaming platform 106a through 106n. The cross-platform server 142 also translates information from the gaming platform 106a through 106n such that it becomes usable by the one or more clients (e.g., mobile device, social network, gaming server, etc.).

The user devices or player gaming platforms 115a through 115n can be a computing device, for example, a laptop computer, a desktop computer, a tablet computer, a mobile telephone (iOS, Android, or windows-based phone, a personal digital assistant (PDA), a mobile email device, a portable game player, a game console (PS3, Xbox 360, Wii or the like) a portable music player, a television with one or more processors embedded in the television or coupled to it, or any other electronic device capable of accessing a network and participating in a gaming application. The user devices 115a through 115n include user-interface applications indicated by reference numerals 117a, 117b, through 117n.

The network 105a, 105b, or 105n, is of conventional type, wired or wireless, and may have any number of configurations, such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105a, 105b, or 105n may be a peer-to-peer network. The network 105a, 105b, or 105n may also be coupled to or include portions of one or more telecommunications networks for sending data in a variety of different communication protocols.

In yet another embodiment, the network 105a, 105b, or 105n, includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network server 102a, the profile server 130, the web server 132, the online-live-gaming server 140, and cross-platform server 142, and the third party servers 134a through 134n are hardware servers including a processor, memory, and network communication capabilities. One or more of the users (players or gamers) 125a through 125n access any of the social network servers 102a through 102n, or the third party servers 134a through 134n, or any of the other servers, via browsers in their user devices or gaming platforms and via the web server 132. The user devices 115a through 115n have user interface applications 117a, 117b, through 117n, that manage access by particular players to select gaming applications or their choice.

Figure 2:
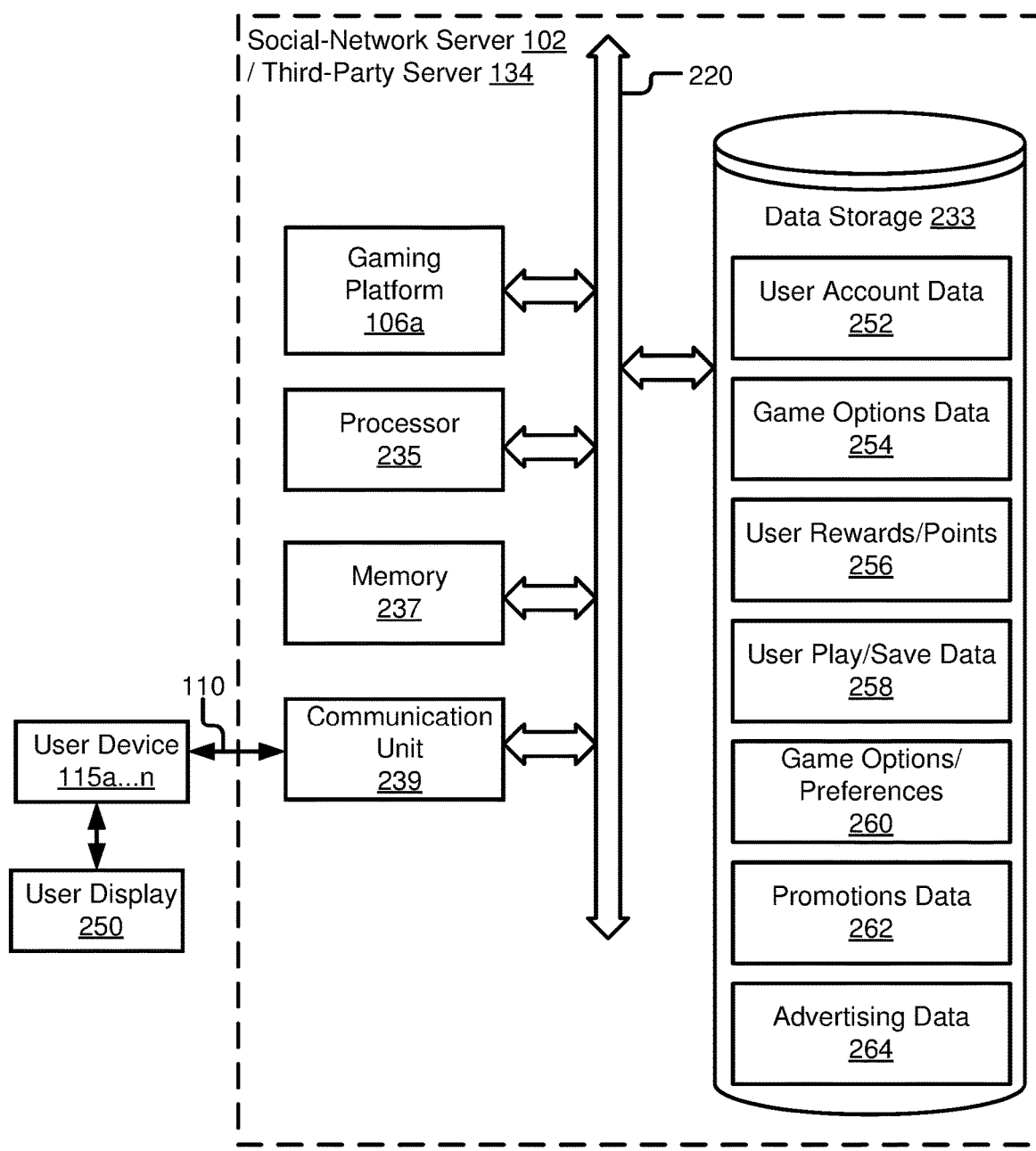
FIG. 2 is a block diagram illustrating some embodiments of a social network server or a third party server shown in FIG. 1, including its hardware components.

FIG. 2 is a block diagram illustrating some embodiments of the social network server 102 (a through n) or third party server 134 (a through n) or any other server hosting a gaming environment. In FIG. 2, like reference numerals have been used to reference like components with the same or similar functionality that has been described above with reference to FIG. 1. Since those components have been described above that description is not repeated here. The social network server 102a generally comprises one or more processors, although only one processor 235 is illustrated in FIG. 2. The processor is coupled via a bus 220 to memory 237 and database storage 233, which stores user account data 252, game options data 254, user rewards/points 256, user play/save data 258, game options/preferences 260, promotion data 262 and advertising data 264.

In some embodiments, the database storage 233 is a database organized by the hosting server and the user or either one. For each user or player, the data storage 233 stores data on the user and user game plays, etc. For example, this data may include related social network activity such as posts, shares, invitations, status changes, etc., associated with each user engaged in a video gaming application.

A user or player 125a, via a user or gaming device 115a, communicates a request to initiate a gaming application or reacts to a keyword via communication unit 239. The "set up" for a video gaming application is managed by the gaming platform 106a. It should be recognized that the gaming platform 106a (illustrated in the social network server 102a) and 106b (illustrated in the third party server 134a) are shown separately, but include similar functionality, at least for purposes of operating the gaming applications. A user or player display 25 coupled to the user device 115a through n, is configured to provide the video source of the gaming application in one of many formats, high definition graphics, three dimensional formats, etc.

Figure 3:
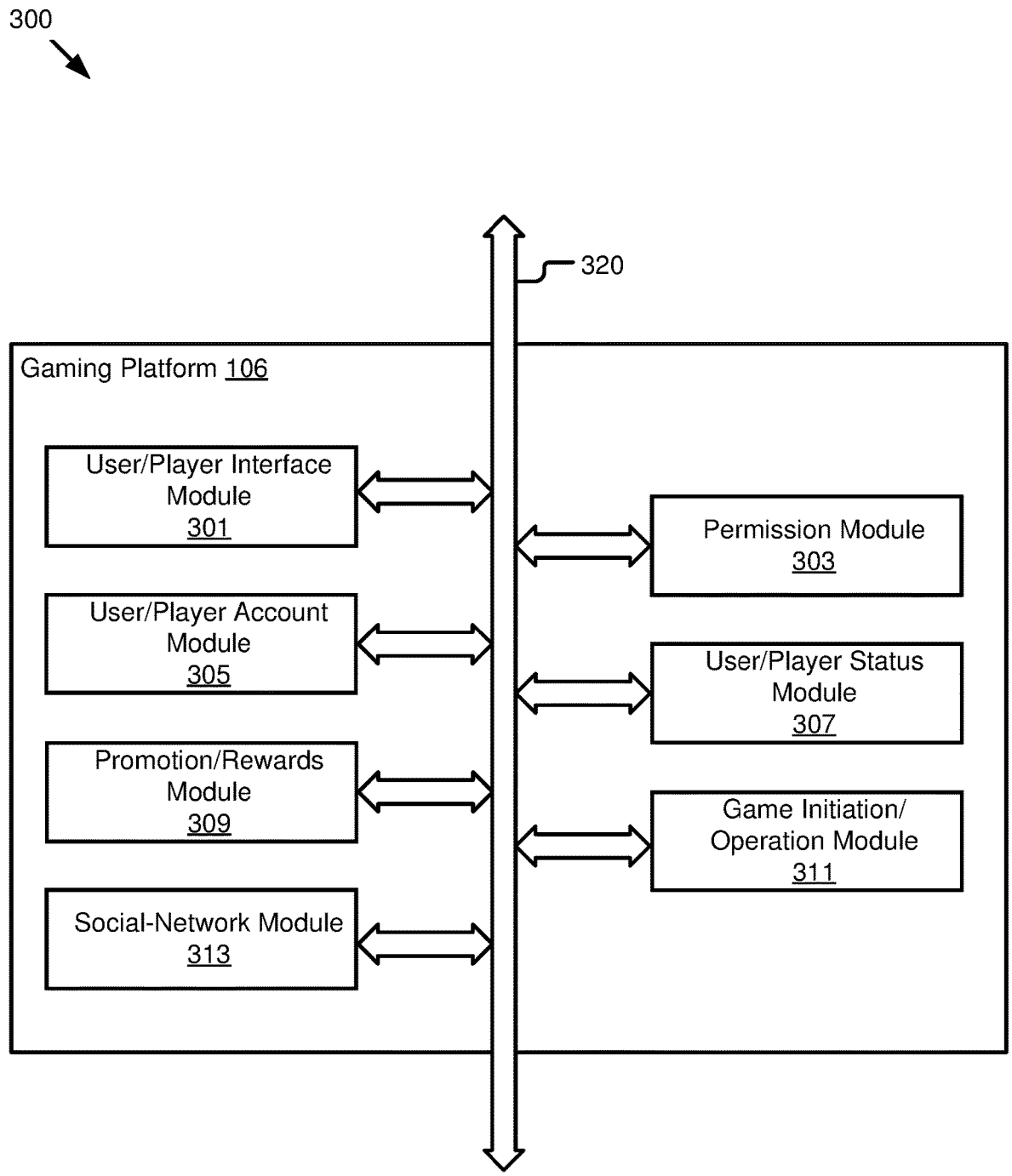
FIG. 3 is a block diagram illustrating some embodiments of a gaming platform shown in FIGS. 1 and 2, and its software components.

Referring now to FIG. 3, like reference numerals have been used to reference like components with the same or similar functionality that has been described above with reference to FIG. 1. Since those components have been described above, that description is not repeated here. The gaming platform or environment 106 (a or b) includes various modules that are programmed to perform the functionalities described here. These modules may be variously distributed or may be in a single unit. The gaming platform 106 includes a user/player interface module 301, a permissions module 303, a user/player account module 305, a user/player status module 307, a promotion/rewards module 309, a game initiation/operation module 311, and a social-network module 313. Each of these modules is coupled to a software communication mechanism 320 to communicate the other modules. Examples of a software communications mechanism 320 may be an object bus (such as COBRA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, such as a network, the Internet, a bus 220 of FIG. 2, or a combination thereof, etc.

By way of example, a particular user 125a communicates via a user device 115a, to either initiate or react to a game play. The user interface module 301 facilitates a connection of the user device 115a with the social network server 102a, in the event the player wishes to engage or participate in a gaming application via the social network server 102a. The permission module 303 ensures that the user device is compliant with protocols and any privacy concerns. Once a video gaming application has been set up, the user/player account module 305 makes a note of the user to determine if the user has an existing account or must create one. The user/player status module 307 considers the status of the various users ("leader," "follower," or "spectator"). A promotion/rewards module 309 operates the necessary promotions permitting players to earn rewards accorded by the promotions. The game initiation/operation module 311 initiates play and the social network module 313 tracks the applications engaged by a particular player and updates the player's social profile accordingly.

Example Methods

Figure 4:
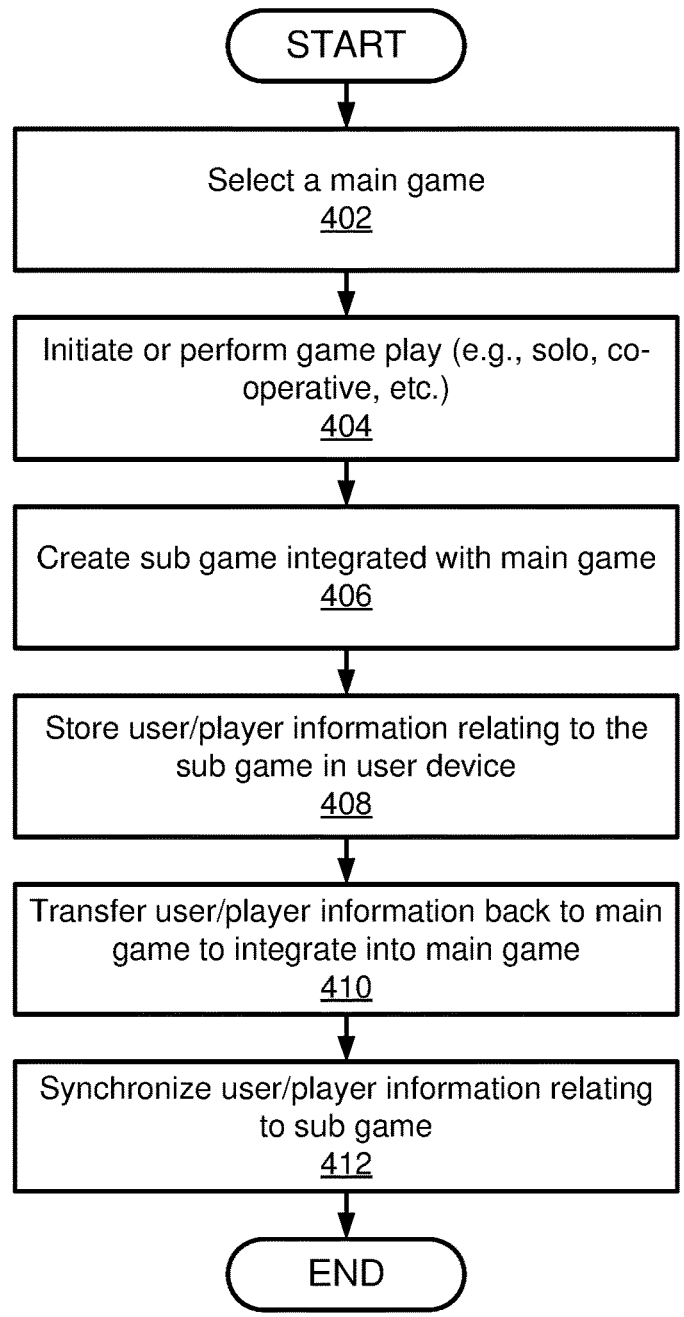
FIG. 4 is an example flow chart illustrating an example general method for creating or branching off a sub game.

FIG. 4 is a flow chart illustrating one example method 400 for one or more users (players or gamers) to select a "main" game and branch off for playing a portion of the "main" game. The method 400 begins with selecting a "main" game at block 402, and initiating a game play, for either "solo" play or collaborative or cooperative play, illustrated by block 404. The method 400 proceeds to the next block 406, at which point, one or more players (with their user devices) create one or more sub games based on the "main" game or branching off from the "main" game. As explained above, players may pursue a particular aspect of the "main" game, separately, either via the same player device, or via another user device (for example, move from a desktop or dedicated game console, to a mobile device, for example, a smartphone).

The method 400 proceeds to block 408, at which stage, user information relating to the sub game is stored on the user device. At block 410, the method 400 proceeds and transfers the user information to the "main" game. Finally, the method 400 proceeds to block 412, at which stage, the "main" game is synchronized with the user information obtained from the sub game.

Figure 5:
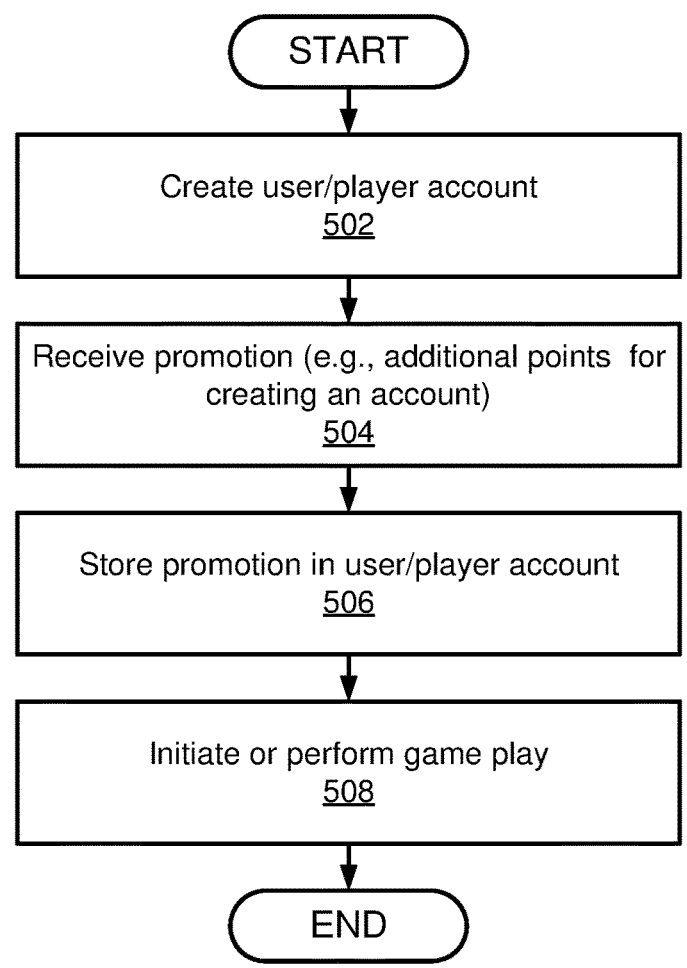
FIG. 5 is an example flow chart illustrating an example method for obtaining a promotion.

Referring now to the flow chart illustrated in FIG. 5, an example method for obtaining a promotion is described. As described above, video gaming applications may be used in conjunction with promotions or advertising in order to coax players to purchase products or services that are either related to the gaming applications or otherwise. The user interface is configured to provide rewards to players upon receiving the promotions or advertising. The example method 500 illustrated here begins at block 502, where user or player accounts are created when a user or player decides to initiate play of a particular gaming application. The player then participates in the promotion, for example, by viewing the particulars of a promotion (advertising on a product or service), and receives additional points for creating an account, as indicated at block 504. The method 500 proceeds to block 506, where the promotion is stored into the particular player's account and at block 508 the player initiates game play.

Figure 6:
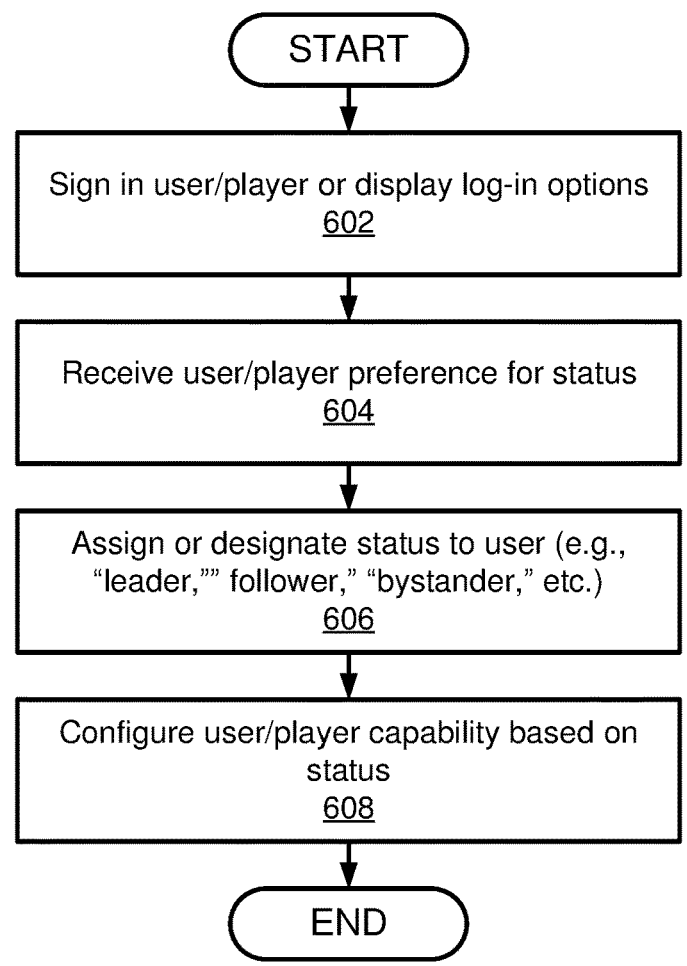
FIG. 6 is an example flow chart illustrating an example method for assigning a status ("leader" or "core," "follower" or "casual," or "bystander" or "spectator") to a player.

Referring now to the flow chart illustrated in FIG. 6, some example operations for providing multiple levels of play are illustrated. In particular, FIG. 6 illustrates an example method 600 for assigning a status to a player. The method 600 begins and proceeds to block 602, at which point users are signed in. The user or player can indicate preferences for the level of play the user desires to participate at, which are received by the video gaming platform, as illustrated at block 604. The video gaming platform assigns a status to the user, at block 606, for example, designating the user as a "leader," a "follower," a "bystander" or any other designation used by the video gaming application. Each of these designations imposes limits on play associated with them. For example, as indicated above, a "leader" is permitted to play the entire game whereas a "follower" is permitted to play only a portion of the game. The video gaming platform modifies player capabilities based on user status, as illustrated at block 608. User "status" accords full play capabilities to a "leader," "restricted" or "limited" play capabilities to a "follower" and "viewing" and capability to "influence" play with keyword responses to a "bystander."

Figure 7:
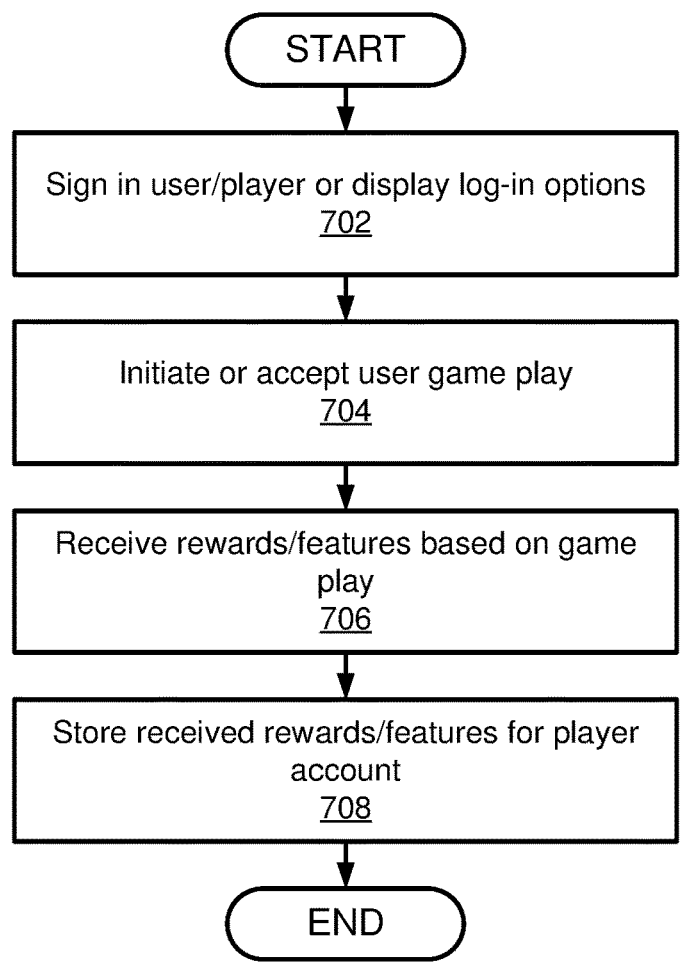
FIG. 7 is an example flow chart illustrating an example method for earning rewards or features within a game.

FIG. 7 illustrates an example method 700 for earning rewards/features within a game. The example method 700 begins and proceeds to block 702, at which stage, a user or player signs in or is displayed log-in options. The method 700 proceeds to block 704 including one or more operations for initiating or accepting user game play. The method 700 proceeds to block 706, at which stage, one or operations receive rewards and/or features for players based on game play. The method 700 proceeds to the next block 708, which includes one or more operations for storing received rewards and/or features for player accounts.

Figure 8:
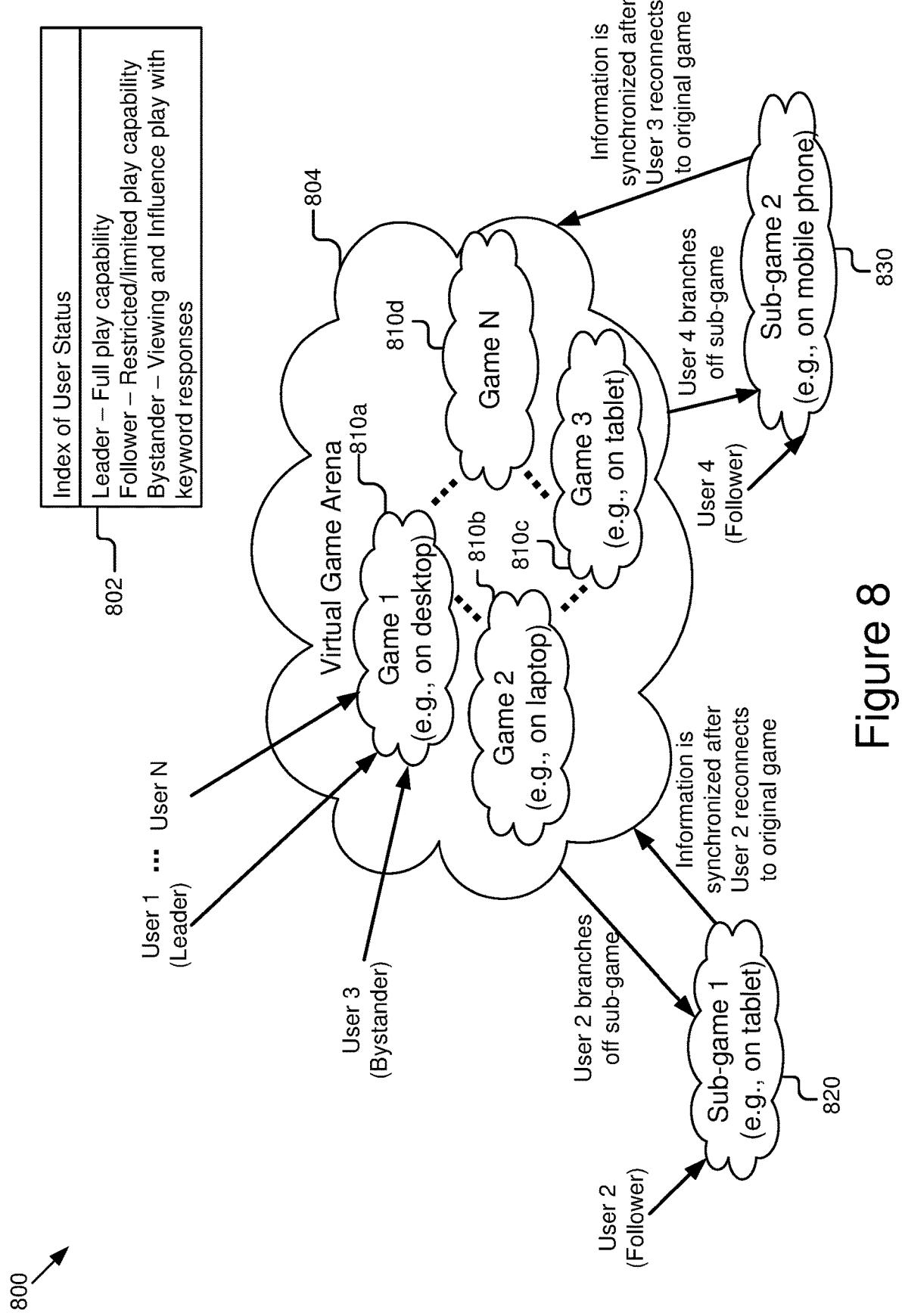
FIG. 8 is a graphical representation illustrating a virtual game arena accessed by various users with varying status and an index of user status.

FIG. 8 illustrates that multiple users, for example, Users 1, 2, 3, through N, each with a different status, for example, either "leader," "bystander," or "follower," may initiate games, for example Game 1 (indicated by reference numeral 810a), Game 2 (indicated by reference numeral 810b), Game 3 (indicated by reference numeral 810c), through Game N (indicated by reference numeral 810d). Each of these games is played in a virtual game arena 804, either individual or shared, hosted on a dedicated server or in a cloud. User 2 is illustrated as branching off a sub game 1 (indicated by reference numeral 820), for separate play. Any information accumulated during the sub game is synchronized after User 2 reconnects to the original game. A user with "bystander" status may influence the game by responding to wall posts or responding with a key word. Reward or point allocation is based on the status of the player. For example, a player playing a game (for example, a follower), receives rewards or takes away from the main game player more than a bystander does. A bystander does not receive any rewards; its role is simply to assist a friend or influence game play by a "core" player.

Figure 9:
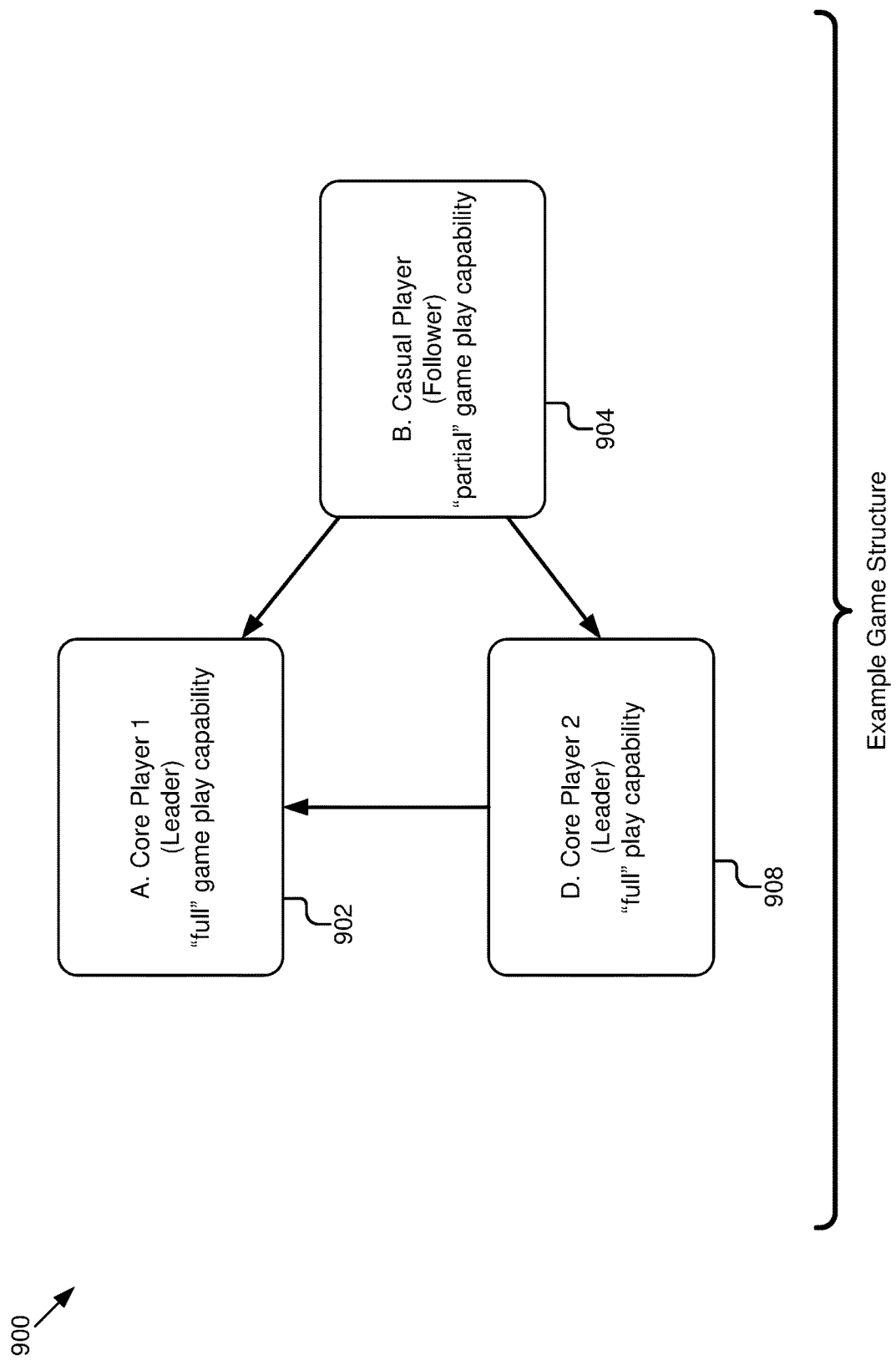
FIG. 9 is a graphical representation illustrating one example of a game structure.

FIG. 9 illustrates a video gaming scenario, with two core players 1 and 2 (at A and D), who have a "leader" status, illustrated at 902 and 908. A "casual" player or "follower" (at B) is illustrated by reference numeral 904 and has the capability to influence both the core players, as indicated by the arrows. Additionally, a "core" player, for example, Player 2, can participate as a "bystander" as well and influence another "core" player, Player 1. A non-player or "bystander" may also participate and provide keyword-based participation. All the various players interact with each other, some having larger impact (those that are "leader" or "core" players) on the play of another "core" player, whereas a "casual" player has a smaller or little impact on the play of others, and a "bystander" has even less impact.

As one example, a religious gaming application is described here. A "core" player may create his or her own church or organization. Another "core" player 2 may create his or her own church or organization as well. The "casual" player 3 may be a follower of both "core" Player 1 and Player 2, such that acts by the "follower" either enhance or detract a play by Player 1 or Player 2. For example, the "follower" Player 3 may give virtual money ($10 per day out of a $20) to each of the "core" players. Circumstances may change this flow of money, for example, "core" Player 2 upsets follower Player 3, who routes all of his virtual money to Player 1. Player 2 may retaliate against Player 3, by initiating an action against Player 1, creating a deficit in his or her account, thereby impacting the play by Player 1. Likewise, the bystander C may continue to influence plays by Player 1 or Player 2.

Figure 10:
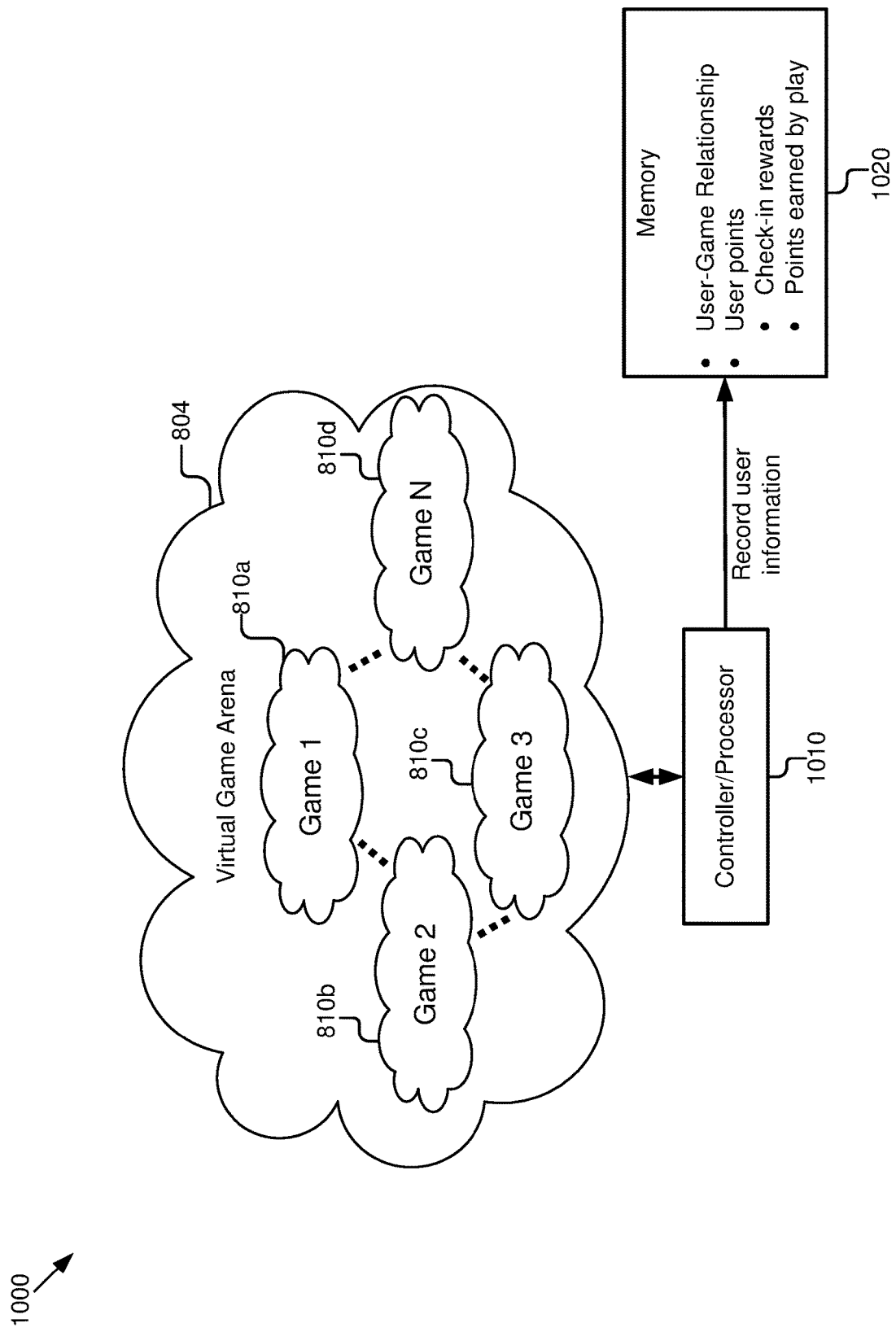
FIG. 10 is a graphical representation illustrating a virtual game arena with concurrent operation of multiple games.

FIG. 10 illustrates a gaming scenario with the virtual game arena 804 with Game 1 (indicated by reference numeral 810a), Game 2 (indicated by reference numeral 810b), Game 3 (indicated by reference numeral 810c) through Games N (indicated by reference numeral 810d) engaged by users. A user creates an account to play any of these games and may receive display of a promotion or advertisement. The user may acknowledge the promotion and instantly earn points or rewards from the game. These operations are controlled by a controller or processor 1010. User information is recorded in memory 1020. The user information may be user-game relationship data, user points (check-in rewards and points earned by play).

Figure 11:
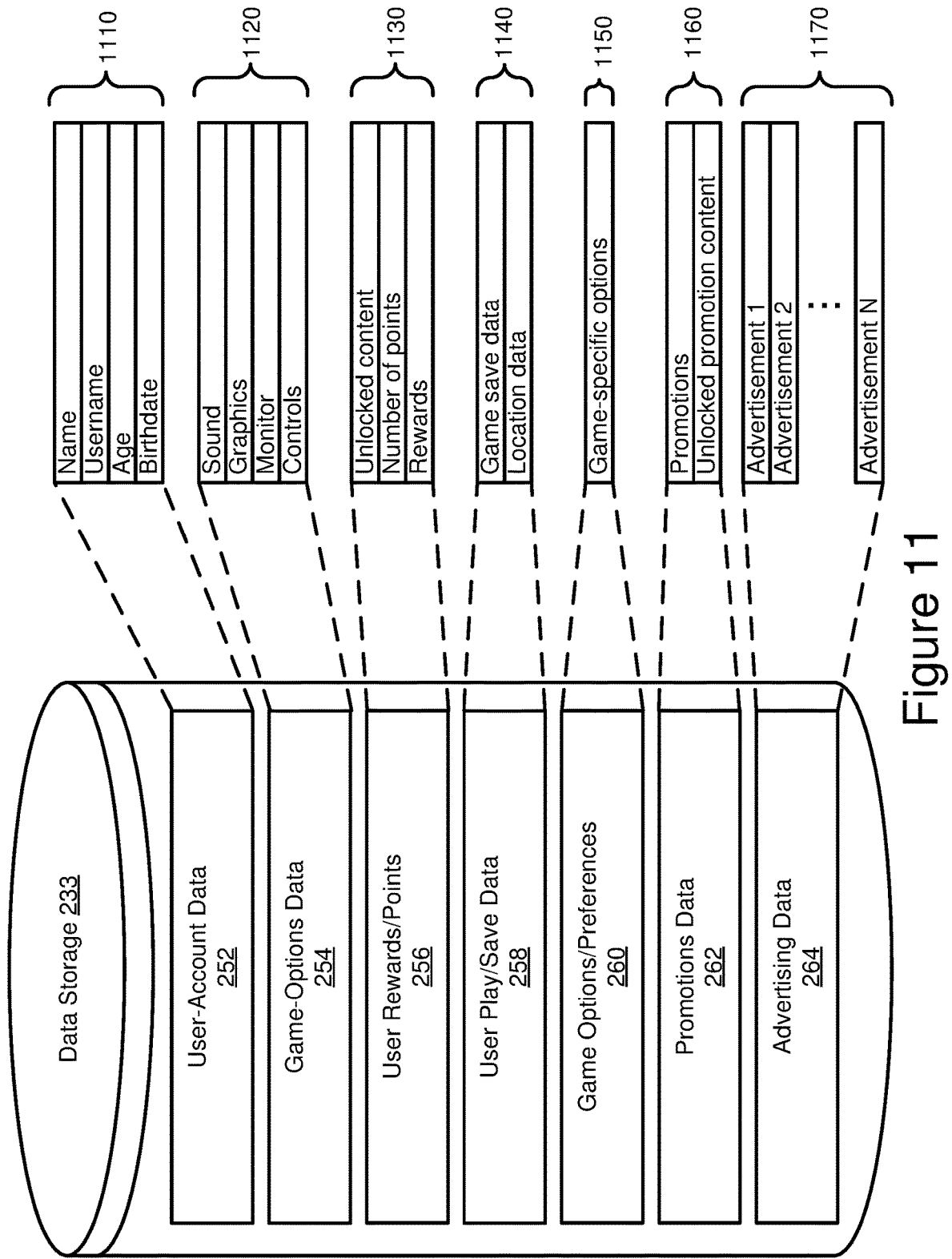
FIG. 11 is a graphical representation of a data storage configuration with storage of game-related information.

FIG. 11 illustrates an example data storage configuration. The data storage 233 may include various types of data. In a first data cell 252, the data storage 233 includes user-account data 252, which may include a name, user name, age and birthdate, all of these items indicated generally by reference numeral 1110. The data storage 233 in a second cell may include a game-options data, including data on sound, graphics, monitor, and controls, indicated generally by reference numeral 1120. The data storage 233 may include in a third cell, user rewards/points including data on unlocked content, number of points, and rewards, all of these items indicated generally by reference numeral 1130. In a fourth cell, the data storage 233 includes a user play/save data indicated by reference numeral 258 including as examples "game save" data or "location" data, both examples indicated generally by reference numeral 1160. In a fifth cell, the data storage 233 includes game options/preferences, indicated by reference numeral 260, including as one example game-specific options, indicated by reference numeral 1150. In a sixth cell, the data storage 233 may include promotions data, indicated by reference numeral 262, including as examples data on promotions, and unlocked promotion content, indicated generally by reference numeral 1160. In a seventh cell, the data storage 233 includes advertising data, indicated by reference numeral 264, which may include data on advertisements 1, 2, through N, all of this data indicated generally by reference numeral 1170.

Figure 12:
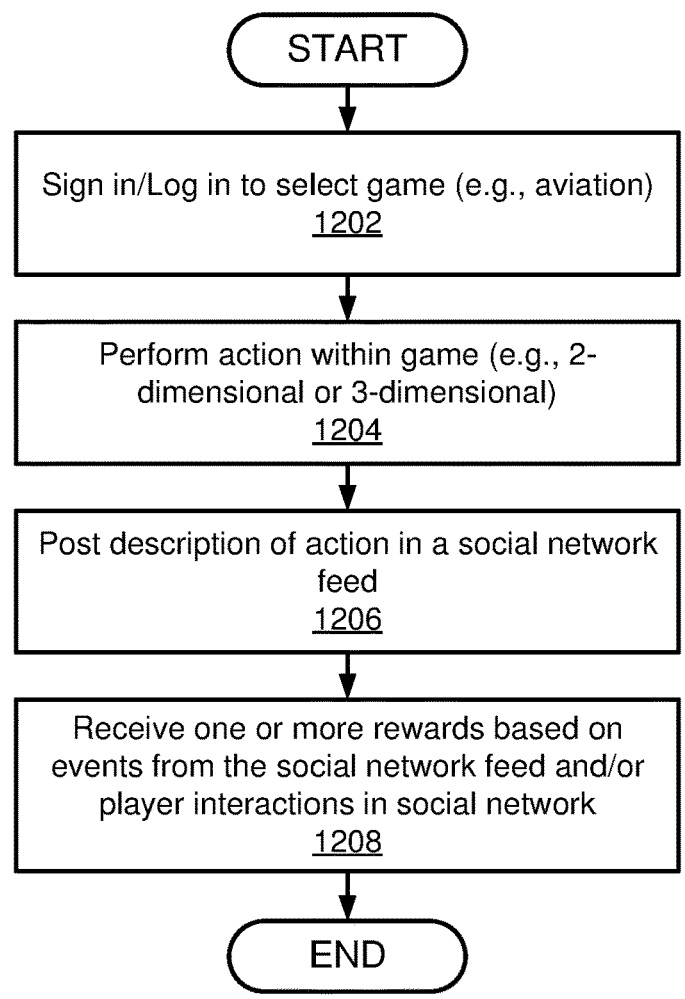
FIG. 12 is a flow chart illustrating an example method for game play, in this instance an aviation game.

FIG. 12 illustrates an example method for aviation game play. It should be understood that the order of the operations in FIG. 12 is merely by way of example and may be performed in different orders than those that are illustrated and some operations may be excluded, and different combinations of the operations may be performed. In the example method illustrated, one or more operations may include signing in/logging in to a select game (for example, an aviation game), as illustrated by block 1202. The method 1200 then proceeds to the next block 1204 and may include one or more operations to perform an action within the game (for example, displayed as a two-dimensional or three-dimensional display). The method 1200 then proceeds to the next block 1206 and may include one or more operations to post a description of the action in a social network feed. The method 1200 then proceeds to the next block 1208 and may include one or more operations to receive one or more rewards based on events from the social network feed and/or player interactions.

Figure 13:
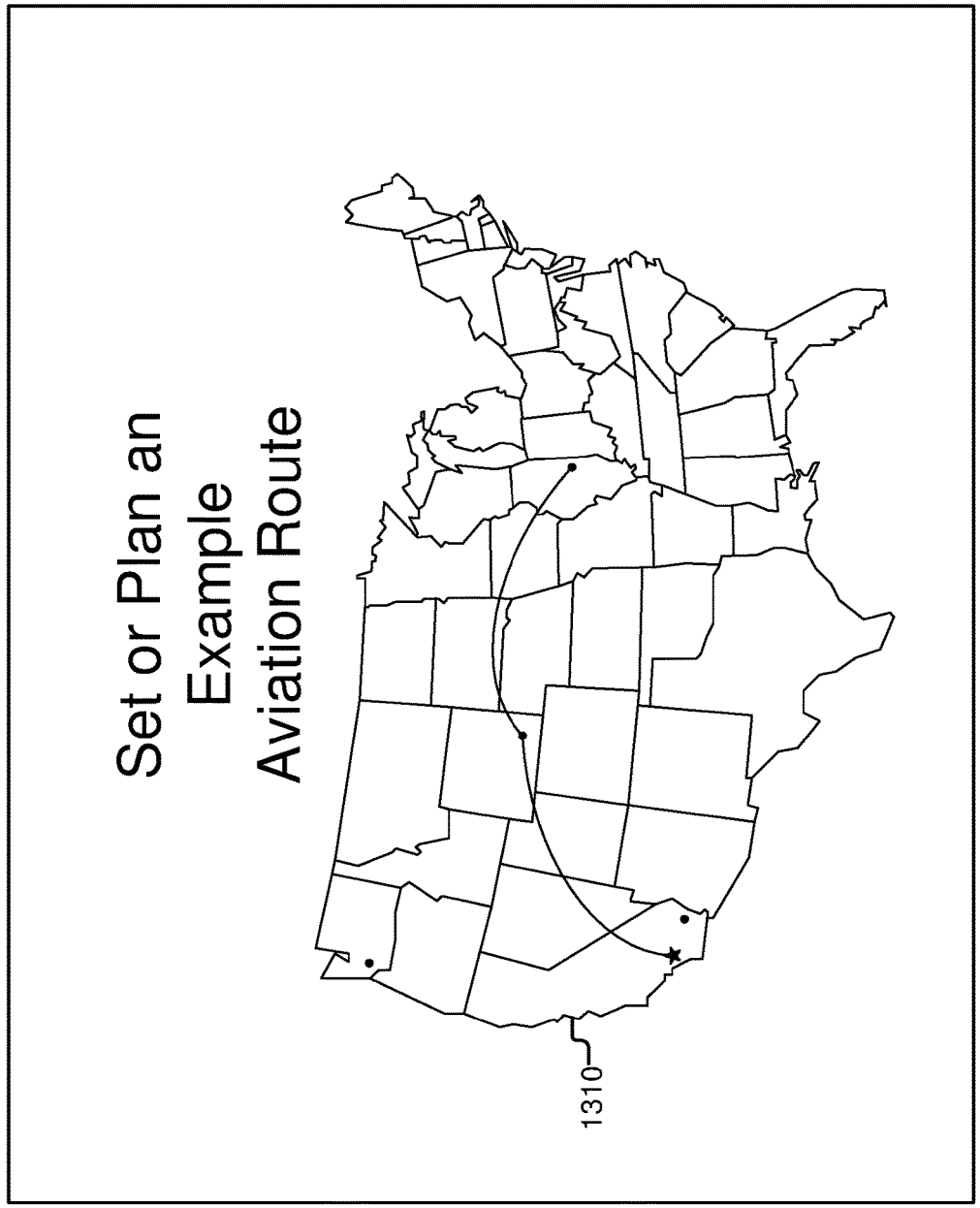
FIG. 13 is a graphical representation of an example action via a user interface, by a user in a gaming application (e.g. aviation), for example, where a user creates or sets an aviation route.
Figure 14:
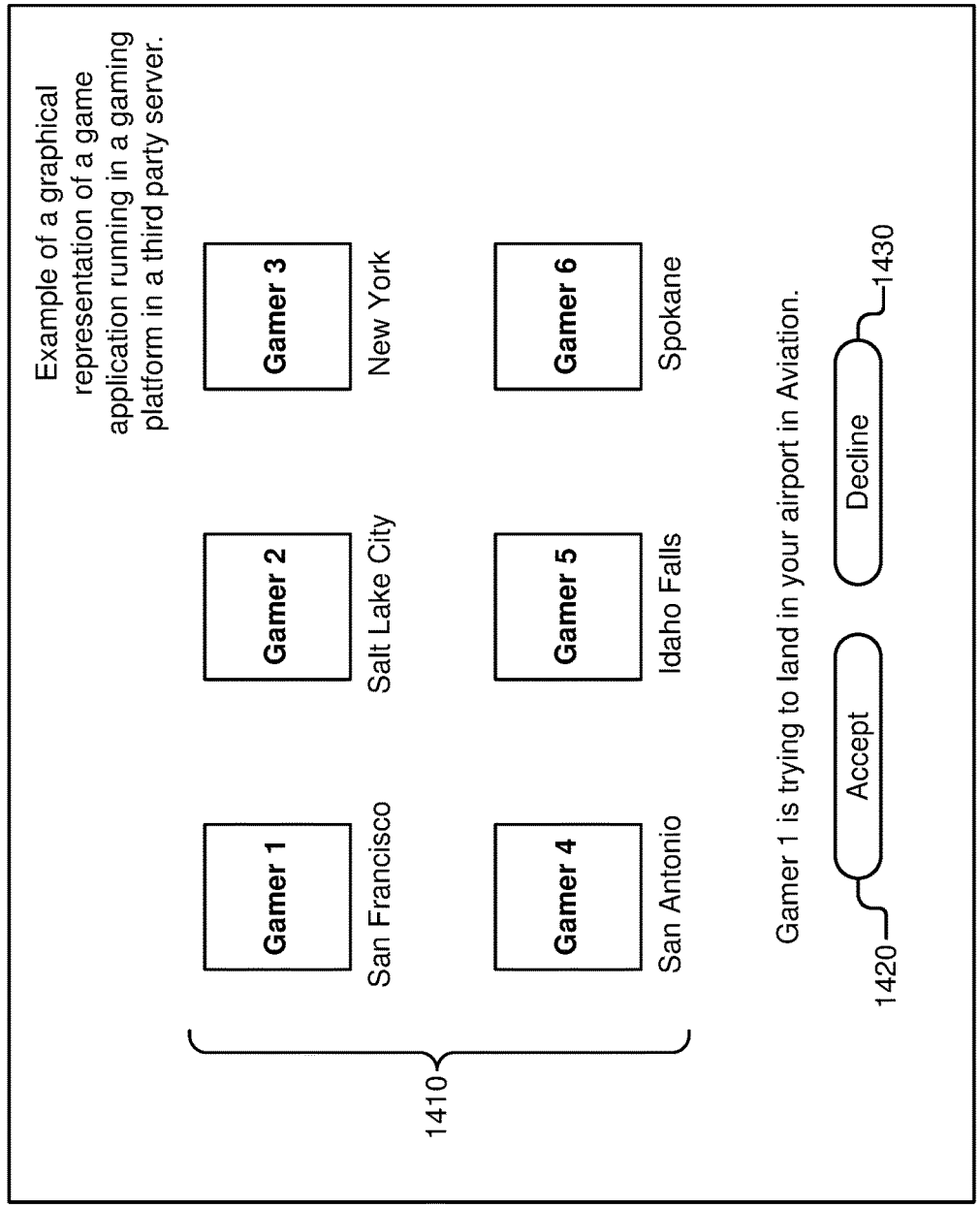
FIG. 14 is a graphical representation illustrating a gaming applications operating on a third-party server, with concurrent play by users (gamers or players) from remote locations linked by an integrated user interface.

FIG. 13 illustrates an example of a graphical representation of a flight route that may be created in this gaming application (aviation game). Multiple players (Gamers 1 through 6) may engage in this game, as illustrated by reference numeral 1410 in FIG. 14. Each of these gamers may be at remote locations and may access this game operated on a third party server. An action by gamer 1 impacting another gamer is indicated to any of the other gamers impacted, requiring acceptance or denial by the gamer impacted. The impacted gamer may "accept" the action, indicated by reference numeral 1420 or may "decline" the action, indicated by reference numeral 1430.

Figure 15:
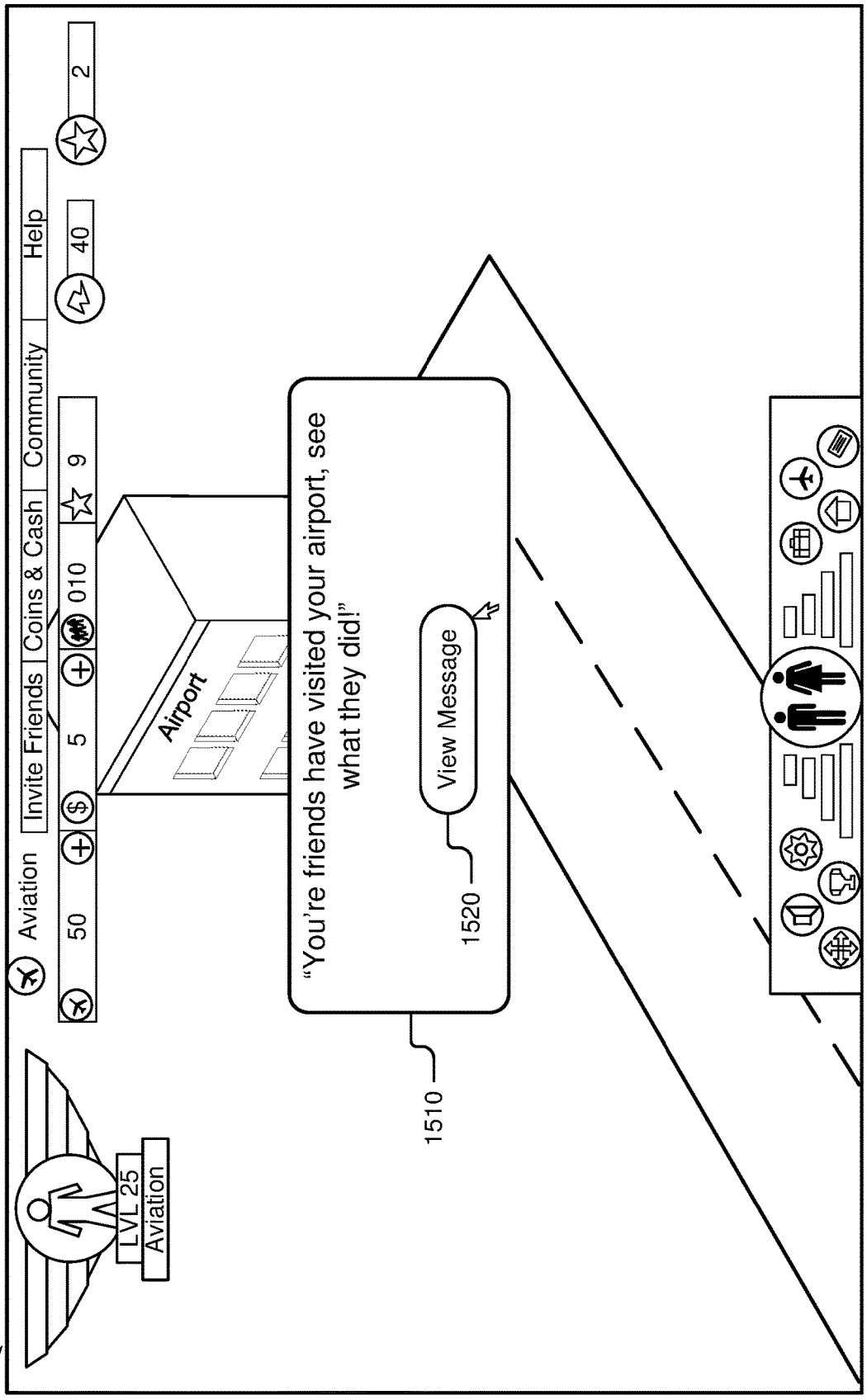
FIG. 15 is a graphical representation illustrating an example user interface display to one player with an in-game message related to another player's activity.

As one example of a select game, an aviation video gaming application is described here in FIG. 15 through FIG. 31. FIG. 15 illustrates some embodiments of a user interface 1500 for displaying an in-game message related to another player's activity. A player may receive an in-game notification (indicated by reference numeral 1510) describing certain activities relating to the player. For example the in-game notification (indicated by reference numeral 1510) states that friends have visited the player's airport and allows the player to view the description (by pressing the button 1520) of what the friends' did while at the player's airport.

Figure 16:
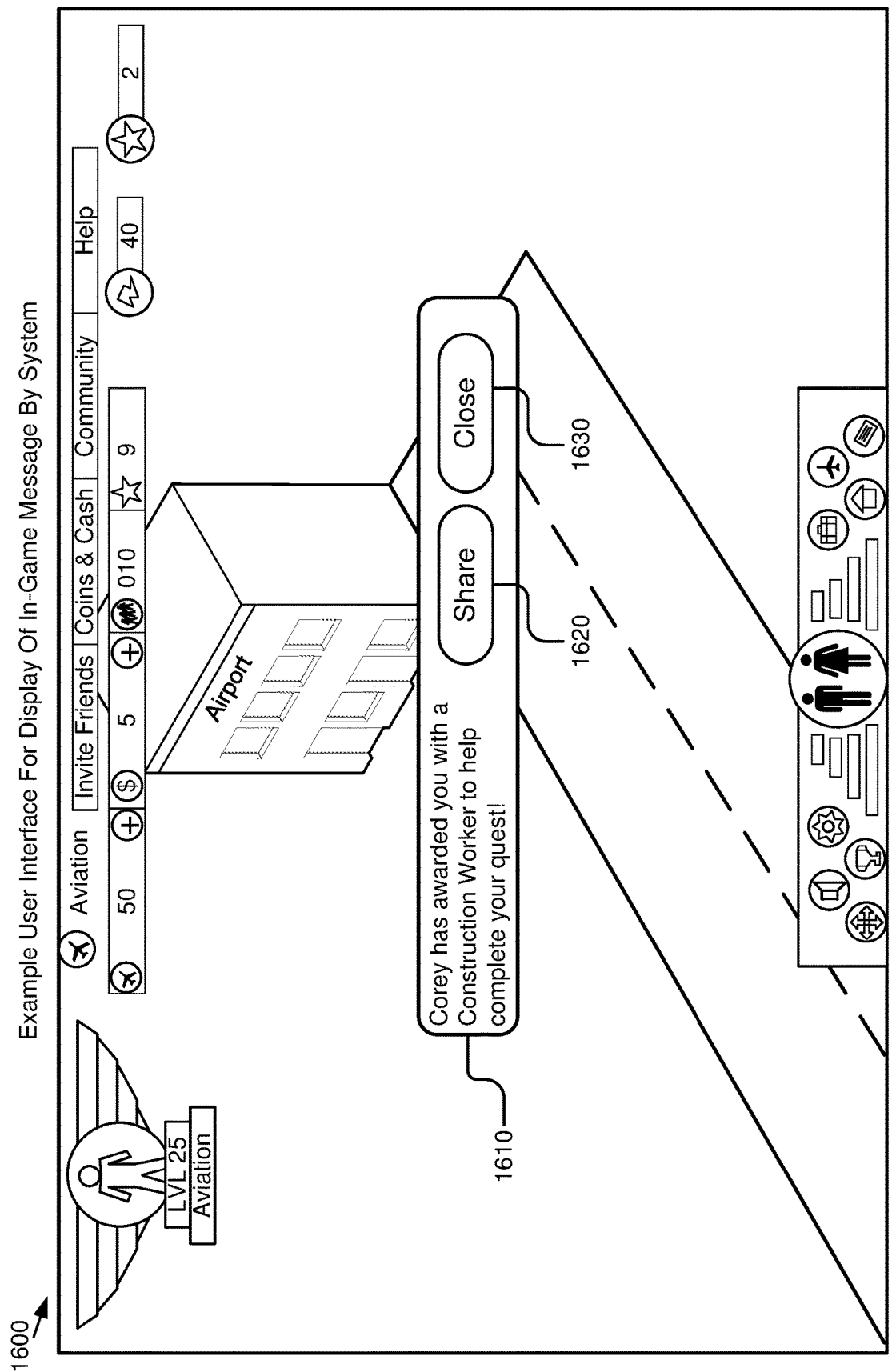
FIG. 16 is a graphical representation illustrating an example user interface display to one player with an in-game message awarding items from another player.

FIG. 16 illustrates some embodiments of a user interface 1600 for displaying an in-game message related to awarding items. A player may receive an in-game notification (indicated by reference numeral 1610) describing an in-game item that was given to the player by a friend to assist the player in completing a quest (i.e., challenge). The in-game notification (indicated by reference numeral 1610) may also allow the user (via the share button 1620) to share this information and/or the in-game item with one or more additional players. The in-game notification (indicated by reference numeral 1610) may also allow the user (via the close button 1620) to hide the in-game notification.

Figure 17:
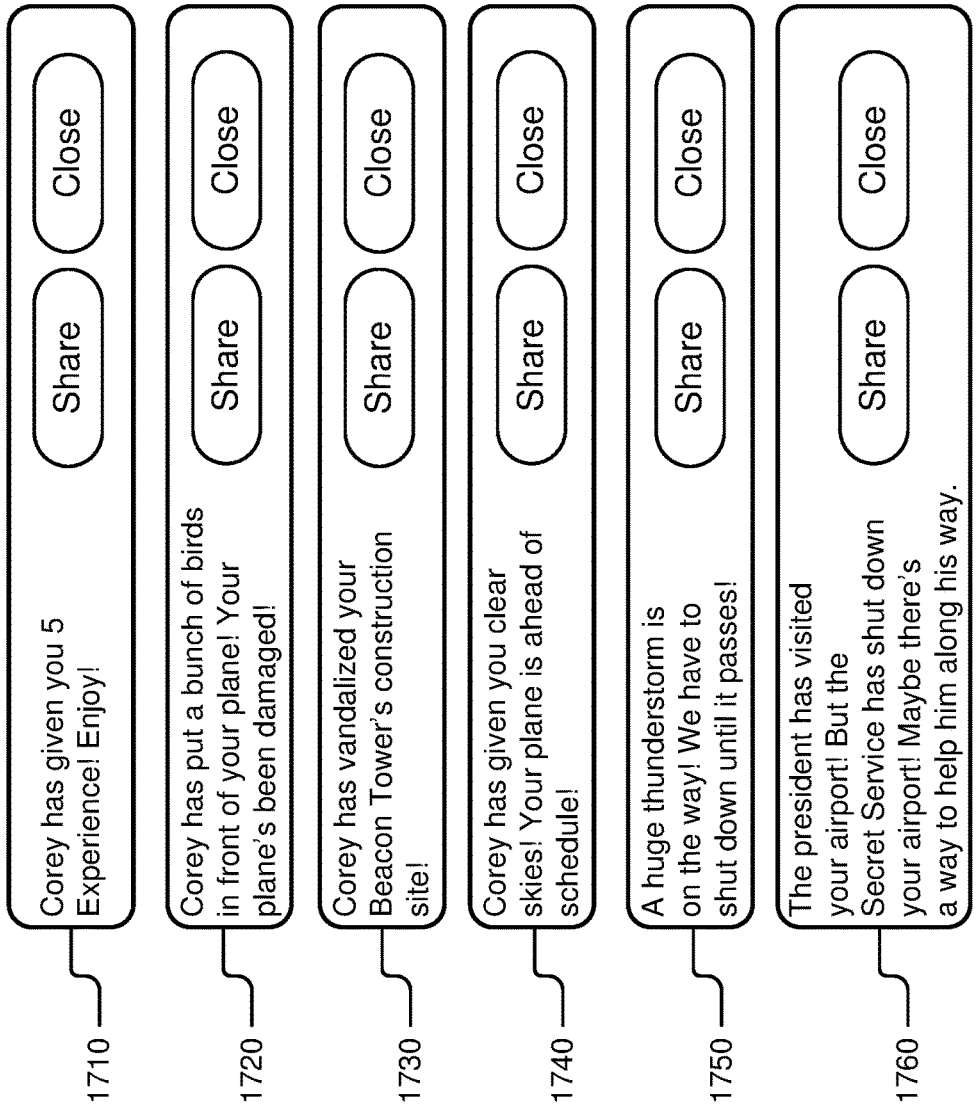
FIG. 17 is a graphical representation illustrating several example in-game messages displayed to one player on another player's activity.

FIG. 17 illustrates some embodiments 1700 of example in-game messages related to another player's activity. For example, a player may give experience points to another player, as indicated by the in game notification 1710. A player may sabotage another player's flight by damaging the airplane, as indicated by the in game notification 1720. A player may sabotage another player's airport by damaging a construction site, as indicated by the in game notification 1730. A player may improve another player's travel time by giving them clear skies, as indicated by the in game notification 1740. A player may have their airport shut down due to in-game weather conditions, as indicated by the in game notification 1750. A player may have their airport shut down due to a particular event, for example, the president visiting a player's airport, as indicated by the in game notification 1760.

Figure 18:
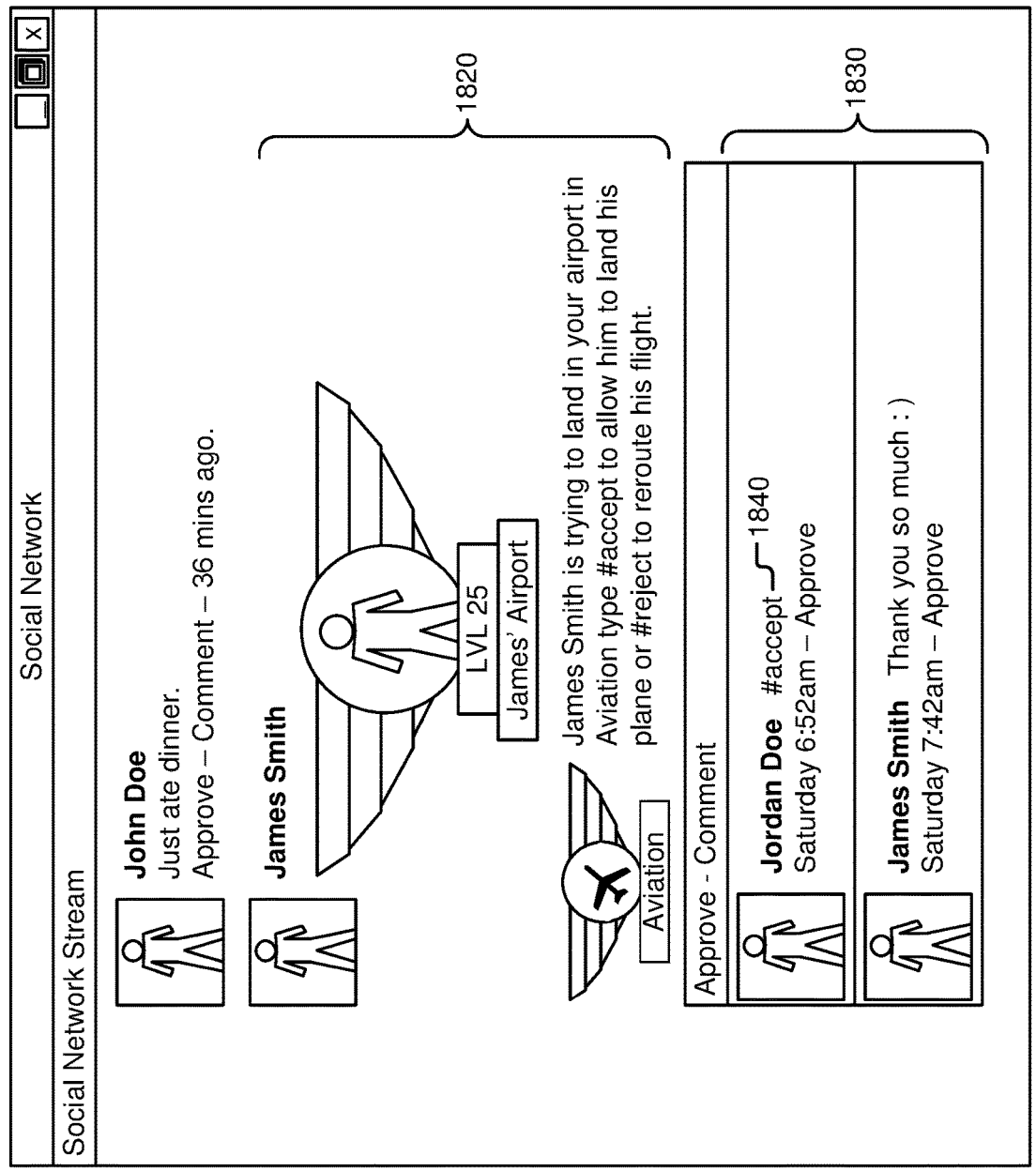
FIG. 18 is a graphical representation illustrating an example user interface configured within a social network for accepting requests for user game play within a game.

FIG. 18 illustrates an example of the user interface display 1800 to a user in the event a video gaming application is hosted or accessed by a social network. A user may accept a request via posting a comment (#accept in this example) to the social network post. User posts are indicated by 1810, user activities or operations during play are indicated by 1820, and user acceptances (indicated by reference numeral 1840) and approvals are indicated by reference numeral 1830.

Figure 19:
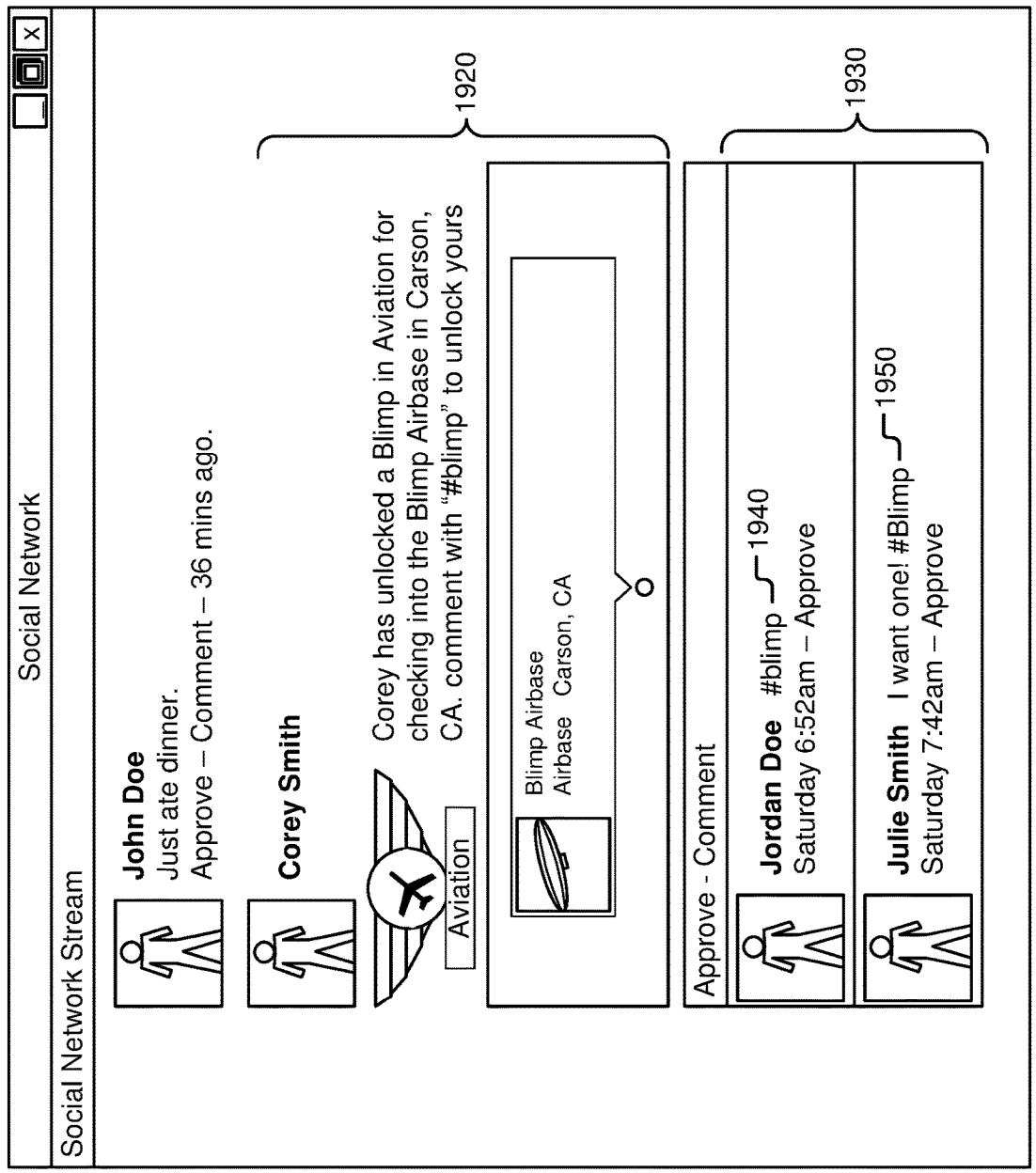
FIG. 19 is a graphical representation illustrating an example user interface for interacting with a game via a social network including unlocking new content.

FIG. 19 illustrates an example of a user interface 1900 for unlocking game play content within the game. A user may unlock in-game content by posting a comment on a player's social network post. A friend's activities and status during a game are indicated by 1920, and promotion approvals are indicated by 1930. Approvals may be by the user's friends 1940 and 1950.

As one example, an aviation video gaming application is described here. The specific rules of the social network aspect of the aviation gaming application (e.g., AviNation) are indicated below, simply by way of example:
GPS/Check-In Game Play—Airport Specific Player must log back into the game to collect all that they have earned every time someone posts. If not, they are subject to losing benefits (see comments)
1. Airport Check-ins (only players who are playing the game):
    1. For the player who checks in receives:
        1. Passengers (e.g. Extra 10/100)—[can only check-in to same airport once per day]
        2. Virtual currency (e.g. $10,000) [automatically added to players account]
        3. Either experience or energy points (not both)
    2. For the players who "like" the check-in:
        1. The player who checked in receives:
            1. Passengers
            2. Energy points
        2. The player who clicked "like" receives:
            1. Additional passengers
            2. Energy points
        3. Non-Players who "like" the check-in, the main player is awarded a fraction of passengers/energy (e.g., ⅕ or less)
    3. Comments (Key Words)—each player can only post one key word—subsequent posts from the same player are ignored.
        1. "Oversold"
            1. Each player of AviNation receive 10% of the passengers that the primary check-in player has earned but not collected yet;
            2. Each non-player results in a loss of one-passenger from the primary check-in player has earned but not collected yet;
        2. "Flight Cancelled"
            1. Player who first posts this that plays AviNation receives all of the passengers that the primary check-in player has earned but not yet collected;
            2. Player who second posts this receives all the energy a player has earned upon check-in but has not yet collected;
        3. "Mechanical"—anyone can post
            1. One of the check-in player's aircraft must be repaired (random aircraft) before it can fly again—only one airplane can be affected and only once by a player.

4. "Frequent Flyer"
   1. Each player of AviNation receives a 10% passenger bump for the day; check-in player receives a 10% bump on uncollected passengers Airport specific check-ins should be focused on passengers, money, and possibly experience or energy (not both).

Player Wall Post of a New Route Established

Figure 20A:
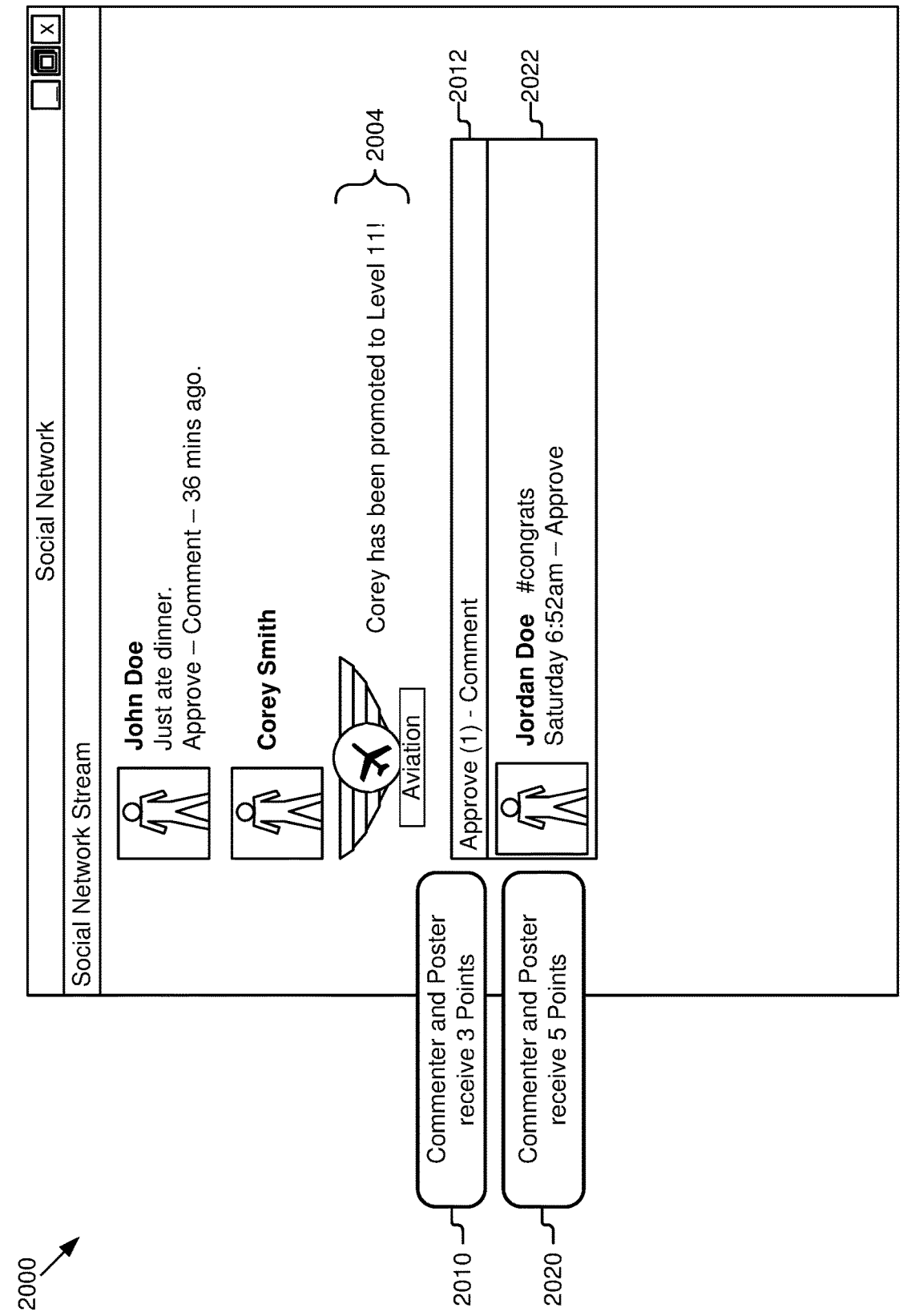
FIG. 20A is a graphical representation illustrating an example user interface display within a social network with a player's notification about one player's promotion within the game and other player comments on the player notification.

For players advertising a new route on their wall:
1. "like" post:
   1. Player who posted the new route receives:
      1. New passengers for the day (player must log in to collect)
      2. Experience or Energy (not both)
   2. Player who "liked" the post that plays the game receives:
      1. Certain number of passengers for the day
   3. Non-players who "like" the post add ⅕ (or minimum number) of the passengers (e.g., 1)
2. Comments (key words):
   1. "Oversold"
      1. Each player of AviNation receive 10% of the passengers that primary check-in player has earned but not collected yet;
      2. Each non-player results in a loss of one-passenger from the primary check-in player has earned but not collected yet;
   2. "Flight Cancelled"
      1. Player who first posts this that plays AviNation receives all of the passengers that the primary check-in player has earned but not yet collected;
      2. Player who second posts this receives all the energy a player earned upon check-in but has not yet collected;
   3. "Mechanical"—anyone can post
      1. One of the check-in players aircraft must be repaired (random aircraft) before it can fly again—only one airplane can be affected and only once by a player.
   4. "Frequent Flyer"
      1. Each player of AviNation receives a 10% passenger bump for the day; check-in player receives a 10% bump on uncollected passengers Action of a Player Who Buys a New Airplane:
1. "like"
   1. Player who posted receives:
      1. Additional fuel (free)
   2. Player who "liked" the post receives:
      1. 5 additional passengers
1. Comments (key words):
   1. "Mechanical"—anyone can post
      1. One of the check-in players aircraft must be repaired (random aircraft) before it can fly again—only one airplane can be affected and only once by a player.
   2. "Frequent Flyer"
      1. Each player (original post and respondent) of AviNation receives a 10% passenger bump for the day; check-in player receives a 10% bump on uncollected passengers In general for each action, the following are examples:
1. Each post does NOT have to award a lot of game items to the original poster or the respondent. It is kept in context to what is being posted. Examples:
   1. Setting up a new route may earn experience and passengers
   2. Buying an airplane may award fuel and passengers
   3. Setting up a terminal may award passengers and energy
2. There needs to be competitive play in the spectator wall posts with key words:
   1. Key words that continue to award to the primary poster and also the spectator;
   2. Key words that 'steal' items away from primary poster to respondent player;
   3. Key words that are detrimental to a player (whether completely detrimental or just gives everything not collected to the respondent player)
   4. Key words that are descriptive to the action involved.
3. The "like" button should award items to both players
4. Players who are being awarded items must go back (log-in) to the game to collect them or they are fair game for other players FIG. 20A illustrates an example of a user interface 2000 within a social network with a player notification about one player's promotion within the game and other player comments on the player notification. For example, the post 2004 indicates that the player has been promoted within the game. The notification 2010 indicates that for the approval 2012 from a player, the commenter and the poster receive three points within the game. The notification 2020 indicates that for the comment 2022, the commenter and the poster receive five points within the game.

Figure 20B:
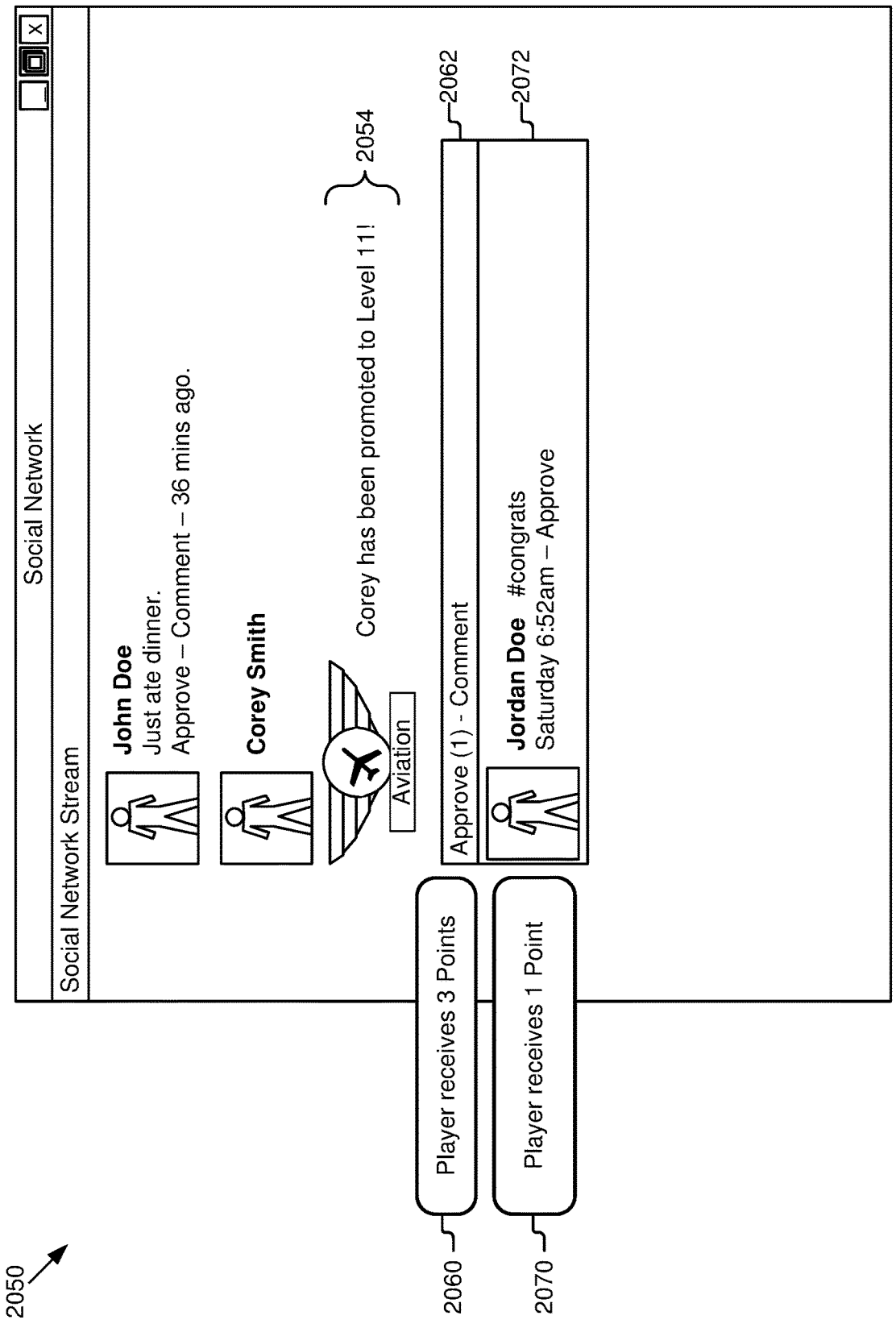
FIG. 20B is a graphical representation illustrating an example user interface display within a social network with a player notification about one player's promotion within the game and other non-player comments on the player notification.

FIG. 20B illustrates an example of a user interface 2050 within a social network with a player notification about one player's promotion within the game and other non-player comments on the player notification. For example, the post 2054 indicates that the player has been promoted within the game. The notification 2060 indicates that for the approval 2062, the player (i.e., poster) receives three points within the game. The notification 2070 indicates that for the comment 2072 from a non-player, the player (i.e., poster) receives one point within the game.

Figure 21A:
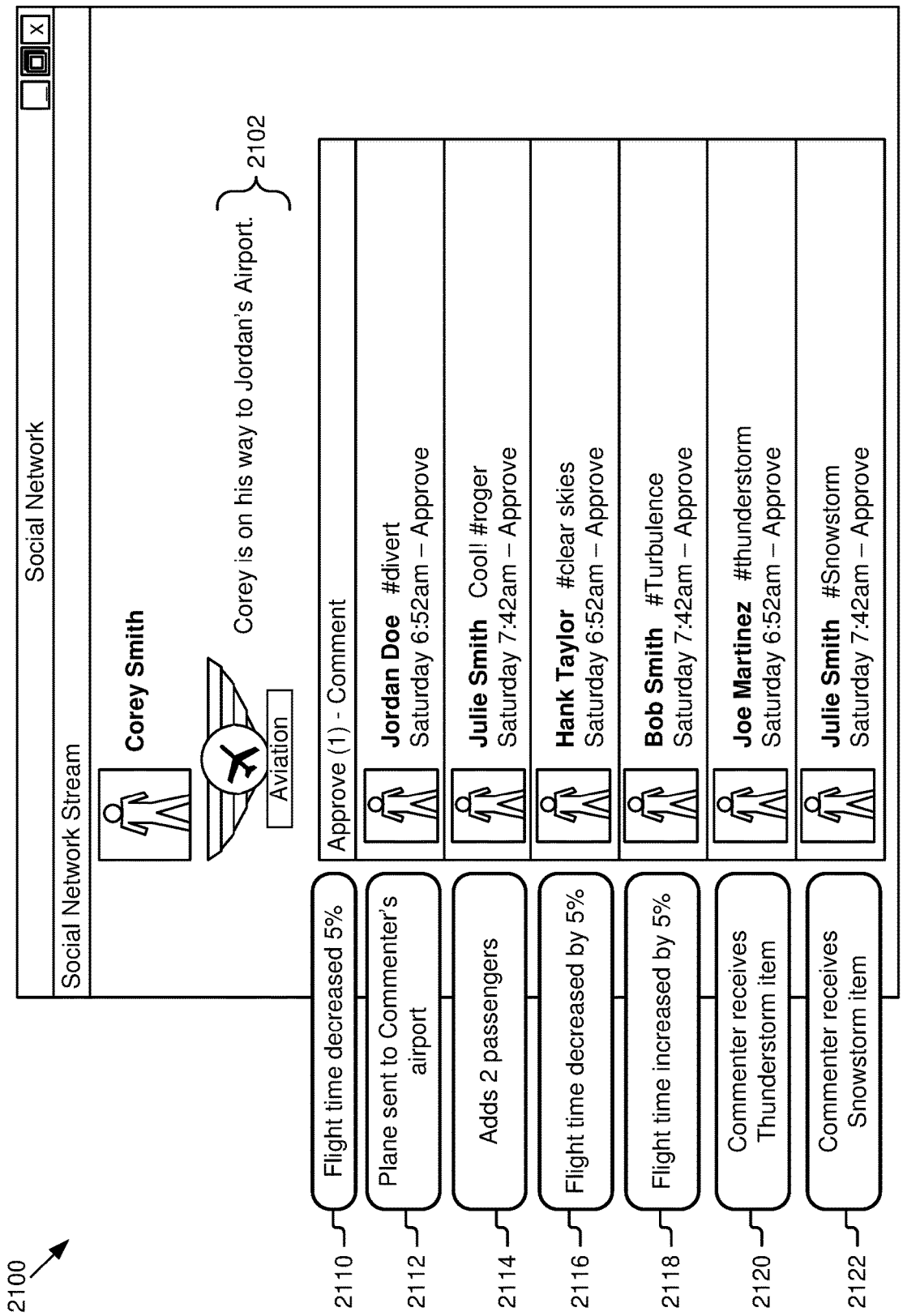
FIG. 21A is a graphical representation illustrating an example use interface within a social network with a player notification on a particular player traveling to another player's area within the game and posting of other player comments further to the player notification.

FIG. 21A illustrates an example of a user interface 2100 within a social network with a player notification about one player traveling to another player's area within the game and other player comments on the player notification. For example, the post 2102 indicates that the player is traveling to another player's airport. The notification 2110 indicates that for the approval, the flight time is decreased by 5%. The notification 2112 indicates that for the comment "#divert" from a player, the airplane is sent to the commenter's airport. The notification 2114 indicates that for the comment "#roger" from a player, the airplane receives two passengers. The notification 2116 indicates that for the comment "#clear skies" from a player, the flight time is decreased by 5%. The notification 2118 indicates that for the comment "#turbulence" from a player, the flight time is increased by 5%. The notification 2120 indicates that for the comment "#thunderstorm" from a player, the commenter receives a thunderstorm item (in-game item). The notification 2122 indicates that for the comment "#snowstorm" from a player, the commenter receives a snowstorm item (in-game item).

Figure 21B:
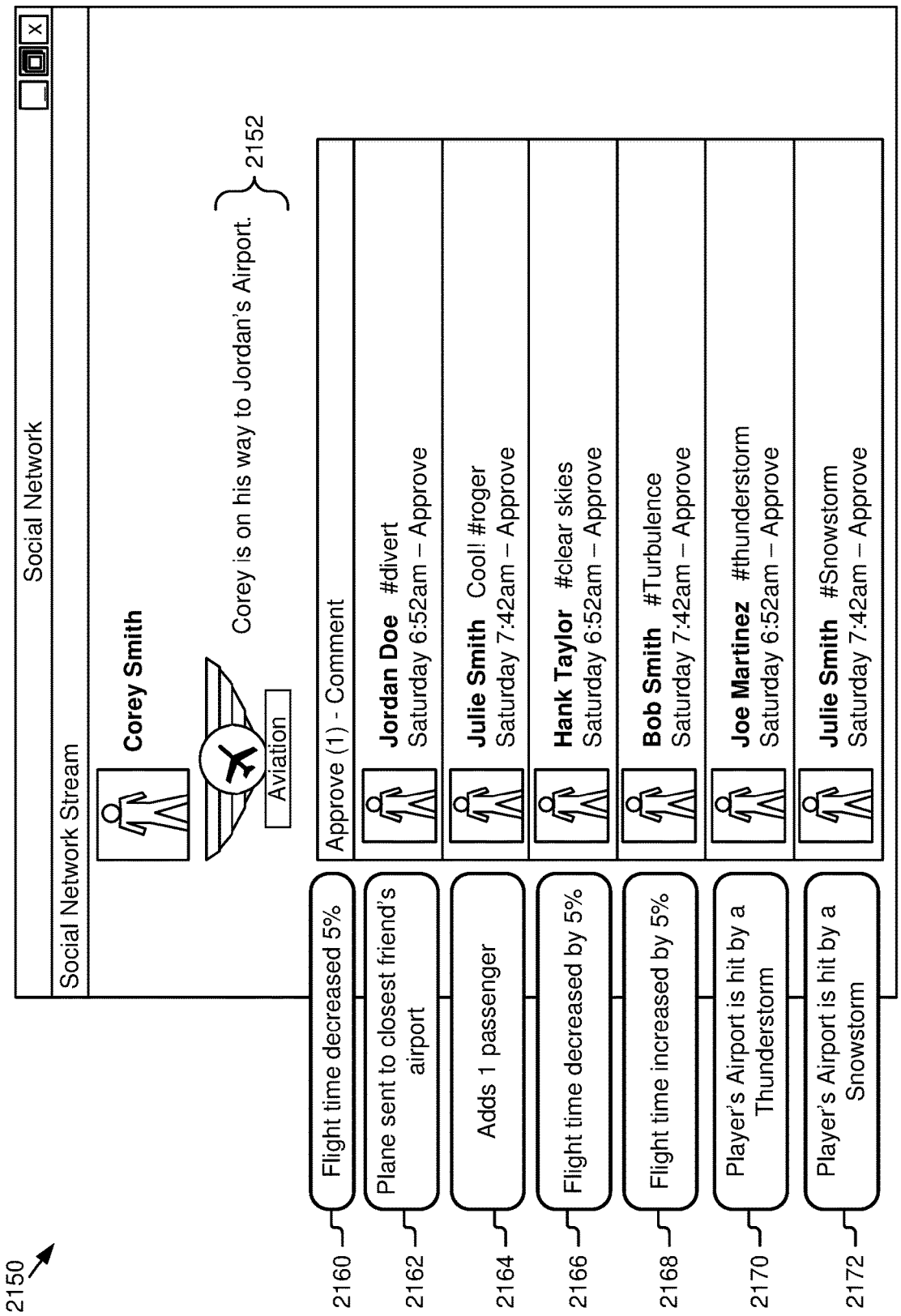
FIG. 21B is a graphical representation illustrating an example user interface for interacting with a game via a social network including non-players commenting on a player's activity within the game.

FIG. 21B illustrates an example of a user interface 2150 within a social network with a player notification about one player traveling to another player's area within the game and other non-player comments on the player notification. For example, the post 2152 indicates that the player is traveling to another player's airport. The notification 2160 indicates that for the approval, the flight time is decreased by 5%. The notification 2162 indicates that for the comment "#divert" from a non-player, the airplane is sent to the closest friend's airport. The notification 2164 indicates that for the comment "#roger" from a non-player, the airplane receives one passenger. The notification 2166 indicates that for the comment "#clear skies" from a non-player, the flight time is decreased by 5%. The notification 2168 indicates that for the comment "#turbulence" from a non-player, the flight time is increased by 5%. The notification 2170 indicates that for the comment "#thunderstorm" from a non-player, the player's airport is hit by a thunderstorm. The notification 2172 indicates that for the comment "#snowstorm" from a non-player, the player's airport is hit by a snowstorm.

Figure 22A:
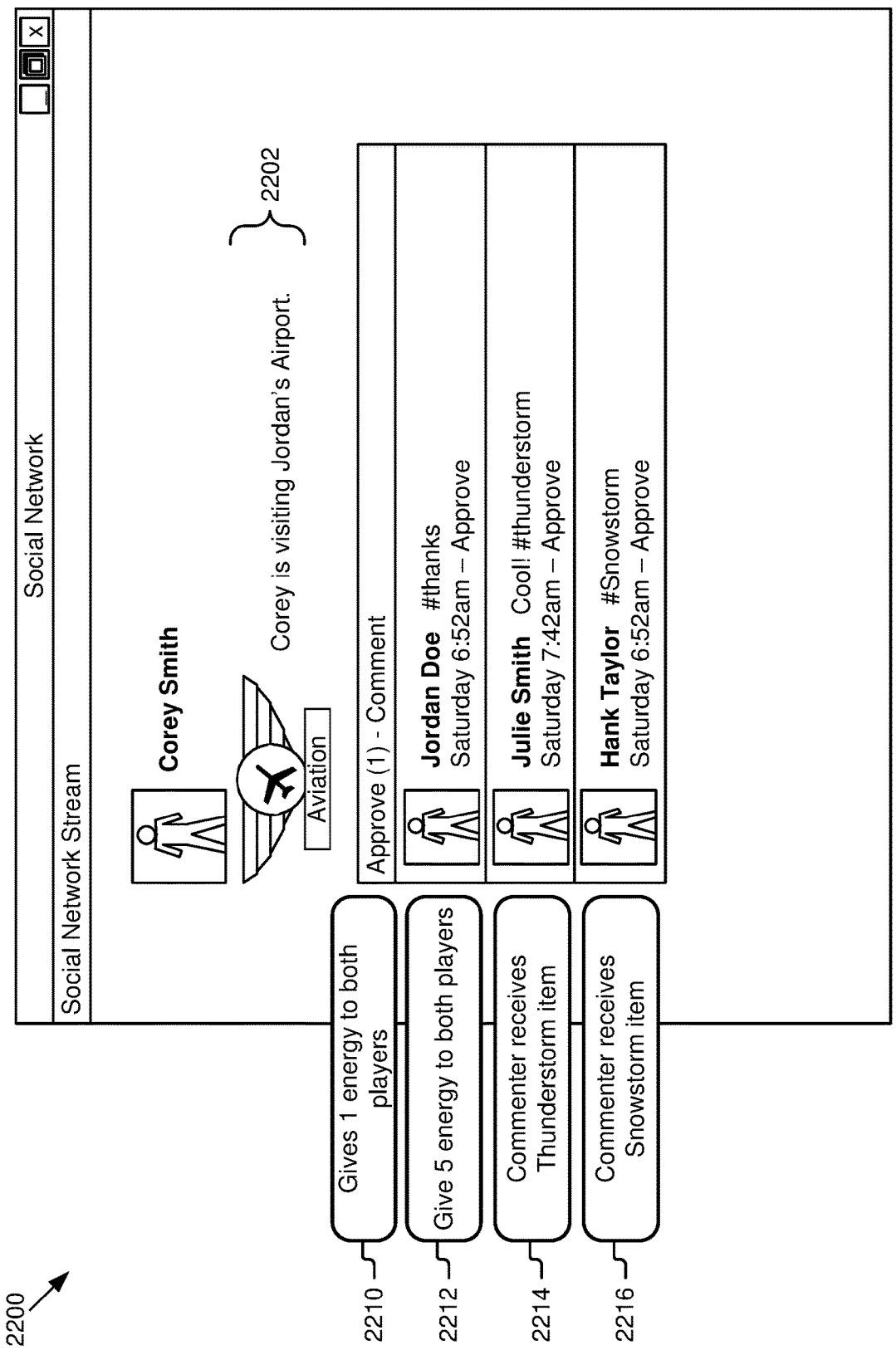
FIG. 22A is a graphical representation illustrating an example user interface for interacting with a game via a social network including players commenting on a player visiting a player's virtual area within the game.

FIG. 22A illustrates an example of a user interface 2200 within a social network with a player notification about one player visiting another player's area within the game and other player comments on the player notification. For example, the post 2202 indicates that the player is visiting another player's airport. The notification 2210 indicates that for the approval, one energy point is given to both players. The notification 2212 indicates that for the comment "#thanks" from a player, five energy points are given to both players. The notification 2214 indicates that for the comment "#thunderstorm" from a player, the commenter receives a thunderstorm item (in-game item). The notification 2216 indicates that for the comment "#snowstorm" from a player, the commenter receives a snowstorm item (in-game item).

Figure 22B:
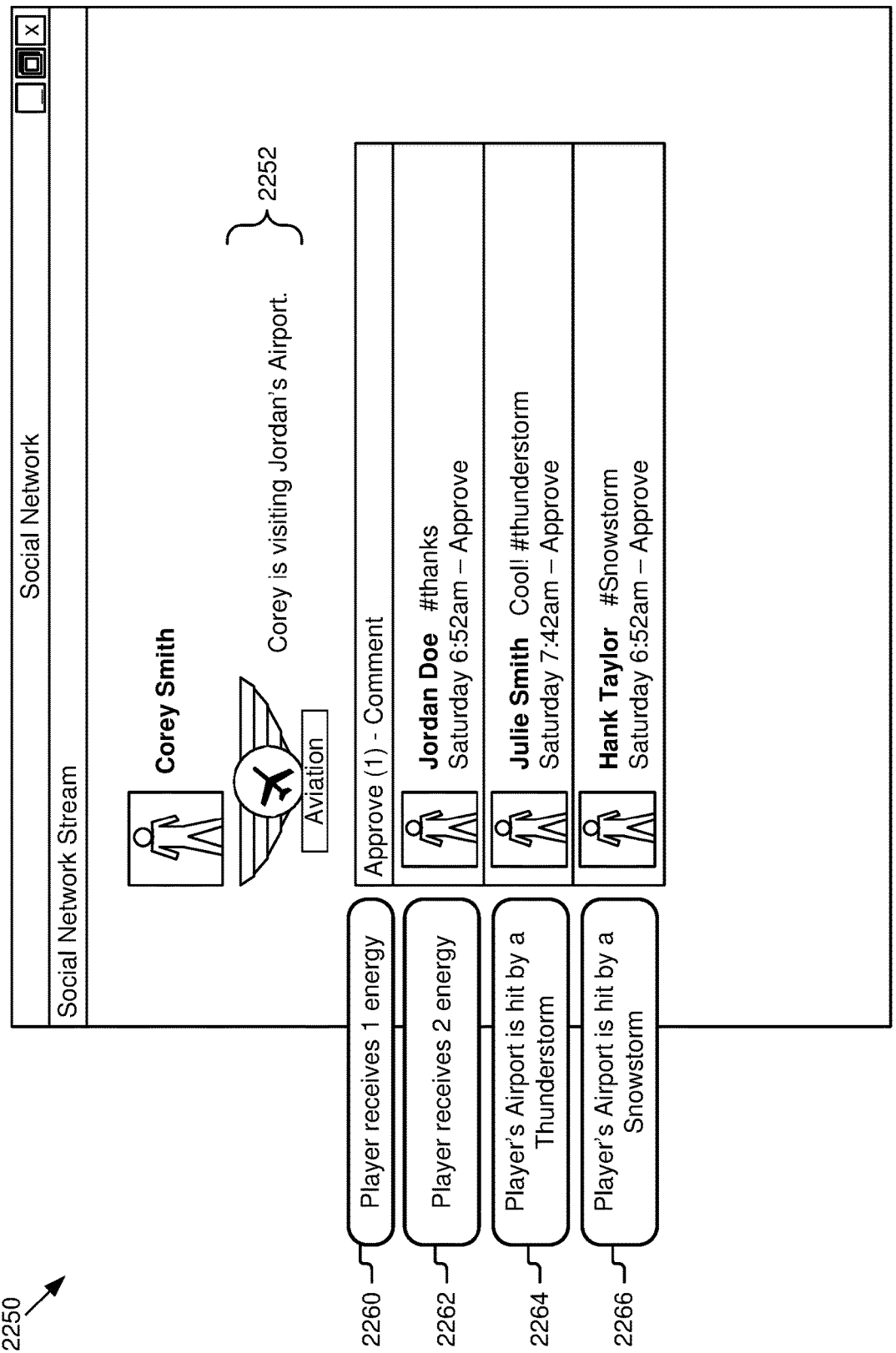
FIG. 22B is a graphical representation illustrating an example user interface for interacting with a game via a social network including non-players commenting on a player visiting a player's virtual area within the game.

FIG. 22B illustrates an example of a user interface 2250 within a social network with a player notification about one player visiting another player's area within the game and other non-player comments on the player notification. For example, the post 2252 indicates that the player is visiting another player's airport. The notification 2260 indicates that for the approval, one energy point is given to the player (i.e., poster). The notification 2262 indicates that for the comment "#thanks" from a non-player, two energy points are given to the player (i.e., poster). The notification 2264 indicates that for the comment "#thunderstorm" from a non-player, the player's (i.e., poster) airport is hit by a thunderstorm. The notification 2266 indicates that for the comment "#snowstorm" from a non-player, the player's (i.e., poster) airport is hit by a snowstorm.

Figure 23A:
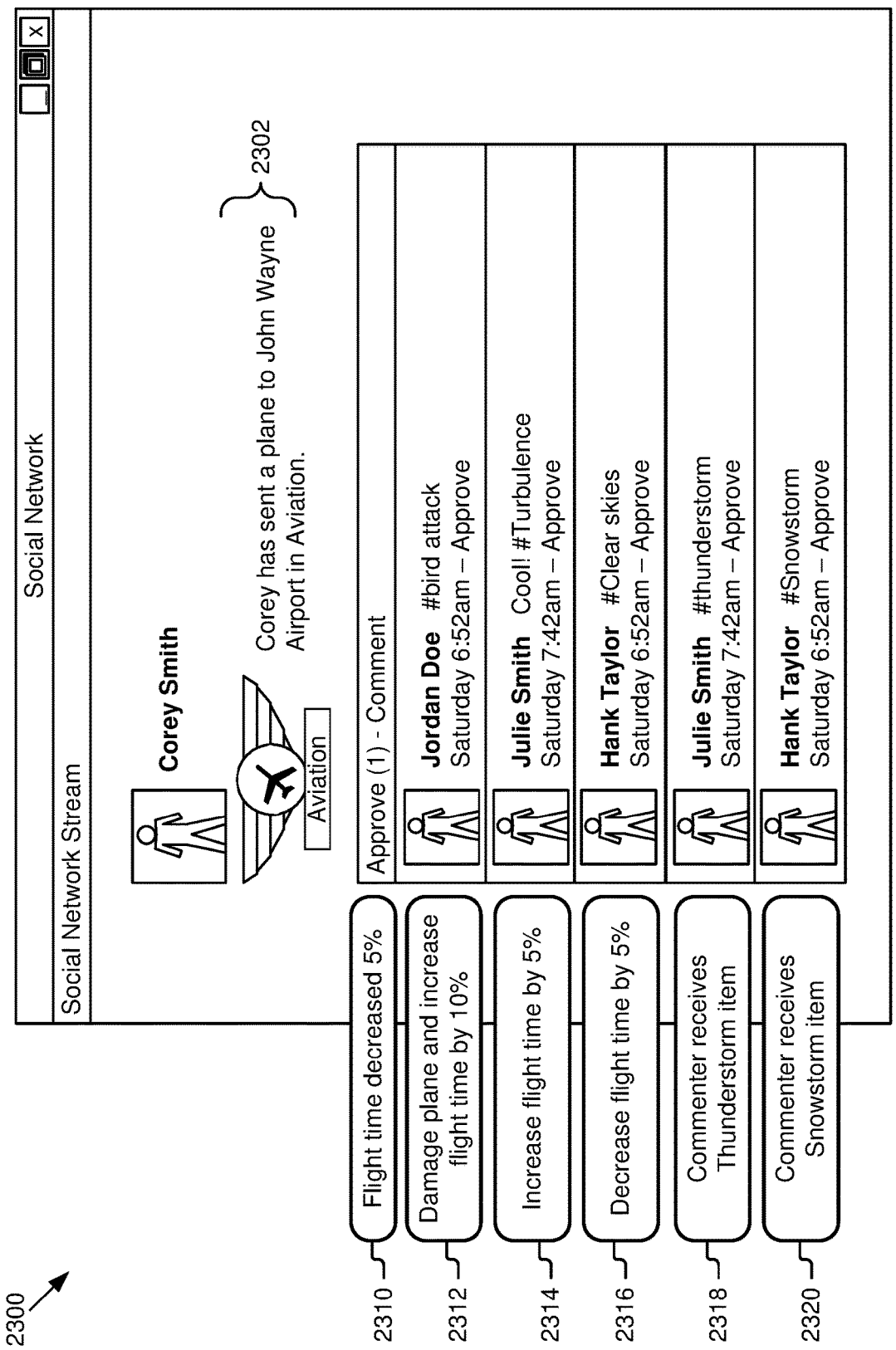
FIG. 23A is a graphical representation illustrating an example user interface for interacting with a game via a social network including players commenting on a player sending items within the game.

FIG. 23A illustrates an example of a user interface 2300 within a social network with a player notification about one player sending a game-play item within the game and other player comments on the player notification. For example, the post 2302 indicates that the player has sent an airplane to an in-game airport (in this example John Wayne Airport). The notification 2310 indicates that for the approval, the flight time is decreased by 5%. The notification 2312 indicates that for the comment "#bird attack" from a player, the airplane is damaged and the flight time is increased by 5%. The notification 2314 indicates that for the comment "#turbulence" from a player, the flight time is increased by 5%. The notification 2316 indicates that for the comment "#clear skies" from a player, the flight time is decreased by 5%. The notification 2318 indicates that for the comment "#thunderstorm" from a player, the commenter receives a thunderstorm item (in-game item). The notification 2320 indicates that for the comment "#snowstorm" from a player, the commenter receives a snowstorm item (in-game item).

Figure 23B:
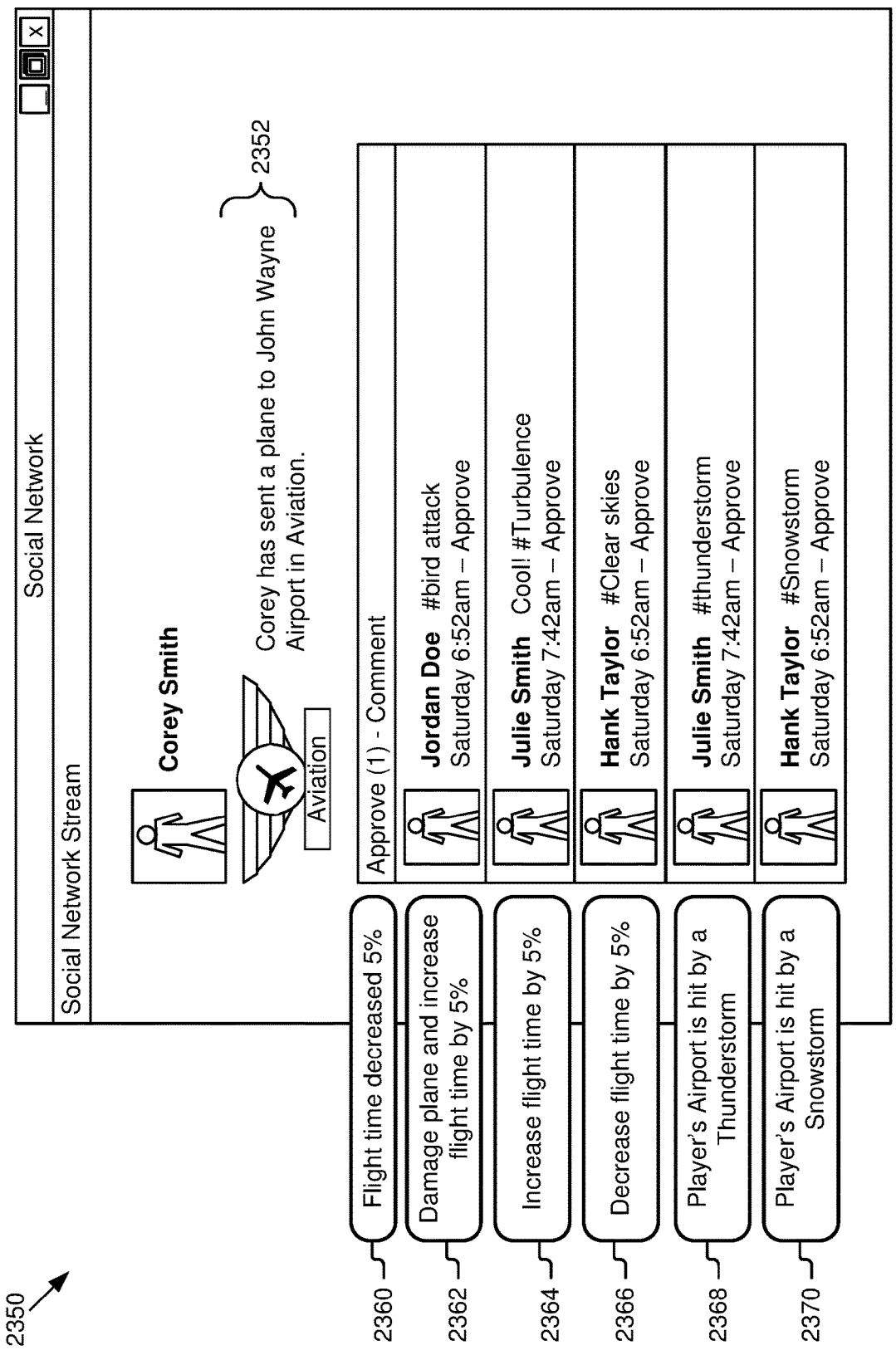
FIG. 23B is a graphical representation illustrating an example user interface for interacting with a game via a social network including comments from non-players on a player sending items within the game.

FIG. 23B illustrates an example of a user interface 2350 within a social network with a player notification about one player sending a game-play item within the game and other non-player comments on the player notification. For example, the post 2352 indicates that the player has sent an airplane to an in-game airport (in this example John Wayne Airport). The notification 2360 indicates that for the approval, the flight time is decreased by 5%. The notification 2362 indicates that for the comment "#bird attack" from a non-player, the airplane is damaged and the flight time is increased by 5%. The notification 2364 indicates that for the comment "#turbulence" from a non-player, the flight time is increased by 5%. The notification 2366 indicates that for the comment "#clear skies" from a non-player, the flight time is decreased by 5%. The notification 2368 indicates that for the comment "#thunderstorm" from a non-player, the player's (i.e., poster) airport is hit by a thunderstorm. The notification 2370 indicates that for the comment "#snowstorm" from a non-player, the player's (i.e., poster) airport is hit by a snowstorm.

Figure 24A:
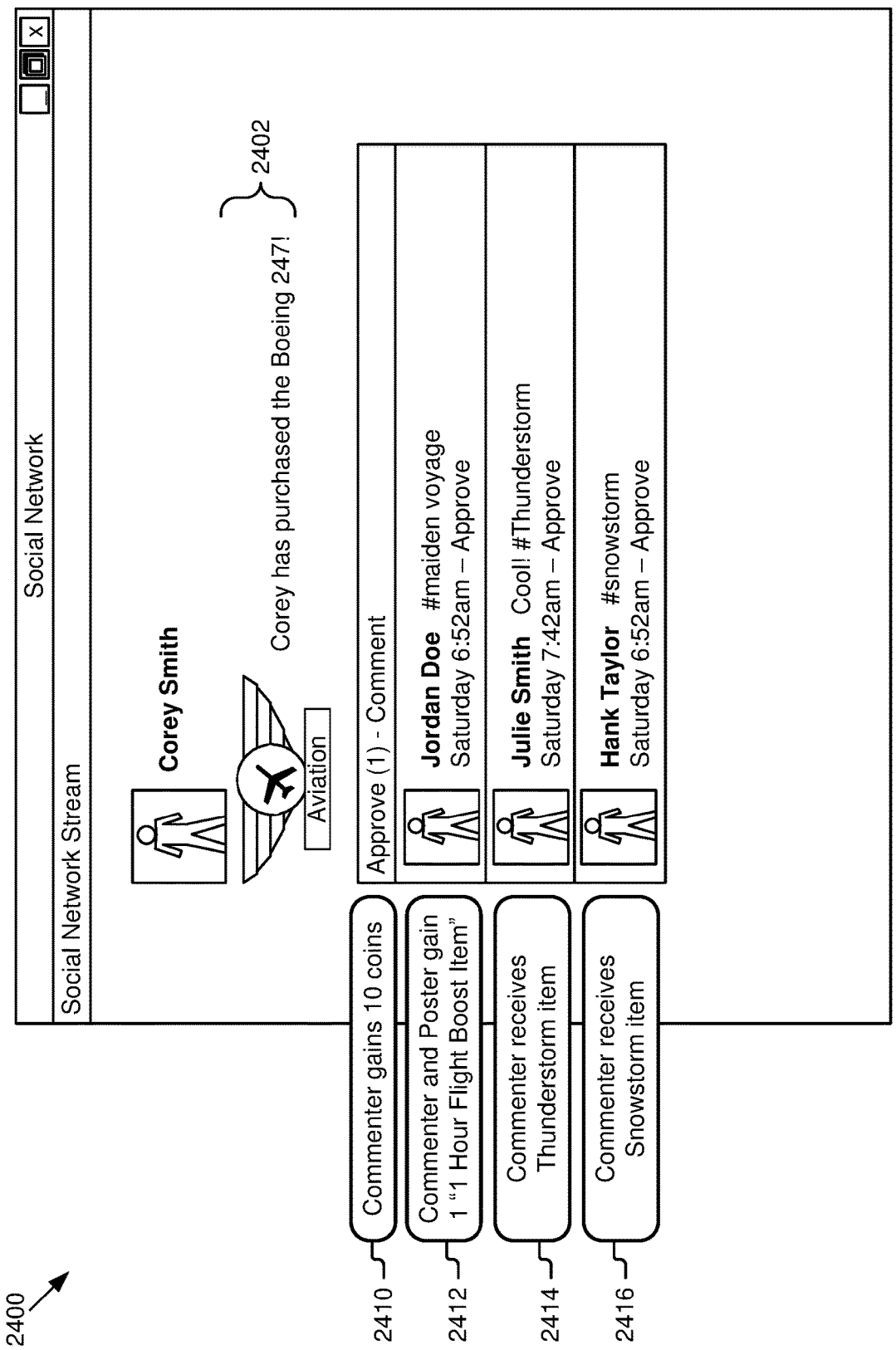
FIG. 24A is a graphical representation illustrating an example user interface for interacting with a game via a social network including players commenting on an item purchase within the game.

FIG. 24A illustrates an example of a user interface 2400 within a social network with a player notification about one player purchasing a game-play item within the game and other player comments on the player notification. For example, the post 2402 indicates that the player has purchased an in-game airplane. The notification 2410 indicates that for the approval, the commenter gains 10 coins. The notification 2412 indicates that for the comment "#maiden voyage" from a player, the commenter and the poster gain one "1 hour boost item". The notification 2414 indicates that for the comment "#thunderstorm" from a player, the commenter receives a thunderstorm item (in-game item). The notification 2416 indicates that for the comment "#snowstorm" from a player, the commenter receives a snowstorm item (in-game item).

Figure 24B:
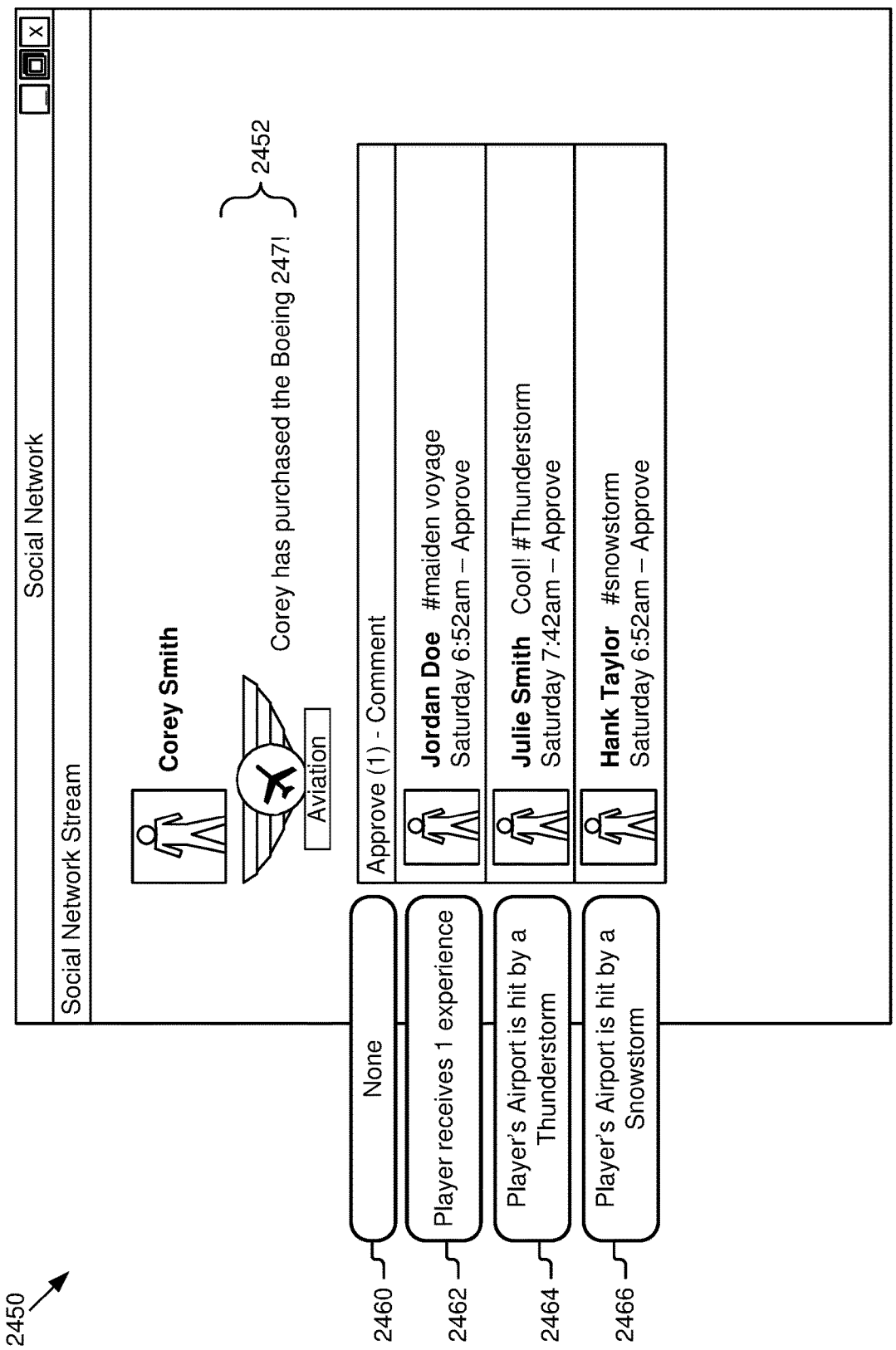
FIG. 24B is a graphical representation illustrating an example user interface for interacting with a game via a social network including non-players commenting on an item purchase within the game.

FIG. 24B illustrates an example of a user interface 2450 within a social network with a player notification about one player purchasing a game-play item within the game and other non-player comments on the player notification. For example, the post 2452 indicates that the player has purchased an in-game airplane. The notification 2460 indicates that for the approval, no award is given. The notification 2462 indicates that for the comment "#maiden voyage" from a non-player, the player (i.e., poster) receives one experience point. The notification 2464 indicates that for the comment "#thunderstorm" from a non-player, the player's (i.e., poster) airport is hit by a thunderstorm. The notification 2466 indicates that for the comment "#snowstorm" from a non-player, the player's (i.e., poster) airport is hit by a snowstorm.

Figure 25A:
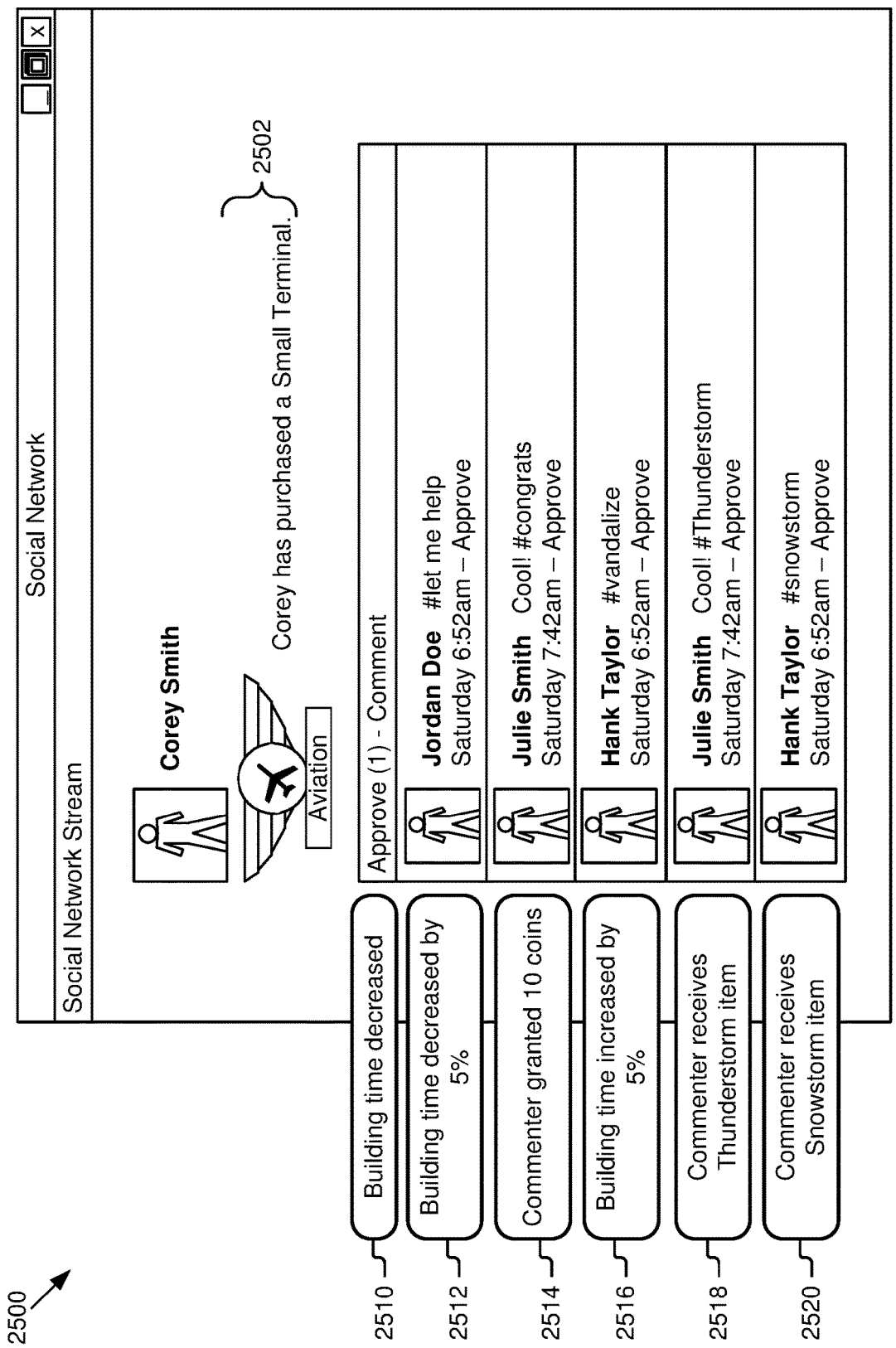
FIG. 25A is a graphical representation illustrating an example user interface for interacting with a game via a social network including players commenting on an area purchase within the game.

FIG. 25A illustrates an example of a user interface 2500 within a social network with a player notification about one player purchasing a game-play area within the game and other player comments on the player notification. For example, the post 2502 indicates that the player has purchased a small terminal. The notification 2510 indicates that for the approval, the building time is decreased. The notification 2512 indicates that for the comment "#let me help" from a player, the building time is decreased by 5%. The notification 2514 indicates that for the comment "#congrats" from a player, the commenter is given 10 coins. The notification 2516 indicates that for the comment "#vandalize" from a player, the building time is increased by 5%. The notification 2518 indicates that for the comment "#thunderstorm" from a player, the commenter receives a thunderstorm item (in-game item). The notification 2520 indicates that for the comment "#snowstorm" from a player, the commenter receives a snowstorm item (in-game item).

Figure 25B:
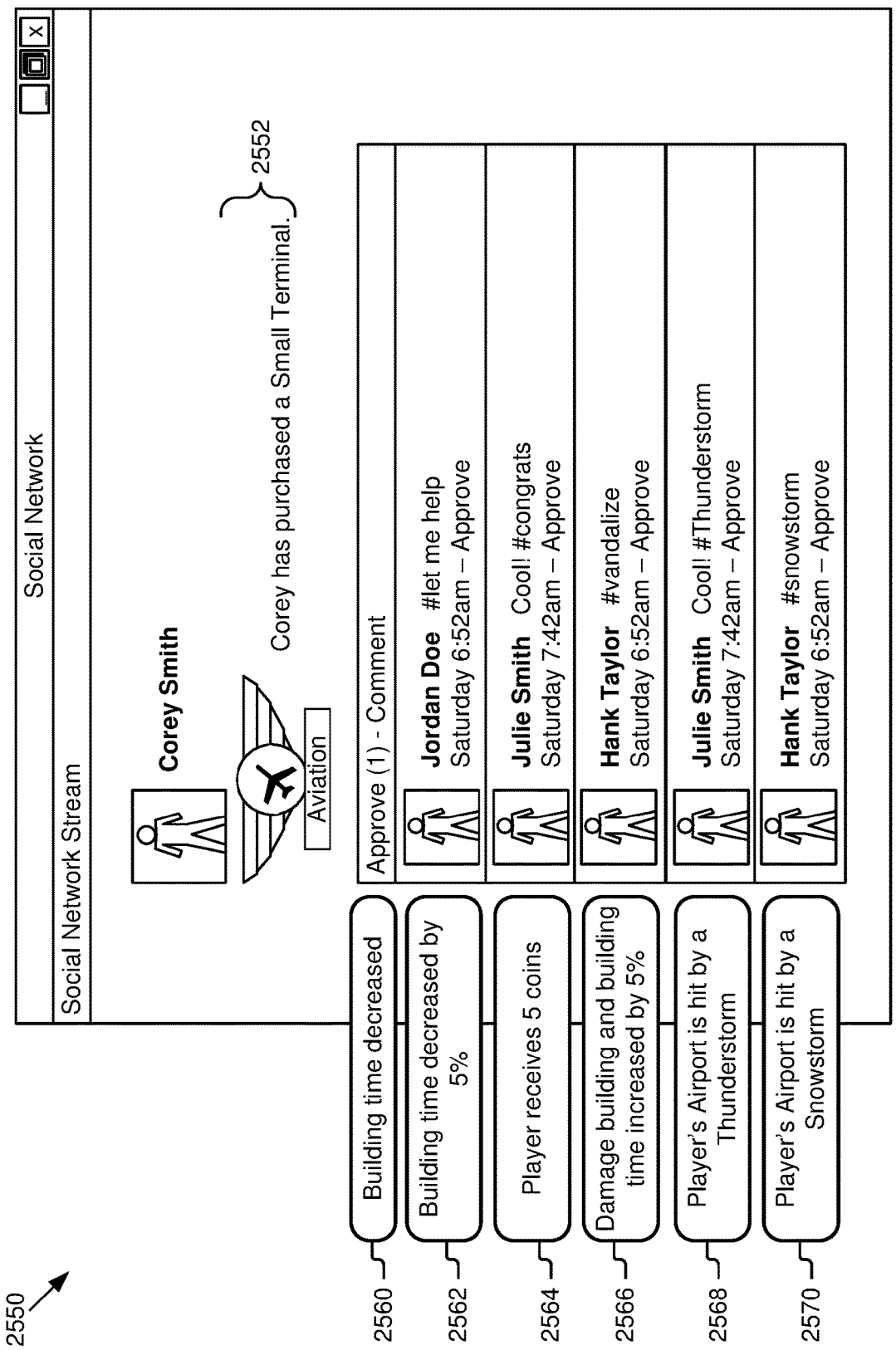
FIG. 25B is a graphical representation illustrating an example user interface for interacting with a game via a social network including non-players commenting on an area purchase within the game.

FIG. 25B illustrates an example of a user interface 2550 within a social network with a player notification about one player purchasing a game-play area within the game and other non-player comments on the player notification. For example, the post 2552 indicates that the player has purchased a small terminal. The notification 2560 indicates that for the approval, the building time is decreased. The notification 2562 indicates that for the comment "#let me help" from a non-player, the building time is decreased by 5%. The notification 2564 indicates that for the comment "#congrats" from a non-player, the player (i.e., poster) is given 5 coins. The notification 2566 indicates that for the comment "#vandalize" from a non-player, the building is damaged and the building time is increased by 5%. The notification 2568 indicates that for the comment "#thunderstorm" from a non-player, the player's (i.e., poster) airport is hit by a thunderstorm. The notification 2570 indicates that for the comment "#snowstorm" from a non-player, the player's (i.e., poster) airport is hit by a snowstorm.

Figure 26A:
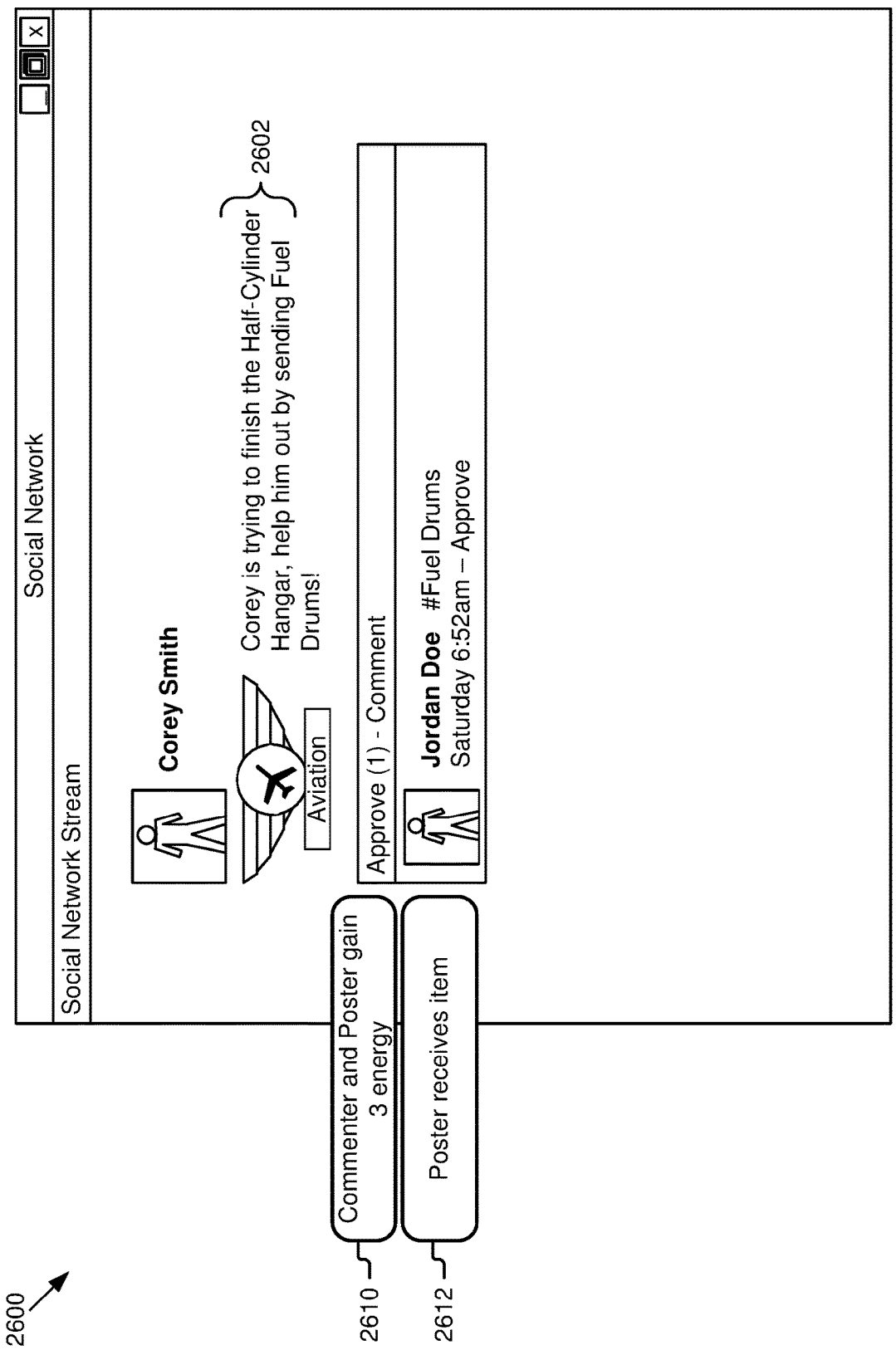
FIG. 26A is a graphical representation illustrating an example user interface for interacting with a game via a social network including players commenting on building an item within the game.

FIG. 26A illustrates an example of a user interface 2600 within a social network with a player notification about one player building a game-play item within the game and other player comments on the player notification. For example, the post 2602 indicates that the player is trying to finish building a hangar. The notification 2610 indicates that for the approval, the poster and commenter receive three energy points. The notification 2612 indicates that for the comment "#fuel drums" from a player, the poster receives an in-game item.

Figure 26B:
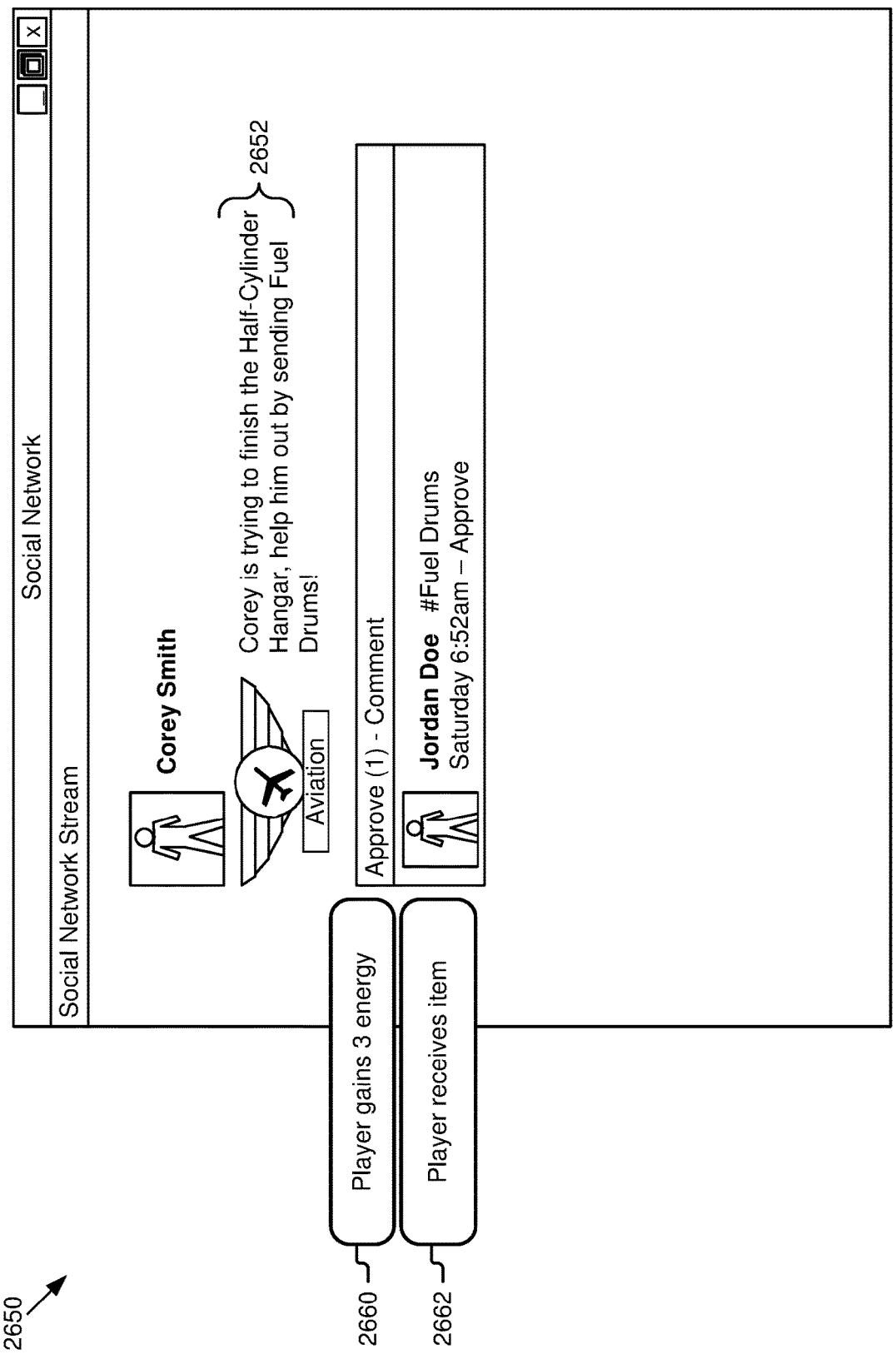
FIG. 26B is a graphical representation illustrating an example user interface for interacting with a game via a social network including non-players commenting on building an item within the game.

FIG. 26B illustrates an example of a user interface 2650 within a social network with a player notification about one player building a game-play item within the game and other non-player comments on the player notification. The notification 2660 indicates that for the approval, the player (i.e., poster) receives three energy points. The notification 2662 indicates that for the comment "#fuel drums" from a non-player, the player (i.e., poster) receives an in-game item.

Figure 27A:
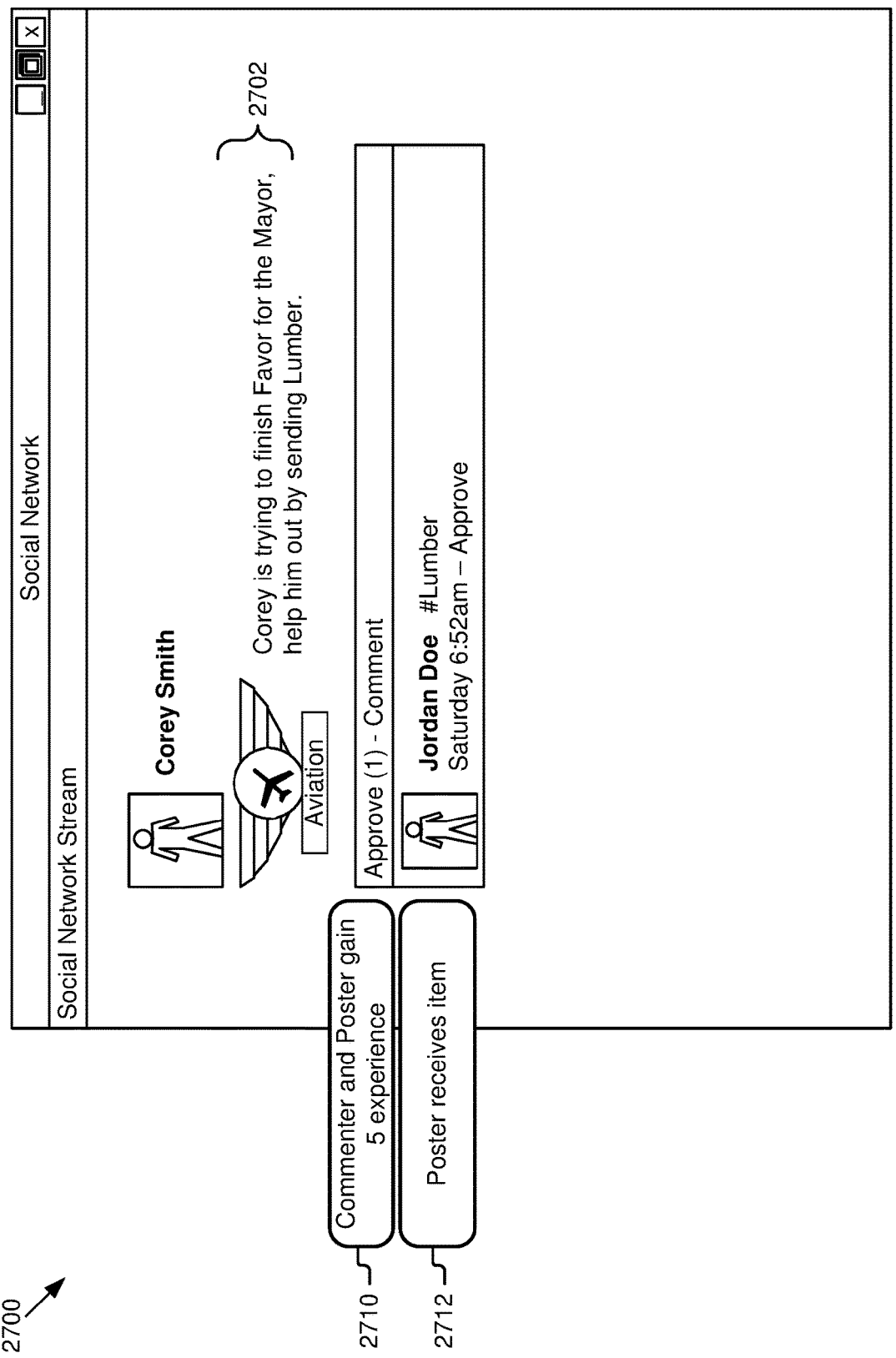
FIG. 27A is a graphical representation illustrating an example user interface for interacting with a game via a social network including players commenting on a task within the game.

FIG. 27A illustrates an example of a user interface 2700 within a social network with a player notification about one player performing a task within the game and other player comments on the player notification. For example, the post 2702 indicates that the player is trying to finish a task, in this example, "favor for the mayor." The notification 2710 indicates that for the approval, the poster and commenter receive five experience points. The notification 2712 indicates that for the comment "#lumber" from a player, the poster receives an in-game item.

Figure 27B:
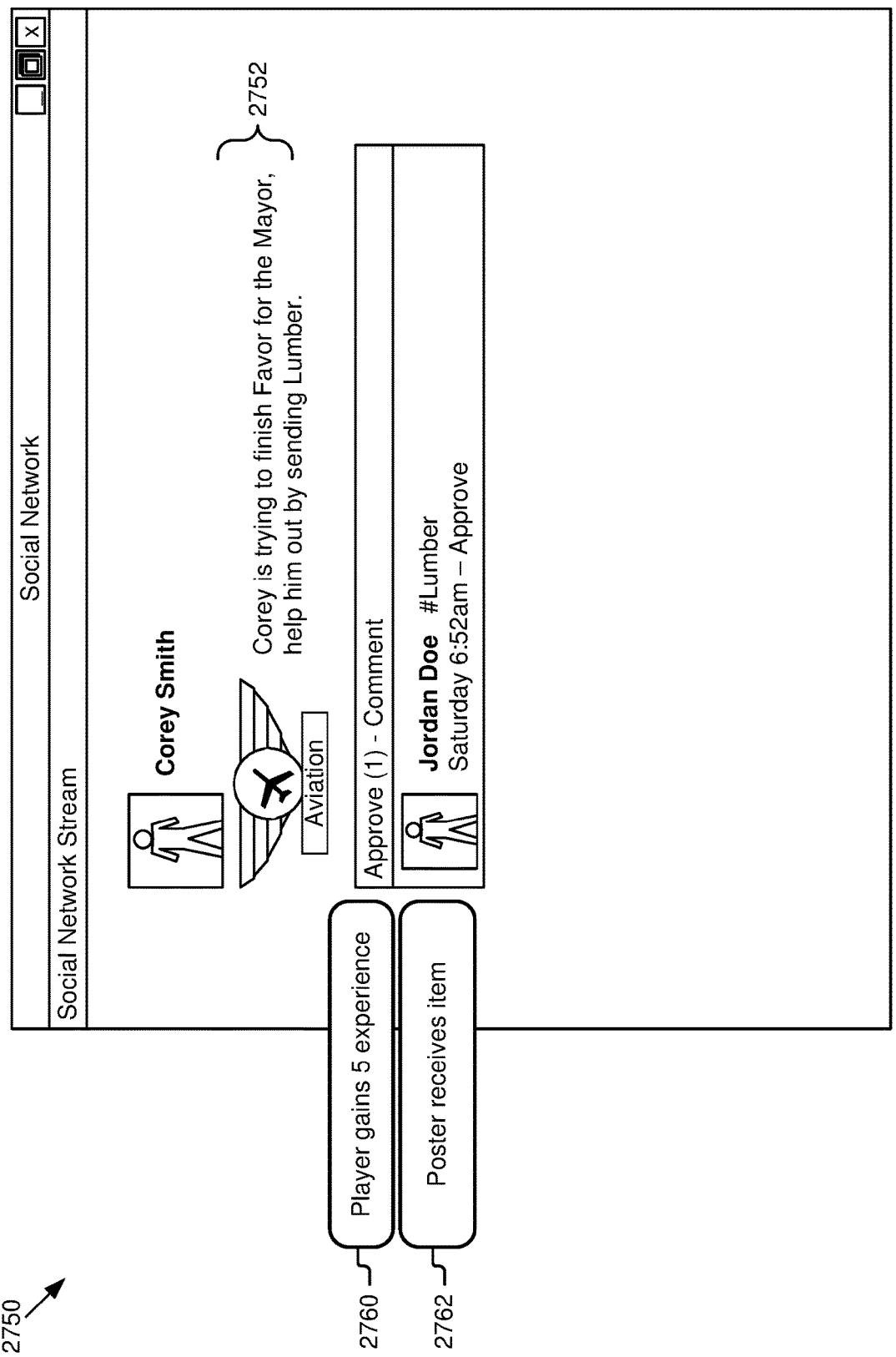
FIG. 27B is a graphical representation illustrating an example user interface for interacting with a game via a social network including non-players commenting on a task within the game.

FIG. 27B illustrates an example of a user interface 2750 within a social network with a player notification about one player performing a task within the game and other non-player comments on the player notification. For example, the post 2752 indicates that the player is trying to finish a task, in this example, "favor for the mayor." The notification 2760 indicates that for the approval, the player (i.e., poster) receives five experience points. The notification 2762 indicates that for the comment "#lumber" from a non-player, the player (i.e., poster) receives an in-game item.

Figure 28A:
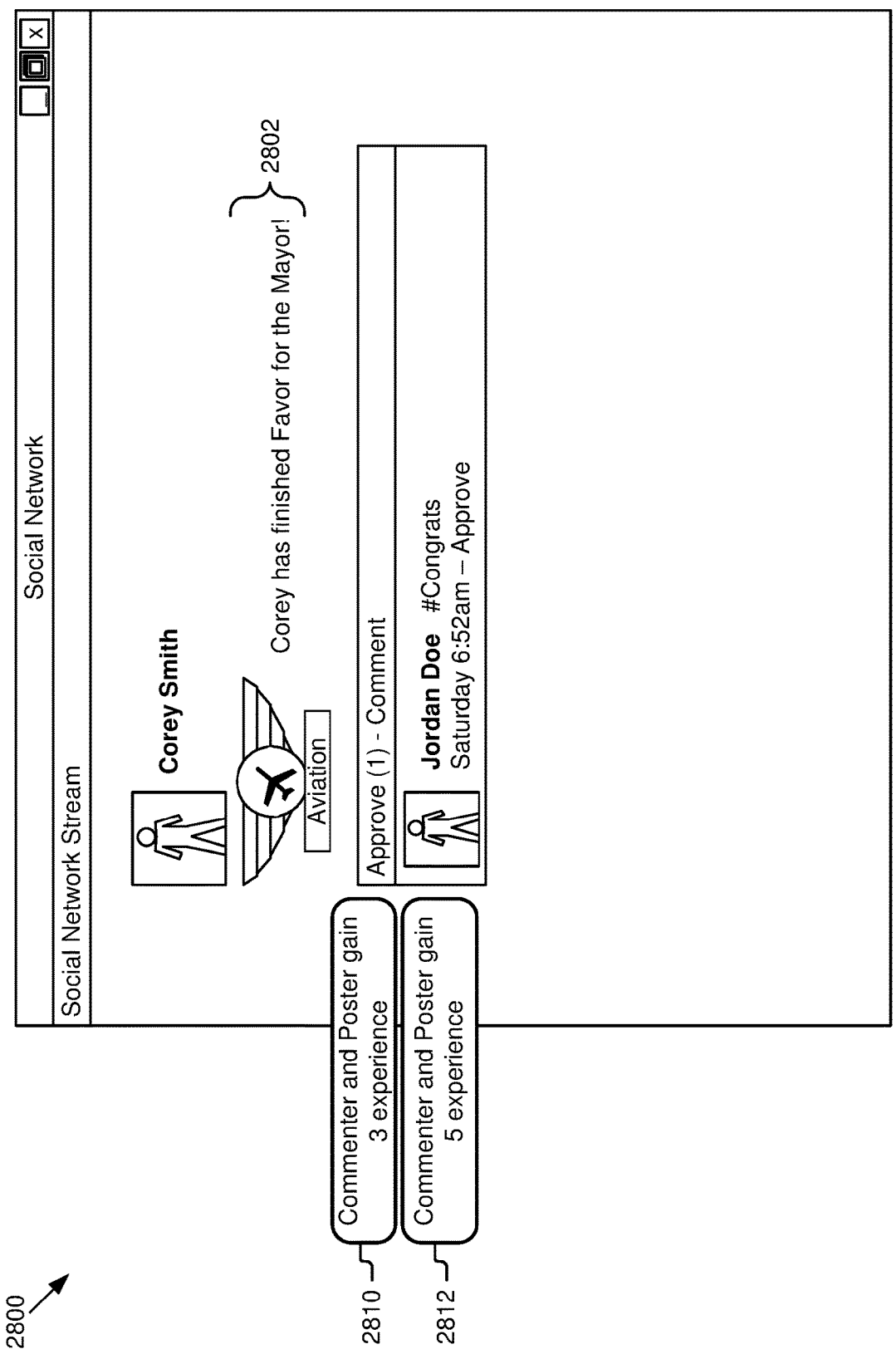
FIG. 28A is a graphical representation illustrating an example user interface for interacting with a game via a social network including players commenting on completing a task within the game.

FIG. 28A illustrates an example of a user interface 2800 within a social network with a player notification about one player finishing a task within the game and other player comments on the player notification. For example, the post 2802 indicates that the player has finished a task, in this example, "favor for the mayor." The notification 2810 indicates that for the approval, the poster and commenter receive three experience points. The notification 2812 indicates that for the comment "#congrats" from a player, the poster and commenter receive five experience points.

Figure 28B:
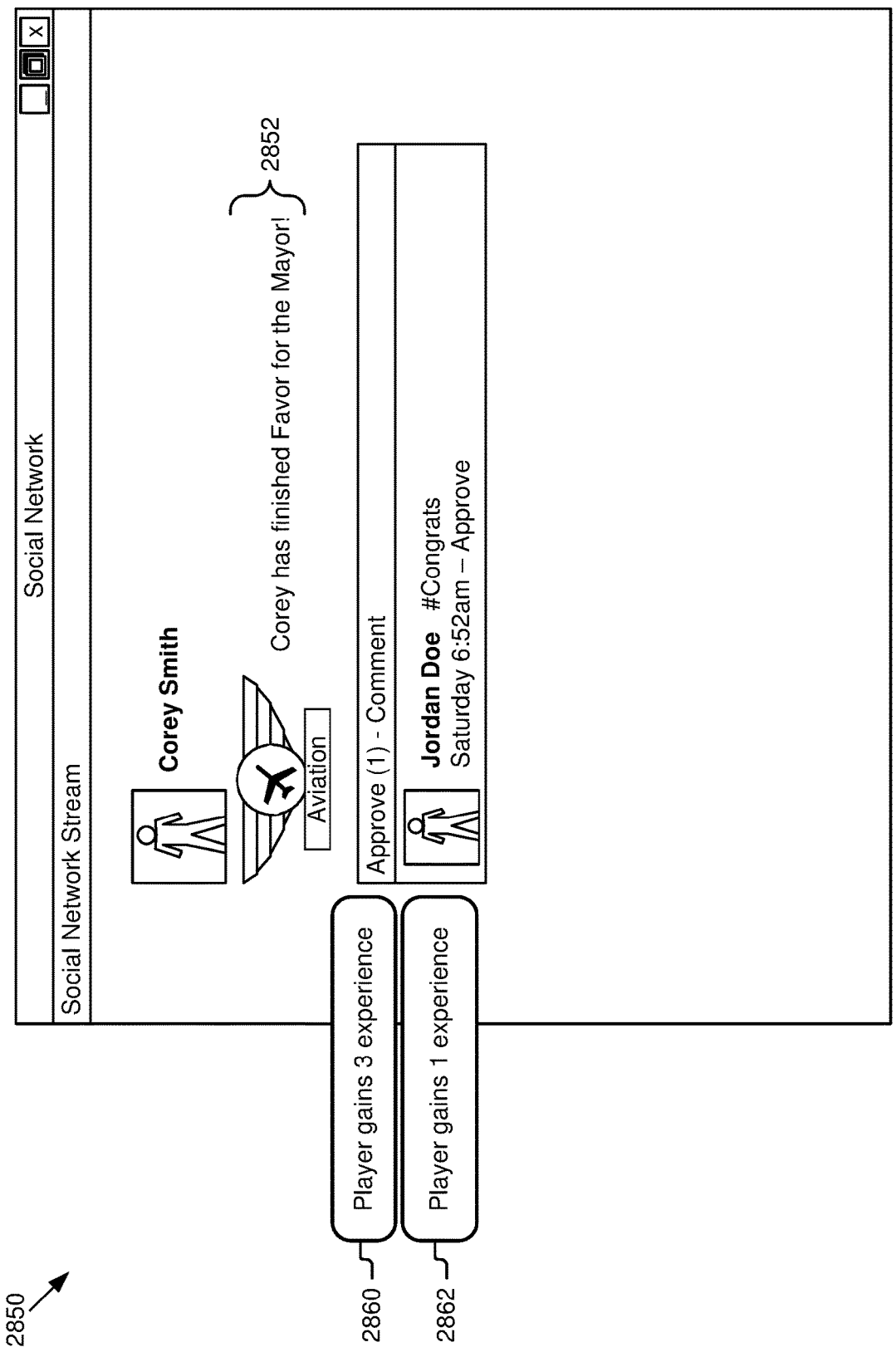
FIG. 28B is a graphical representation illustrating an example user interface for interacting with a game via a social network including non-players commenting on completing a task within the game.

FIG. 28B illustrates an example of a user interface 2850 within a social network with a player notification about one player finishing a task within the game and other non-player comments on the player notification. For example, the post 2852 indicates that the player has finished a task, in this example, "favor for the mayor." The notification 2860 indicates that for the approval, the player (i.e., poster) receives three experience points. The notification 2862 indicates that for the comment "#congrats" from a non-player, the player (i.e., poster) receives one experience point.

Figure 29A:
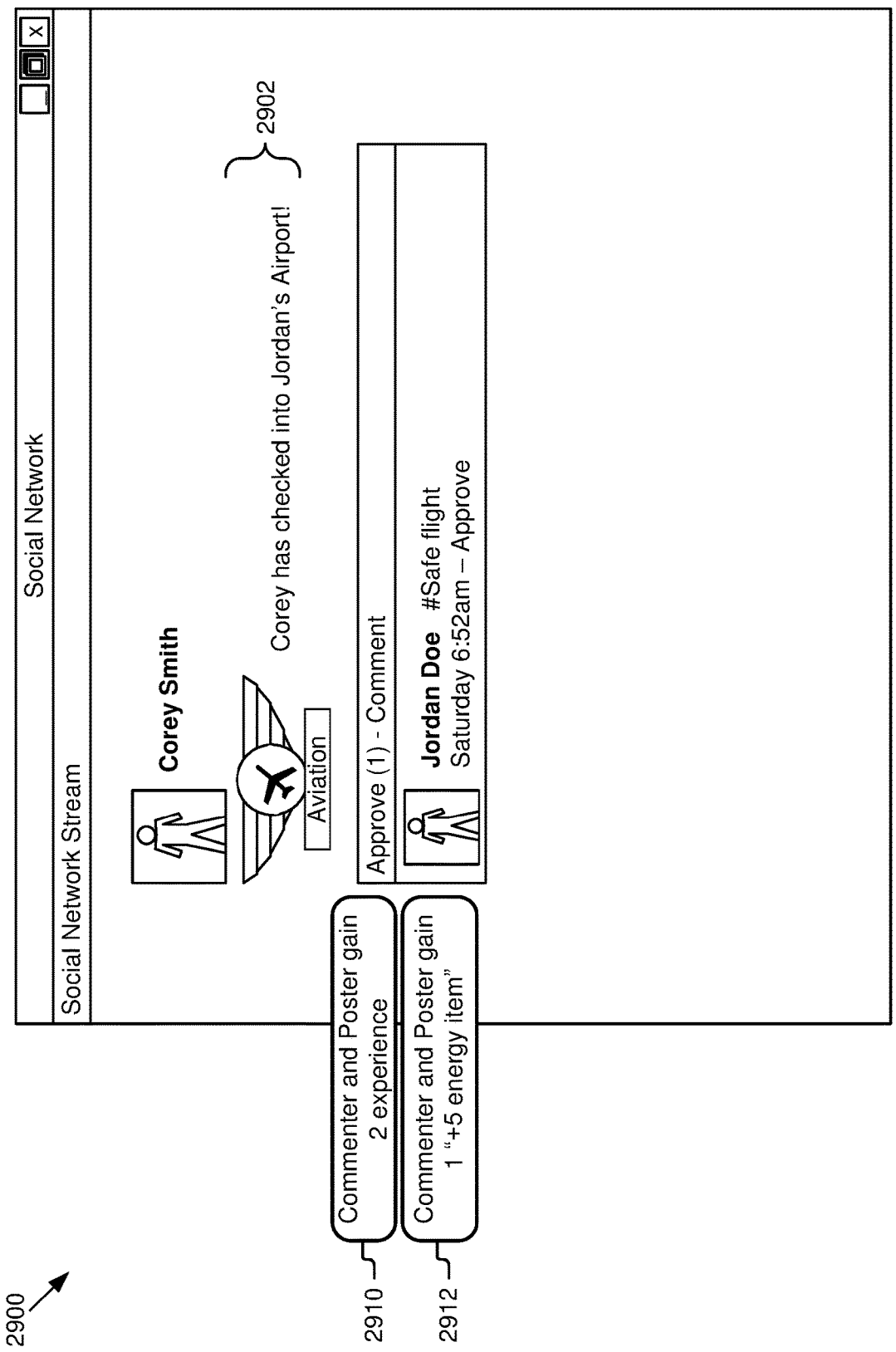
FIG. 29A is a graphical representation illustrating an example user interface for interacting with a game via a social network including players commenting on arriving at another player's virtual area within the game.

FIG. 29A illustrates an example of a user interface 2900 within a social network with a player notification about one player arriving at another player's area within the game and other player comments on the player notification. For example, the post 2902 indicates that the player has checked into a friend's airport. The notification 2910 indicates that for the approval, the poster and commenter receive two experience points. The notification 2912 indicates that for the comment "#safe flight" from a player, the poster and commenter receive one "+5 energy item."

Figure 29B:
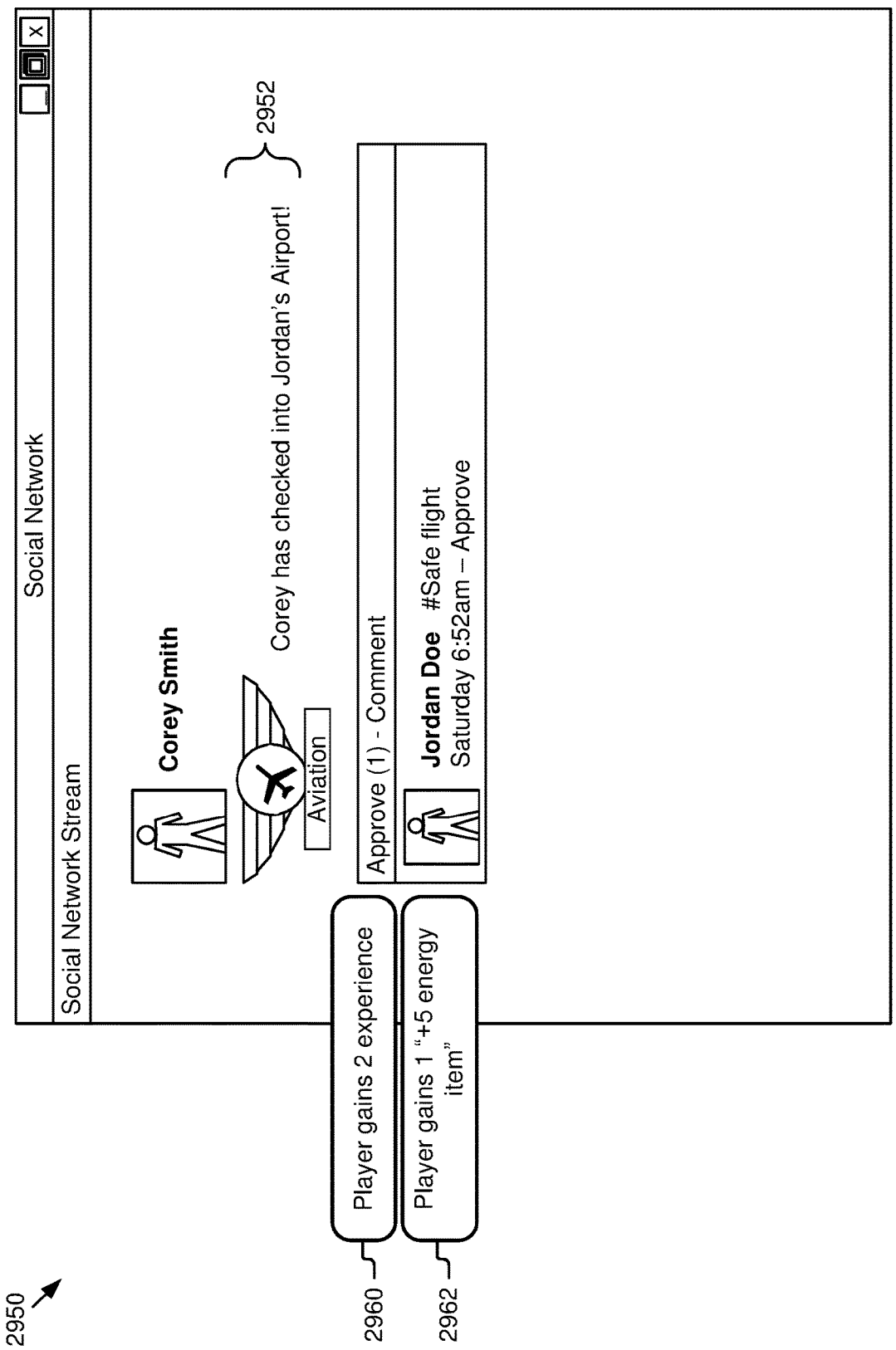
FIG. 29B is a graphical representation illustrating an example user interface for interacting with a game via a social network including non-players commenting on arriving at another player's virtual area within the game.

FIG. 29B illustrates an example of a user interface 2950 within a social network with a player notification about one player arriving at another player's area within the game and other non-player comments on the player notification. For example, the post 2952 indicates that the player has checked into a friend's airport. The notification 2960 indicates that for the approval, the player (i.e., poster) receives two experience points. The notification 2962 indicates that for the comment "#safe flight" from a non-player, the player (i.e., poster) receives one "+5 energy item."

Figure 30:
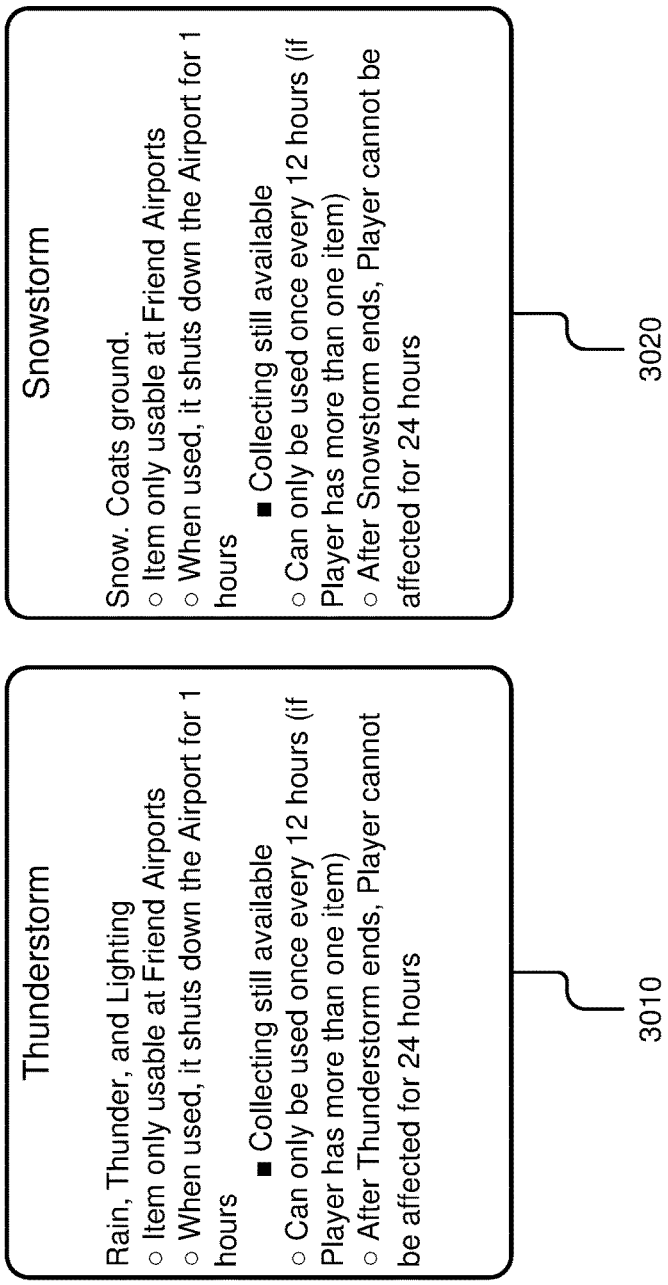
FIG. 30 is a graphical representation illustrating an example user interface with displays of weather items and their descriptions.

FIG. 30 illustrates an example of a user interface 3000 including two examples of game states that affect game play. The first example 3010 is a thunderstorm game item that may be used at friend's airports to add rain, thunder, lightning to the airport, and to shut down the airport for an hour. For example, this item can only be used once every 12 hours and after the thunderstorm ends the player cannot be affected for 24 hours. The second example 3020 is a snowstorm game item that may be used at friend's airports to add snow to the airport, and to shut down the airport for an hour. For example, this item can only be used once every 12 hours and after the thunderstorm ends the player cannot be affected for 24 hours.

Figure 31:
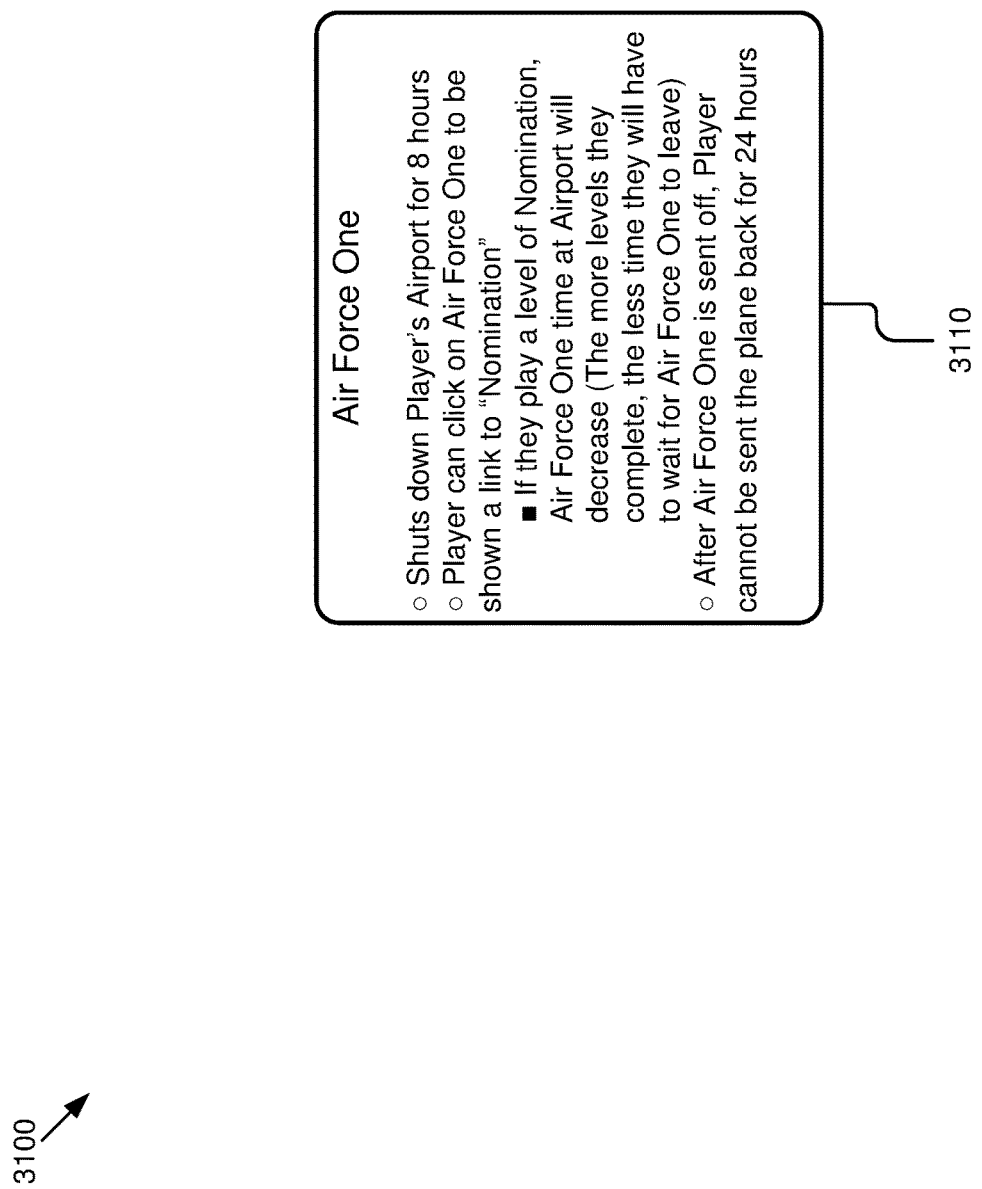
FIG. 31 is a graphical representation illustrating an example user interface configured to provide a game state that affects game play.

FIG. 31 illustrates an example of a user interface 3100 including one example of a game state that affects game play. The example 3110 is of Air Force One (i.e., the president) visiting the player's airport. For example, this shuts down the player's airport for 8 hours, the player can interact with Air Force One via a nomination link for decreasing the time Air Force One is at the airport, and after Air Force One is sent off, the player cannot be sent the airplane again for 24 hours.

Figure 32:
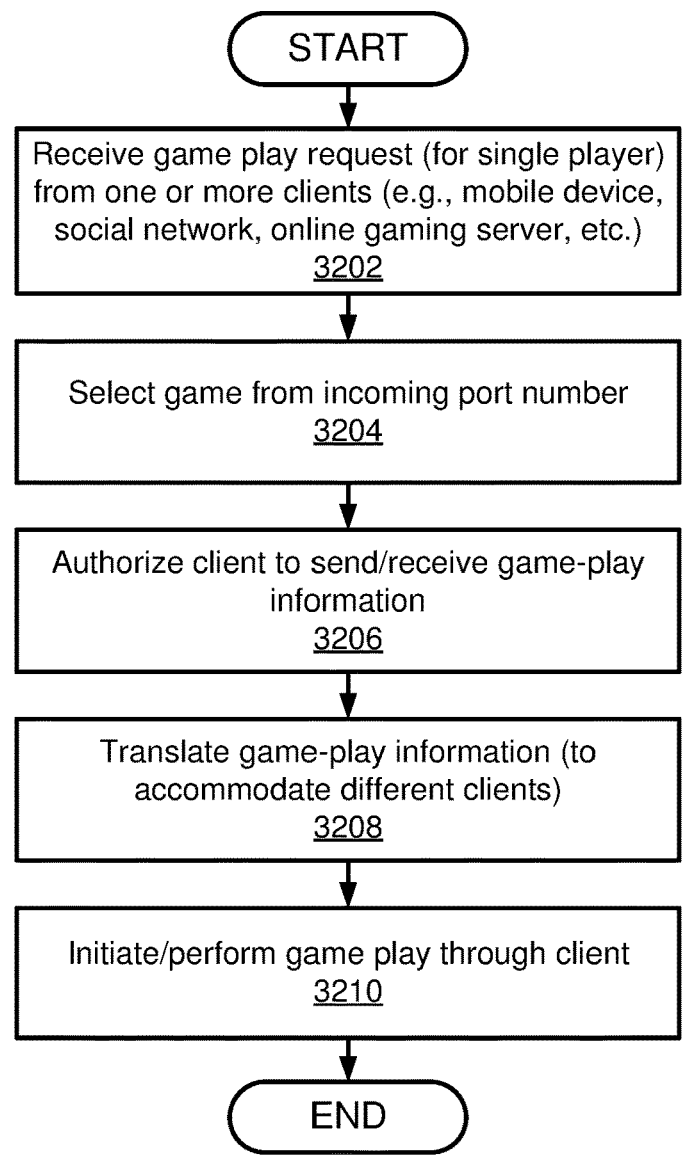
FIG. 32 is a flow chart illustrating an example general method for allowing access from one or more clients (e.g., players or gamers).

Referring now to FIG. 32, an example method 3200 illustrates the operations involved with allowing access from one or more clients (users, players, or gamers) to a game. The method 3200 begins and proceeds (either directly or via other operations) to a block 3202 including one or more operations configured to receive a game play request (for a single player) from one or more clients (for example, via a mobile device, a social network, online gaming server etc.). From there the method 3200 proceeds to the next block 3204, which includes one or more operations configured to select a game from an incoming port number. From there, the method 3200 proceeds to the next block 3206, which includes one or more operations configured to authorize a client to send/receive game-play information. From that point the method 3200 proceeds to the next block 3208, which includes one or more operations for translating game-play information in order to accommodate different clients. From there, the method 3200 proceeds to the next block 3210 including one or more operations configured to either initiate or perform game play through the client. From there, the method 3200 (or subroutine) may either end or proceed to other blocks of operations.

Figure 33:
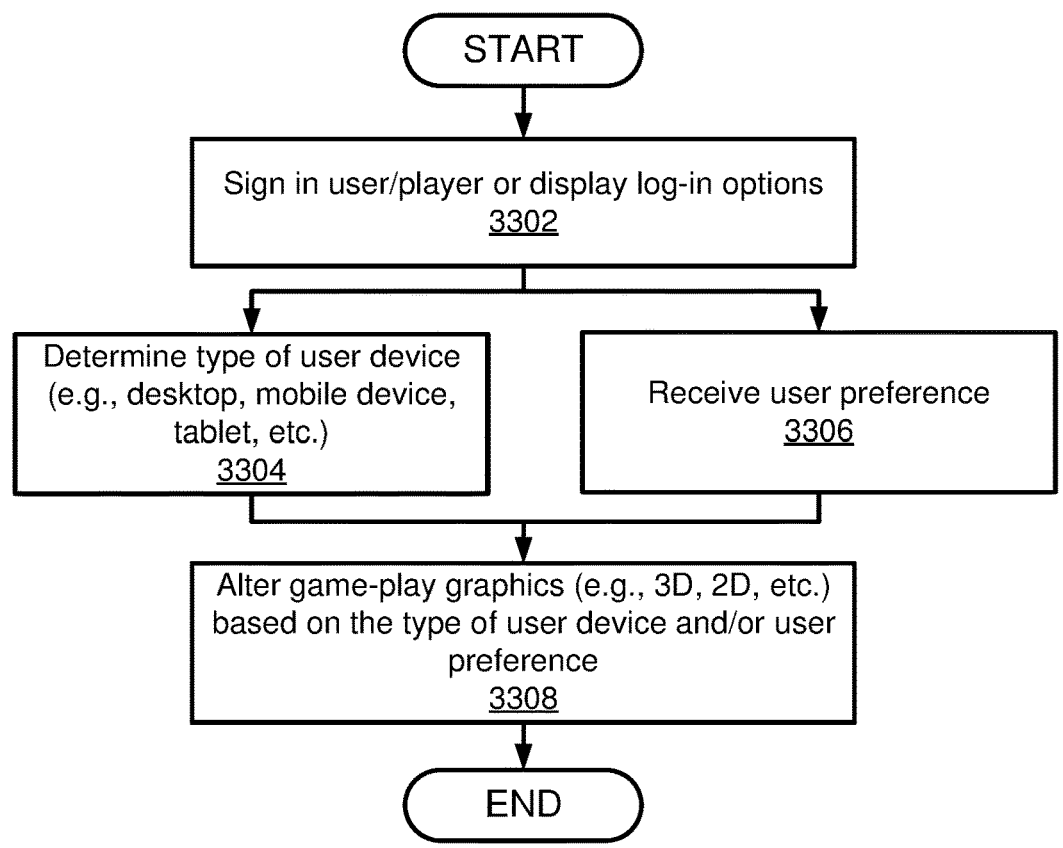
FIG. 33 is a flow chart illustrating an example method for determining graphics based on a user device or platform.

Referring now to FIG. 33, an example method 3300 illustrates how to determine game-play graphics based on a user device. The method 3300 begins and proceeds to block 3302, which includes one or more operations configured to sign in a user/player or display log-in options. The method 3300 proceeds to either block 3304 or 3306. In block 3304, the method 3300 includes one or more operations for determining the type of user device (for example, desktop, mobile device, tablet etc.) In block 3306, the method 3300 includes one or more operations for receiving user preferences. From blocks 3304 and 3306, the method 3300 proceeds to block 3308, at which stage, with one or more operations, the method alters game-play graphics (for example, 3D, 2D, etc.) based on the type of user device and/or user preference. From there the method 3300 (or subroutine) may end or proceed to other subroutines.

Figure 34:
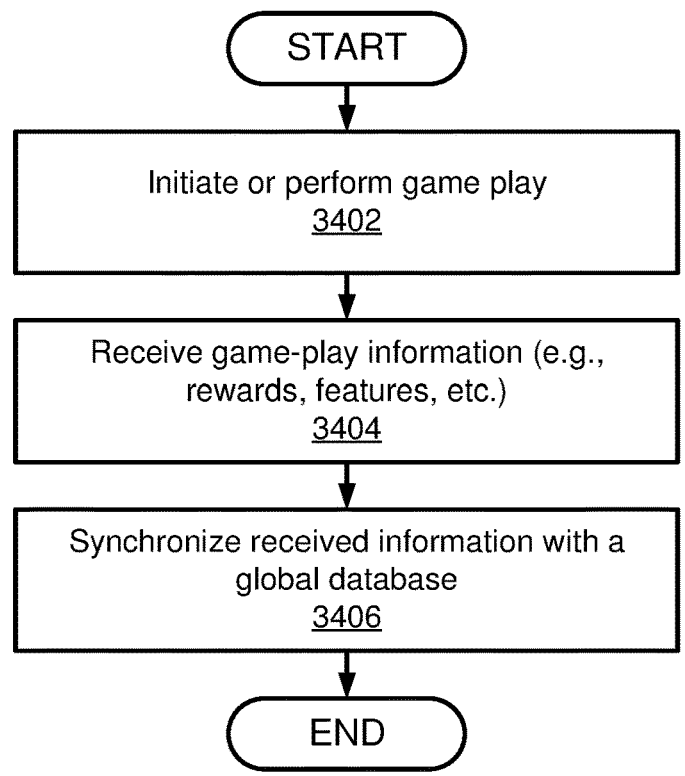
FIG. 34 is a flow chart illustrating an example method for synchronizing information across platforms.

Referring now to FIG. 34, a method 3400 for synchronizing information across platforms begins and proceeds (either directly or via other operations) to a block 3402, including one or more operations for either initiating or performing game play. From there, the method 3400 proceeds to the next block 3404, including one or more operations for receiving game-play information (for example, rewards, features, etc.) From there, the method 3400 proceeds to the next block 3406, which includes one or more operations configured to synchronize information that is received with a global database. From there, the method 3400 (a subroutine) may either end or proceed to other operations.

Figure 35:
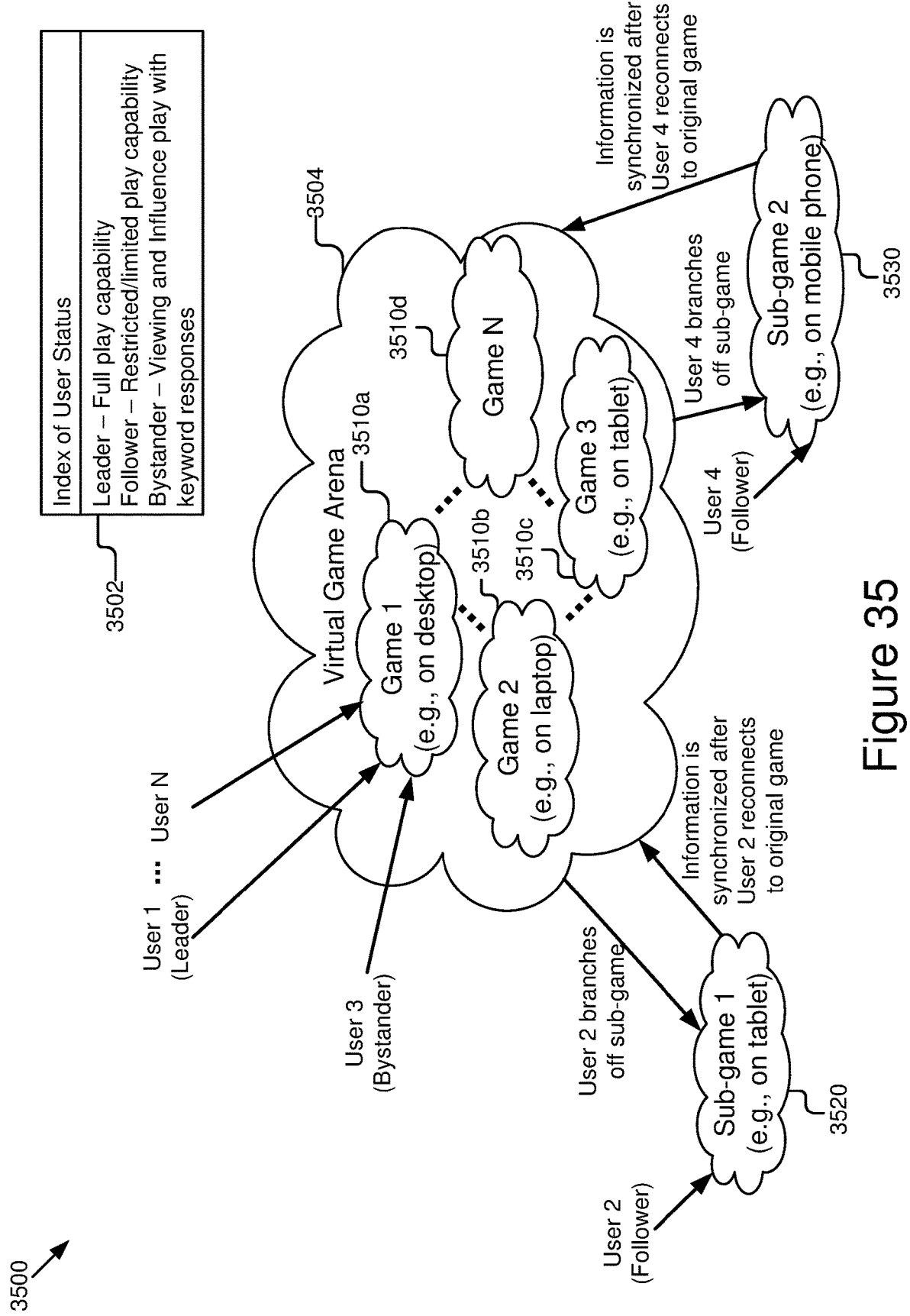
FIG. 35 is a graphical representation of a "virtual" game arena illustrating several games (Game 1 through Game N) at play and reflecting variable user status for each of the users and the platforms used by each user to facilitate synchronized and integrated play.

Referring now to FIG. 35, a graphical representation illustrates generally as indicated by reference numeral 3500 integrated play by various users with a different user status. An index of user status is indicated by reference numeral 3502 indicating a "leader," a "follower," and a "bystander." The examples of user "status" indicated accords full play capabilities to a "leader," "restricted" or "limited" play capabilities to a "follower" and "viewing" and capability to "influence" play with keyword responses to a "bystander." FIG. 35 illustrates that multiple users, for example, Users 1, 2, 3, through N, each with a different status, for example, either "leader," "bystander," or "follower," may initiate games, for example, Game 1 (indicated by reference numeral 3510a), Game 2 (indicated by reference numeral 3510b), Game 3 (indicated by reference numeral 3510c) through Game N (indicated by reference numeral 3510d). Each of these games is played in a virtual game arena 3504, either individual or shared, hosted on a dedicated server or in a cloud. Game 1 is displayed or accessed on a desktop, Game 2 on a laptop, Game 3 on a tablet. As one example, User 1 (a "leader") is illustrated as accessing Game 1 on a desktop. As another example, User 3 (a "bystander") is illustrated as viewing Game 1. As yet another example, User 2 (a "follower") is illustrated as branching off to a sub game 1 (indicated by reference numeral 3520), for separate play on a tablet. Any information accumulated during the sub game is synchronized after User 2 reconnects to the original game. A user with "bystander" status (User 3) may influence the game by responding to wall posts or responding with a key word. Reward or point allocation is based on the status of the player. For example, a player playing a game (for example, a follower), receives rewards or takes away from the main game player more than a bystander does. A bystander does not receive any rewards; its role is simply to assist a friend or influence game play by a "core" player. As another example, User 4 (for example, a follower) may branch off to a sub-game on a mobile phone. Any information for or on the game is synchronized after User 4 reconnects to the original game.

Figure 36:
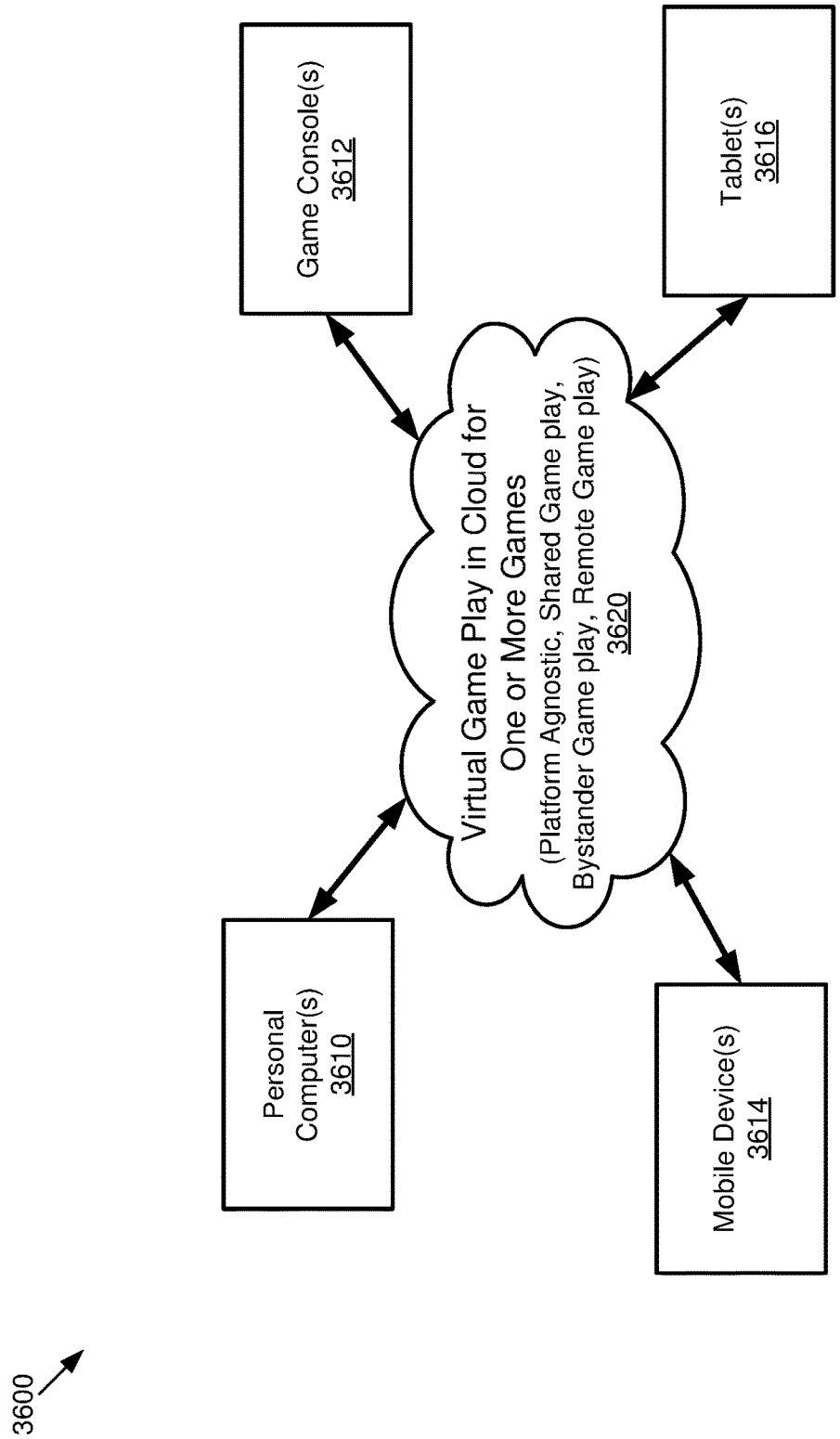
FIG. 36 is a graphical representation/block diagram of example virtual game play in a cloud of one or more games, each accessed via different platforms.

Referring now to FIG. 36, a graphical representation illustrates that virtual game play may be operated in a cloud for one or more games, concurrently or otherwise, as indicated by reference numeral 3620. The platform may be agnostic facilitating shared game play, bystander game play or remote game play. Players or gamers may access this virtual game play either via a personal computer 3610, a game console 3612, a mobile device 3614, or a tablet 3616.

Figure 37:
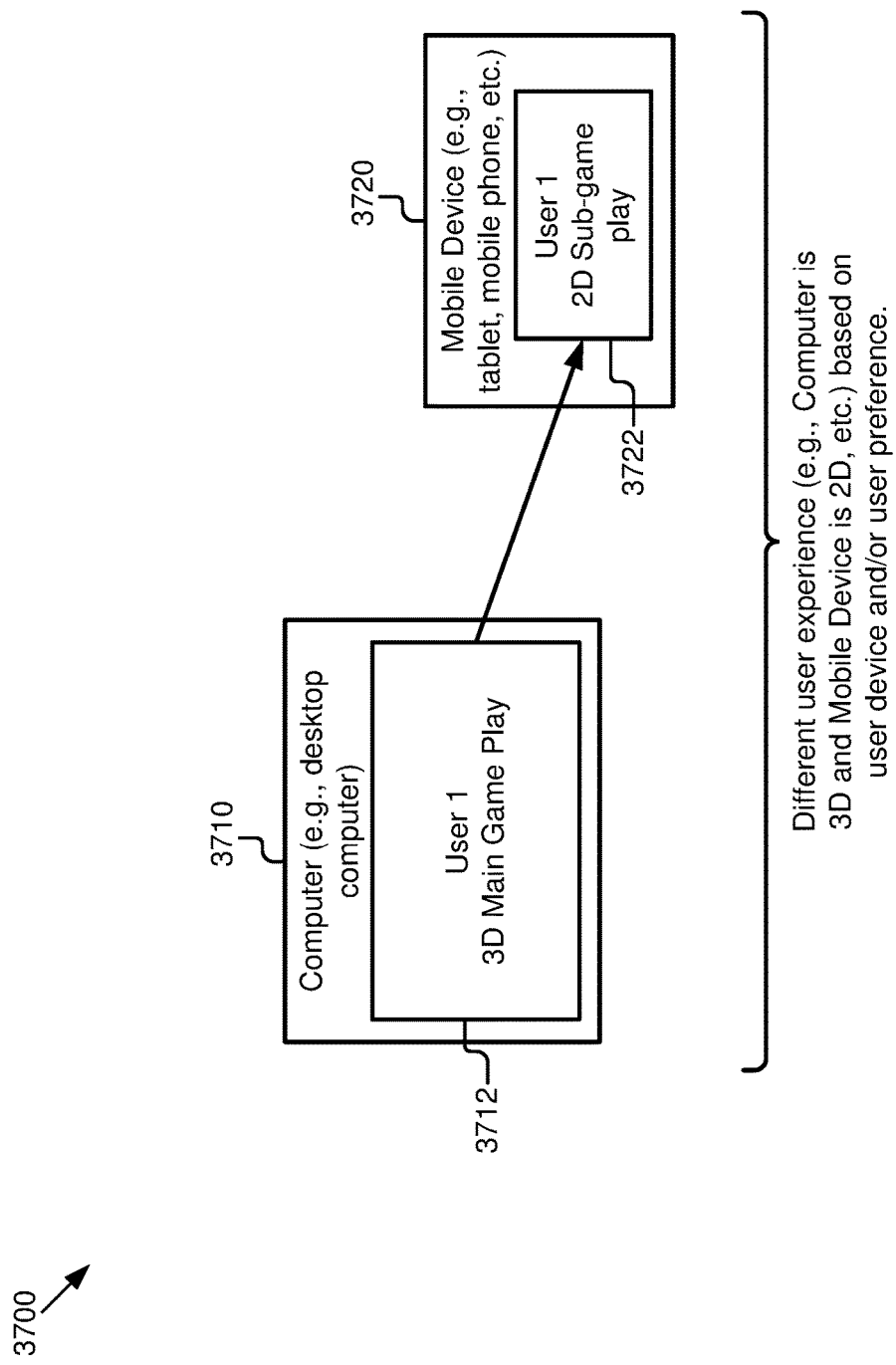
FIG. 37 is a graphical representation illustrating an example of a different user experience based on a user device and/or user preference.

FIG. 37 illustrates a graphical representation indicated generally by reference numeral 3700 to show different user experience. For example, a particular user (User 1) may experience a three-dimensional (3D) display on a computer 3710 (for example, a desktop) during the main game 3712. From the main game, the same user (User 1) may branch off to a sub-game play to experience a two-dimensional display (2D) as indicated by reference numeral 3722 on a mobile device 3720 (for example, on either a tablet, a mobile device, etc.).

Figure 38:
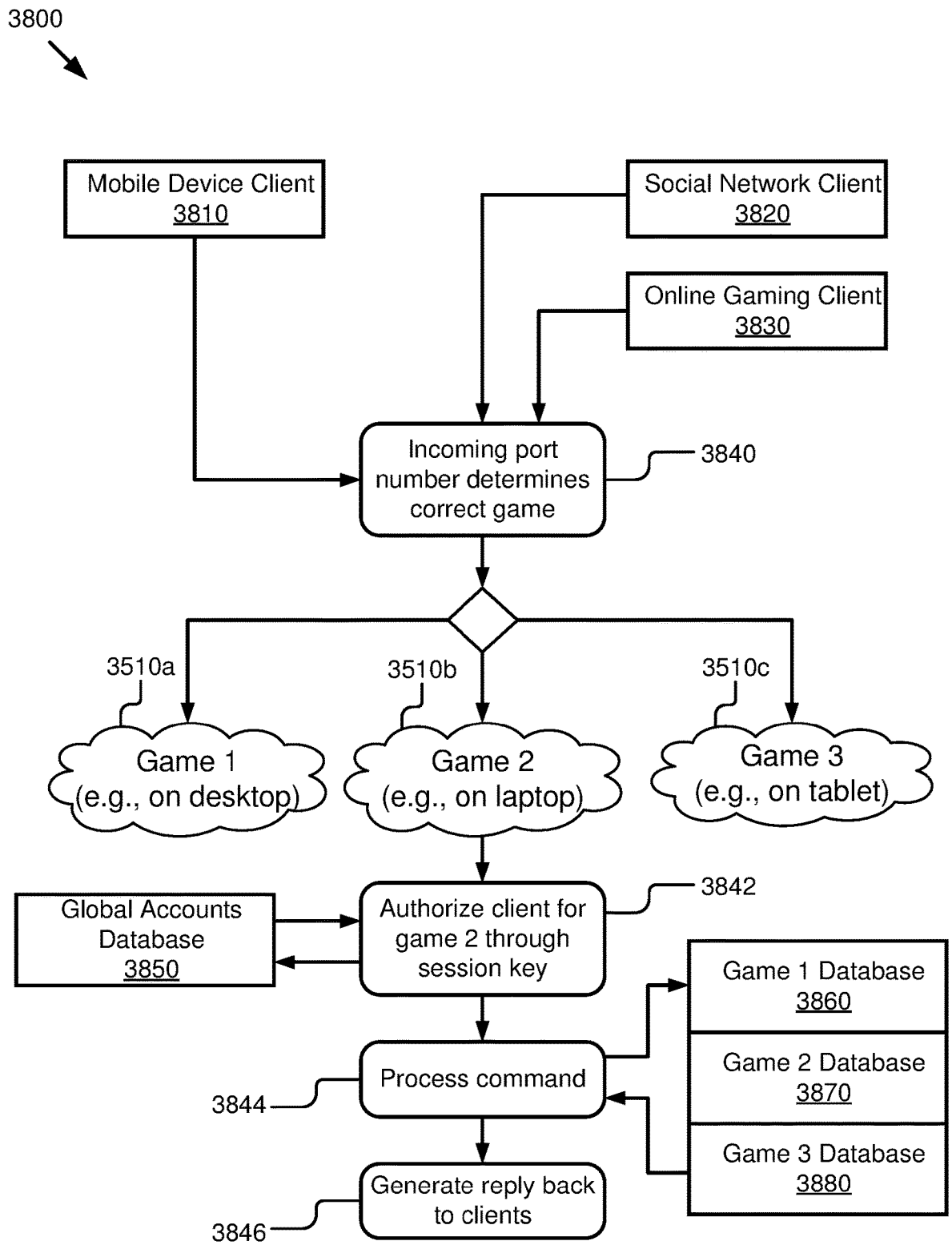
FIG. 38 is a block diagram illustrating integrated and synchronized play from various access points.

FIG. 38 illustrates integrated play of Game 1 on a desktop (3510a), Game 2 on a laptop (3510b), and Game 3 on a tablet (3510c). As illustrated, each of these games may be accessed via a mobile device client 3810, a social network client 3820, and an online gaming client 3830. An incoming port number determines the appropriate game (3840). As one example, a client may be authorized for play in Game 2 through a session key, as illustrated by reference numeral 3842. Authorization may be with communication with a global accounts database 3850. Commands are processed (3840) with communication with databases (Game 1 database 3860, Game 2 database 3870, and Game 3 database 3880) and replies are generated back to clients (3846).

Figure 39:
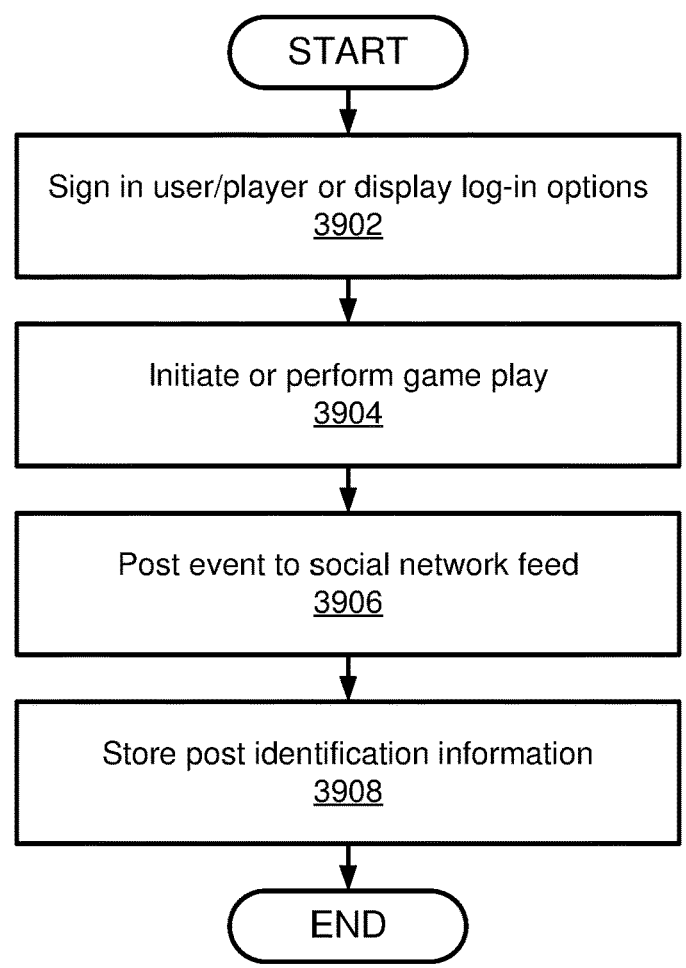
FIG. 39 is a flow chart illustrating an example general method for posting game-play activity on a social network.

FIG. 39 illustrates an example method for posting game-play activity on a social network. It should be understood that the order of the operations in FIG. 39 is merely by way of example and may be performed in different orders than those that are illustrated and some operations may be excluded, and different combinations of the operations may be performed. In the example method illustrated, one or more operations may include signing in or displaying log-in options, as illustrated by block 3902. The method 3900 then proceeds to the next block 39039 and may include one or more operations to initiate or perform game play. The method 3900 then proceeds to the next block 3906 and may include one or more operations to post an event to a social network feed. The method 3900 then proceeds to the next block 3908 and may include one or more operations to store post identification information.

Figure 40:
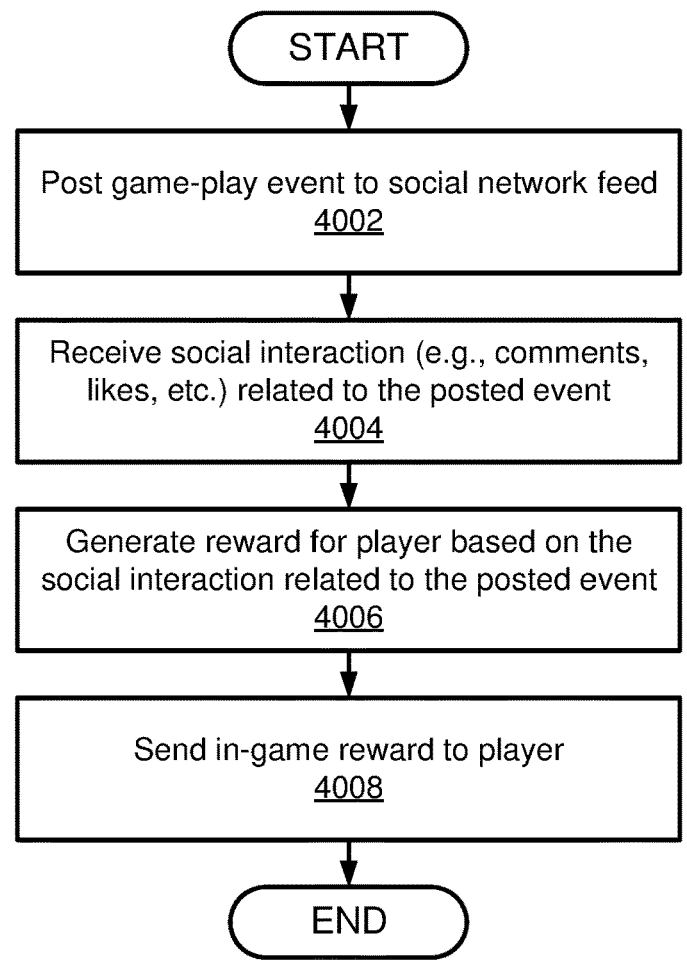
FIG. 40 is a flow chart illustrating an example general method for interacting with a game based on social network activity.

FIG. 40 illustrates an example method for interacting with a game based on social network activity. It should be understood that the order of the operations in FIG. 40 is merely by way of example and may be performed in different orders than those that are illustrated and some operations may be excluded, and different combinations of the operations may be performed. In the example method illustrated, one or more operations may include posting game-play event to the social network feed, as illustrated by block 4002. The method 4000 then proceeds to the next block 4004 and may include one or more operations to receive social interaction (e.g., comments, likes, etc.) related to the posted event. The method 4000 then proceeds to the next block 4006 and may include one or more operations to generate a reward for the player based on the social interaction related to the posted event. The method 4000 then proceeds to the next block 4008 and may include one or more operations to send in-game reward to player.

Figure 41:
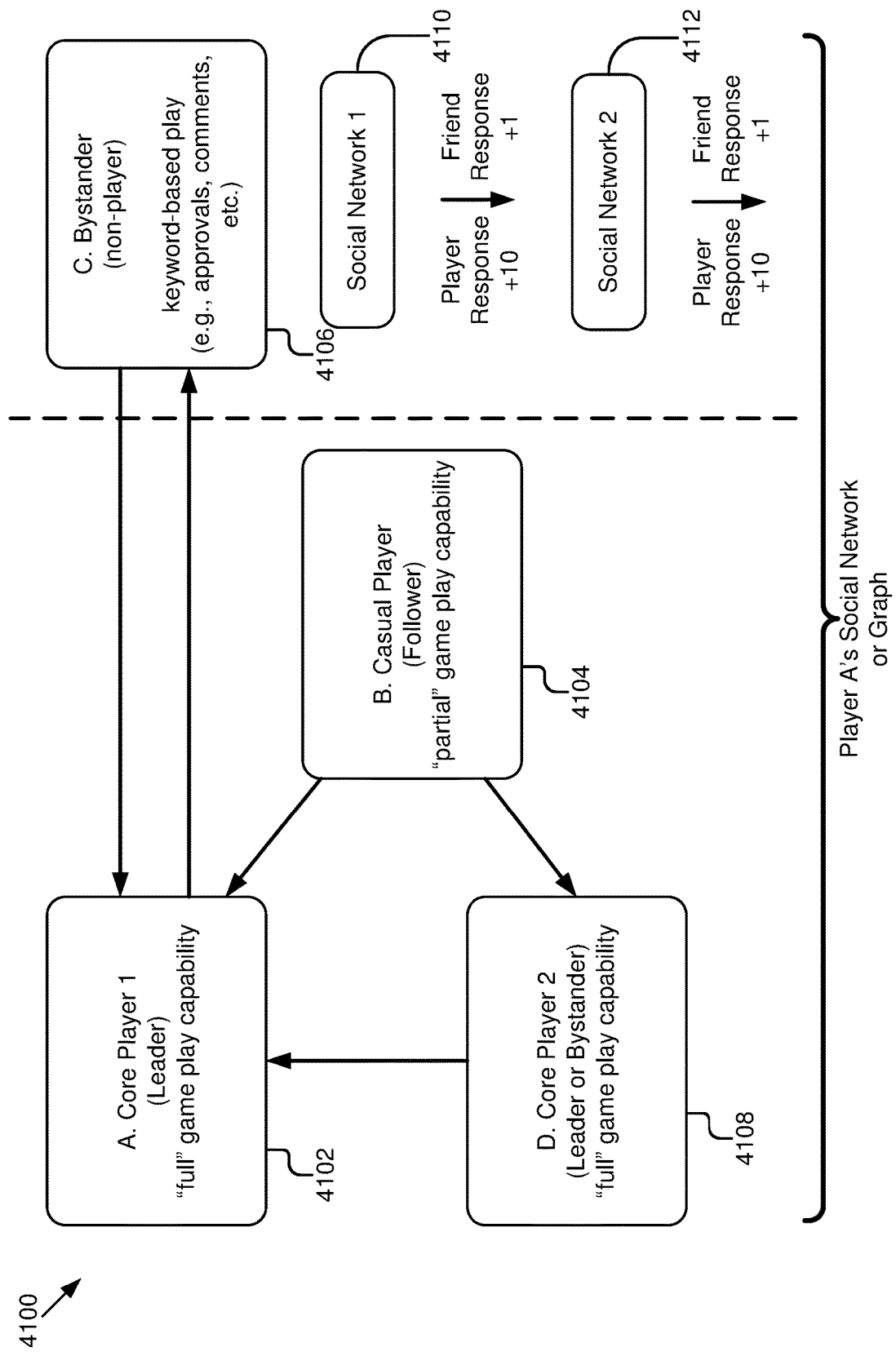
FIG. 41 is a graphical representation of a particular user's (Player A) social network or social graph.

FIG. 41 illustrates a video gaming scenario, with two core players 1 and 2 (at A and D), who have a "leader" status, indicated by reference numerals 4102 and 4108. A "casual" player or "follower" (at B) is illustrated by reference numeral 4104 and has the capability to influence both the core players, as indicated by the arrows. Additionally, a "core" player, for example, Player 2, can participate as a "bystander" as well and influence another "core" player, Player 1. A non-player or "bystander" also participates (at C), providing keyword-based participation, as indicated by reference numeral 4106. All the various players interact with each other, some having larger impact (those that are "leader" or "core" players) on the play of another "core" player, whereas a "casual" player has a smaller or little impact on the play of others, and a "bystander" has even less impact.

As one example, a religious gaming application is described here. A "core" player may create his or her own church or organization. Another "core" player 2 may create his or her own church or organization as well. The "casual" player 3 may be a follower of both "core" Player 1 and Player 2, such that acts by the "follower" either enhance or detract a play by Player 1 or Player 2. By way of example, the follower Player 3 may give virtual money ($10 per day out of a $20) to each of the core players. Circumstances may change this flow of money, for example, "core" Player 2 upsets follower Player 3, who routes all of his virtual money to Player 1. Player 2 may retaliate against Player 3, by initiating an action against Player 1, creating a deficit in his or her account, thereby impacting the play by Player 1. Likewise, the bystander C may continue to influence plays by Player 1 or Player 2. Finally, FIG. 6 illustrates a social network 1, illustrated by reference numeral 4110 and a social network 2 illustrated by reference numeral 4112, each indicating Player responses and friend responses in Player A's social network or social graph.

Figure 42:
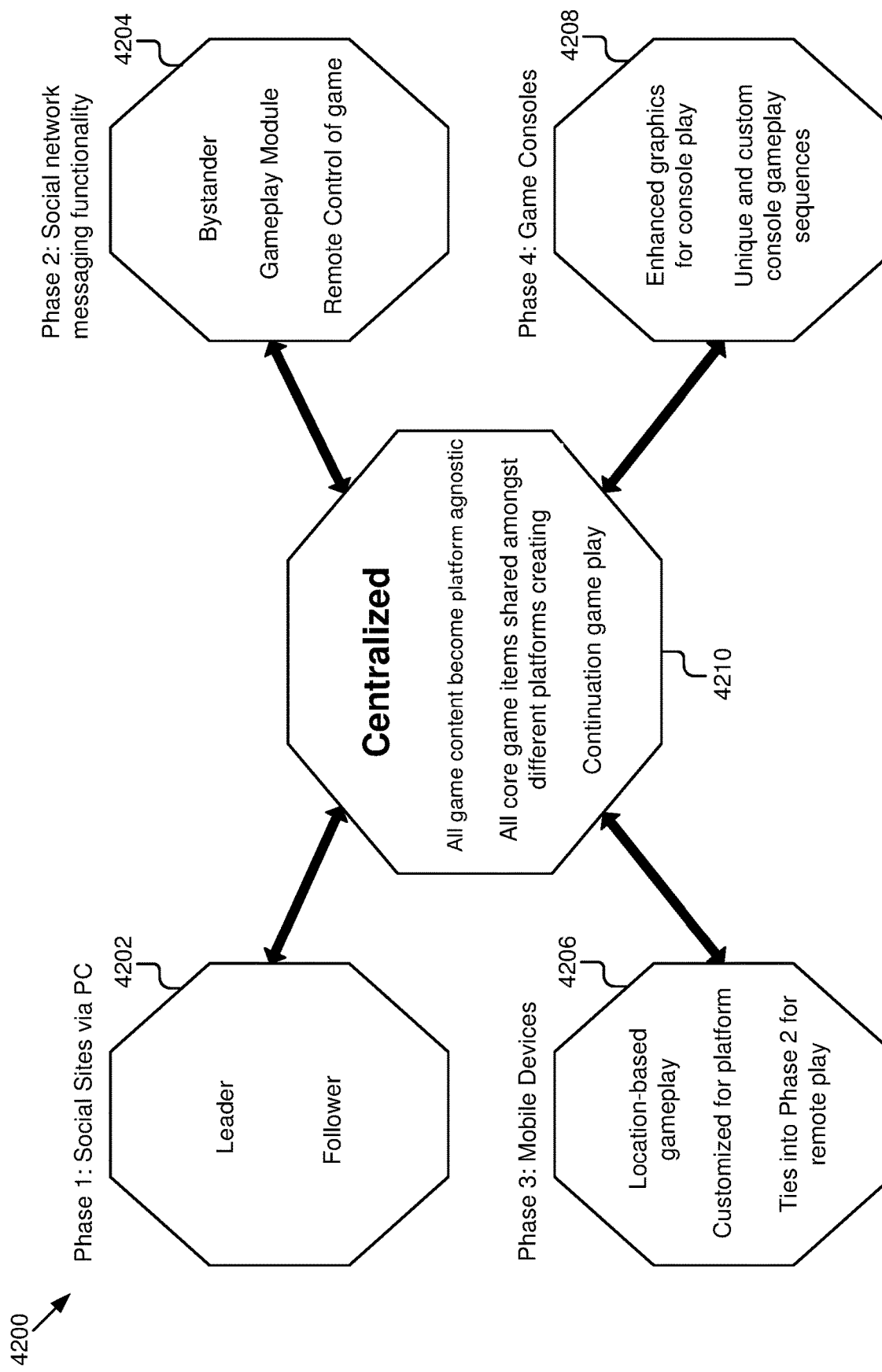
FIG. 42 is a graphical representation illustrating some embodiments of flexible architecture for the video gaming application shown in FIG. 1, showing the various types of platforms.

FIG. 42 illustrates an example general architecture configuration with a "leader" or "follower" gaming platform 4202, a "bystander" platform 4204, location-based game play platforms 4206, and game consoles 4208. The "leader" or "follower" platform may facilitate access to video gaming application via social sites and the "bystander" platform 4204 via social network messaging functionality. A flexible platform 4206 may facilitate location-based game play via mobile devices and game consoles 4208 may facilitate unique and custom console gameplay sequences. A central unit 4210 may facilitate continuous game play that is shared across all platforms, thereby making the game content agnostic.

Figure 43:
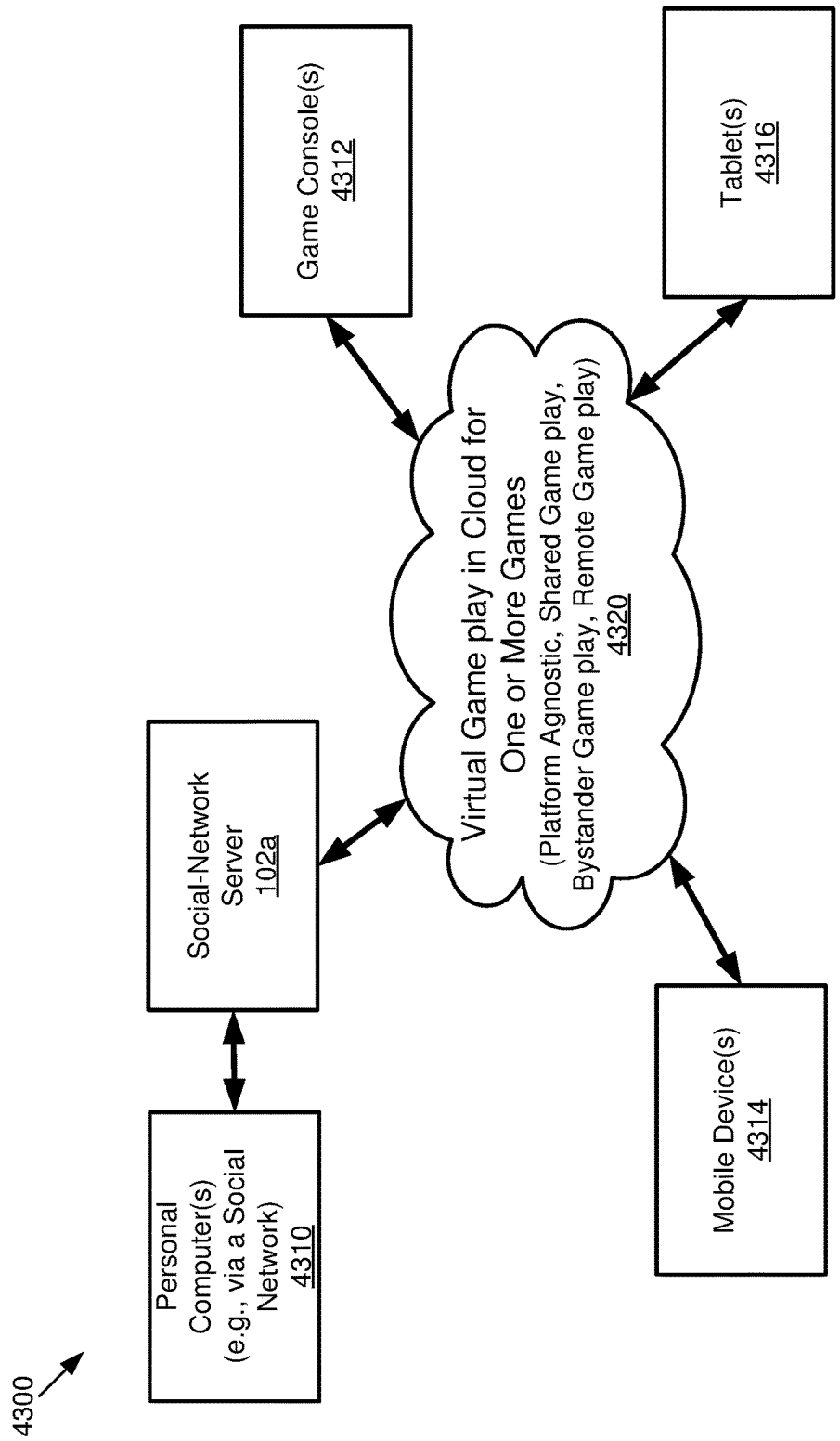
FIG. 43 is a graphical representation illustrating some embodiments of multiple devices connected for centralized game play.

FIG. 43 is a graphical representation 4300 illustrating some embodiments of multiple devices connected for centralized game play in a gaming application linked with a social network. For example, multiple user devices may be connected to a virtual game-play cloud 4320. The multiple user devices may be all the same or different and may include, for example, one or more personal computers 4310 via a social network server 102a, one or more game consoles 4312, one or more mobile devices 4314, and one or more tablets 4316. All or some of these devices are connected to the virtual game-play cloud for platform agnostic, shared, and synchronized gameplay.

Figure 44:
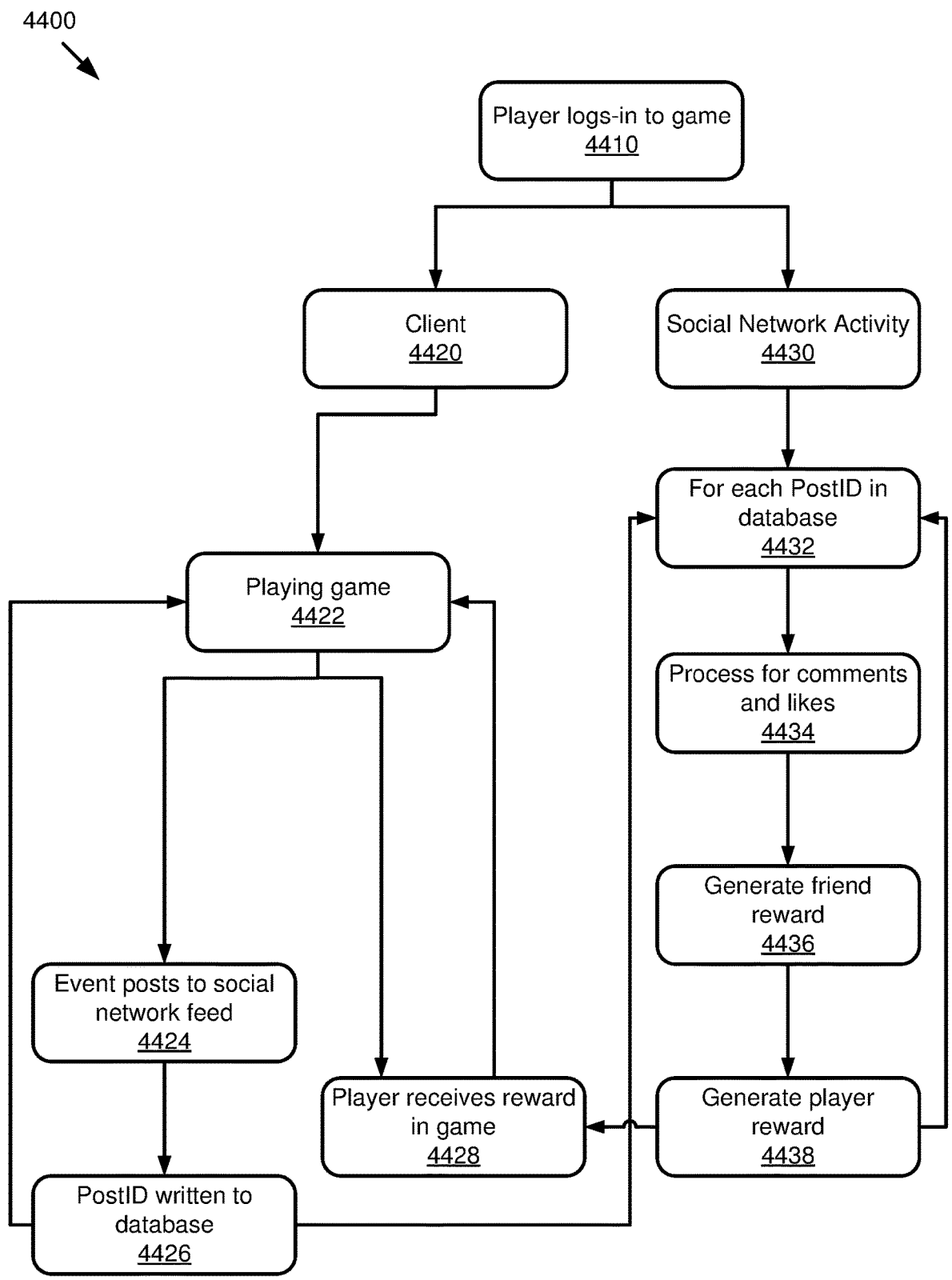
FIG. 44 is a graphical representation illustrating some embodiments of receiving an in-game reward based on social network activity.

FIG. 44 is a graphical representation 4400 illustrating some embodiments of receiving an in-game reward based on social network activity. In some implementations, in-game rewards (experience, coins, special game events etc.) may be triggered by the player's friends commenting or interacting with the player's game activity wall post. For example, the player signs in/logs-in to the game illustrated by block 4410. Simultaneously the player is logged into the client (that hosts the game application) and the social network to perform social network activity illustrated by blocks 4420 and 4430. While logged-in to the client, the player may participate in game play, as illustrated by block 4422. While playing the game, the player may post an event to a social network feed, as illustrated by block 4424 at which point the postID (for access) is written to a database, as illustrated by block 4426. Also while playing the game, the player may receive an in-game reward, as illustrated by block 4428.

In the social network, when the postID (for access) is written to a database, as illustrated by block 4426, the social network application (e.g., game application) loops through all postIDs generated in the game, as illustrated by block 4432. The social network application then processes each post for comments and likes, as illustrated by block 4434. The social network application then generates a friend reward within the social network, as illustrated by block 4436. The social network application then generates a player reward, as illustrated by block 4438 which also sends a request to the game to give the reward to the player in the game.

The comments and game actions they invoke which are described in FIGS. 5-44 are used by way of example, one skilled in the art will recognize that other examples and configurations are possible.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be implemented in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method using a plurality of computing devices in a cloud computing network, the method comprising:

providing access to a video gaming application operated in the cloud computing network to the plurality of computing devices;

enabling a first computing device of the plurality of computing devices to participate in a first gameplay of the video gaming application via the cloud computing network, the first computing device participating in the first gameplay via a first gaming platform;

enabling a second computing device of the plurality of computing devices to participate in a second gameplay of the video gaming application via the cloud computing network, the second computing device participating in the second gameplay via a second gaming platform;

receiving one or more interactions via a social network service in association with an event from one of the first gameplay and the second gameplay of the video gaming application;

determining an influence to one of the first gameplay and the second gameplay of the video gaming application based on the one or more interactions via the social network service; and modifying one of the first gameplay and the second gameplay of the video gaming application based on the influence.

2. The computer-implemented method of claim 1, wherein a gaming platform is one of a mobile device, a game console, a social network messaging application, and a social website.

3. The computer-implemented method of claim 1, wherein the first gameplay and the second gameplay are a shared gameplay that is shared across the first computing device and the second computing device by a first player and a second player, respectively, and wherein the first computing device is a personal computer and the second computing device is a mobile device.

4. The computer-implemented method of claim 3, wherein the first player and the second player have different levels of capability in the shared gameplay.

5. The computer-implemented method of claim 1, wherein the first gameplay and the second gameplay are a shared game played by a same player via different platforms.

6. The computer-implemented method of claim 1, wherein the first gameplay and the second gameplay are different games played by different players via a same gaming platform.

7. The computer-implemented method of claim 1, wherein the first gameplay and the second gameplay are different games played by different players via a different gaming platform.

8. The computer-implemented method of claim 1, wherein game content in the first gameplay and the second gameplay is platform agnostic.

9. The computer-implemented method of claim 1, wherein the video gaming application is linked with the social network service that enables users of the video gaming application to send text-based posts.

10. The computer-implemented method of claim 1, wherein the video gaming application is linked with the social network service to enable text-based posts to be broadcasted for the event from one of the first gameplay and the second gameplay.

11. The computer-implemented method of claim 1, wherein the video gaming application is linked with a social network application that enables social network activities to affect one of the first gameplay and the second gameplay.

12. The computer-implemented method of claim 11, wherein the social network application is included in the video gaming application.

13. The computer-implemented method of claim 11, wherein the social network application is a stand-alone third-party application coupled to the video gaming application.

14. A system for hosting and providing a video gaming environment to one or more users, comprising:
one or more processors; and
a memory storing instructions that, when executed by the one or more processors, cause the system to:
provide access to a video gaming application operated in a cloud computing network to a plurality of computing devices;
enable a first computing device of the plurality of computing devices to participate in a first gameplay of the video gaming application via the cloud computing network, the first computing device participating in the first gameplay via a first gaming platform;
enable a second computing device of the plurality of computing devices to participate in a second gameplay of the video gaming application via the cloud computing network, the second computing device participating in the second gameplay via a second gaming platform;
receive one or more interactions via a social network service in association with an event from one of the first gameplay and the second gameplay of the video gaming application;
determine an influence to one of the first gameplay and the second gameplay of the video gaming application based on the one or more interactions via the social network service; and
modify one of the first gameplay and the second gameplay of the video gaming application based on the influence.

15. The system of claim 14, wherein a gaming platform is one of a mobile device, a game console, a social network messaging application, and a social website.

16. The system of claim 14, wherein the first gameplay and the second gameplay are a shared gameplay that is shared across the first computing device and the second computing device by a first player and a second player, respectively, and wherein the first computing device is a personal computer and the second computing device is a mobile device.

17. The system of claim 16, wherein the first player and the second player have different levels of capability in the shared gameplay.

18. The system of claim 14, wherein the first gameplay and the second gameplay are a same game played by a same player via different platforms.

19. The system of claim 14, wherein game content in the first gameplay and the second gameplay is platform agnostic.

20. The system of claim 14, wherein the video gaming application is linked with a social network application that enables social network activities to affect one of the first gameplay and the second gameplay.

* * * * *